US009584993B2

(12) United States Patent
Johnson et al.

(10) Patent No.: US 9,584,993 B2
(45) Date of Patent: Feb. 28, 2017

(54) SYSTEM AND METHOD FOR VECTOR PROCESSING ON BEHALF OF IMAGE APERTURE AIM

(71) Applicants: William J. Johnson, Flower Mound, TX (US); Jason M. Johnson, Flower Mound, TX (US)

(72) Inventors: William J. Johnson, Flower Mound, TX (US); Jason M. Johnson, Flower Mound, TX (US)

( * ) Notice: Subject to any disclaimer, the term of this patent is extended or adjusted under 35 U.S.C. 154(b) by 0 days.

(21) Appl. No.: 15/225,783

(22) Filed: Aug. 1, 2016

(65) Prior Publication Data

US 2016/0345148 A1 Nov. 24, 2016

Related U.S. Application Data

(63) Continuation of application No. 14/941,398, filed on Nov. 13, 2015, now Pat. No. 9,445,238, which is a (Continued)

(51) Int. Cl.

*H04W 4/00* (2009.01)
*H04W 4/20* (2009.01)
(Continued)

(52) U.S. Cl.

CPC ............. *H04W 4/206* (2013.01); *H04L 67/26* (2013.01); *H04N 7/185* (2013.01); *H04W 4/023* (2013.01);
(Continued)

(58) Field of Classification Search

CPC ........ H04W 4/206; H04W 4/008; H04L 67/26
(Continued)

(56) References Cited

U.S. PATENT DOCUMENTS 3,636,421 A 1/1972 Takeishi et al.
4,021,780 A 5/1977 Narey et al.
(Continued)

FOREIGN PATENT DOCUMENTS

EP 0712227 5/1996
EP 915590 5/1999
(Continued)

OTHER PUBLICATIONS

Bill N. Schilit and Marvin M. Theimer, Disseminating Active Map Information Mobile Hosts, IEEE Network, Sep./Oct. 1994.
(Continued)

*Primary Examiner* — Marcos Batista
(74) *Attorney, Agent, or Firm* — Yudell Isidore, PLLC

(57) ABSTRACT

Provided is a system and method for aiming an image capturing mobile data processing system, performing a shoot action (e.g. shooting a picture), and subsequently processing a virtual vector determined between the image capturing mobile data processing system and a particular user carried mobile data processing system subject of the aim. Aiming information may include location information, directional and posture information, distance information, target size, and/or other shooting data to further qualify the shoot action. Permissions and configurations can govern data pulled or pushed. Wave forms which are not controllably aimed by nature can be accurately aimed.

20 Claims, 42 Drawing Sheets

Related U.S. Application Data continuation of application No. 14/551,437, filed on Nov. 24, 2014, now Pat. No. 9,204,275, which is a continuation of application No. 14/217,661, filed on Mar. 18, 2014, now Pat. No. 8,942,693, which is a continuation of application No. 12/807,806, filed on Sep. 14, 2010, now Pat. No. 8,761,751, which is a continuation-in-part of application No. 12/800,394, filed on May 14, 2010, now Pat. No. 8,566,839, and a continuation-in-part of application No. 12/800,395, filed on May 14, 2010, now Pat. No. 8,750,841, said application No. 12/800,394 is a continuation-in-part of application No. 12/590,831, filed on Nov. 13, 2009, now Pat. No. 8,634,796, and a continuation-in-part of application No. 12/287,064, filed on Oct. 3, 2008, now Pat. No. 8,639,267, and a continuation-in-part of application No. 12/077,041, filed on Mar. 14, 2008, now Pat. No. 8,600,341, said application No. 12/800,395 is a continuation-in-part of application No. 12/590,831, and a continuation-in-part of application No. 12/287,064, and a continuation-in-part of application No. 12/077,041.

(51) Int. Cl.

| | |
|---|---|
| ***H04W 4/02*** | (2009.01) |
| ***H04L 29/08*** | (2006.01) |
| ***H04W 68/00*** | (2009.01) |
| ***H04N 7/18*** | (2006.01) |
| *H04W 88/02* | (2009.01) |
| *H04W 4/14* | (2009.01) |

(52) U.S. Cl.
CPC ............ *H04W 68/005* (2013.01); *H04W 4/14* (2013.01); *H04W 88/02* (2013.01)

(58) Field of Classification Search
USPC ............ 455/418, 456.1–456.3, 466; 370/338
See application file for complete search history.

(56) References Cited

U.S. PATENT DOCUMENTS

| | | | |
|---|---|---|---|
| 4,255,619 | A | 3/1981 | Saito |
| 4,445,118 | A | 4/1984 | Taylor et al. |
| 4,536,647 | A | 8/1985 | Atalla et al. |
| 4,757,267 | A | 7/1988 | Riskin |
| 4,841,560 | A | 6/1989 | Chan et al. |
| 4,845,504 | A | 7/1989 | Roberts et al. |
| 4,922,516 | A | 5/1990 | Butler et al. |
| 4,973,952 | A | 11/1990 | Malec et al. |
| 4,974,170 | A | 11/1990 | Bouve et al. |
| 4,977,399 | A | 12/1990 | Price et al. |
| 5,089,814 | A | 2/1992 | DeLuca et al. |
| 5,095,532 | A | 3/1992 | Mardus |
| 5,121,126 | A | 6/1992 | Clagett |
| 5,122,795 | A | 6/1992 | Cubley et al. |
| 5,131,020 | A | 7/1992 | Liebesny et al. |
| 5,185,857 | A | 2/1993 | Rozmanith et al. |
| 5,214,793 | A | 5/1993 | Conway et al. |
| 5,223,844 | A | 6/1993 | Mansell et al. |
| 5,243,652 | A | 9/1993 | Teare et al. |
| 5,245,608 | A | 9/1993 | Deaton et al. |
| 5,264,822 | A | 11/1993 | Vogelman et al. |
| 5,265,070 | A | 11/1993 | Minowa |
| 5,303,393 | A | 4/1994 | Noreen et al. |
| 5,321,242 | A | 6/1994 | Heath, Jr. |
| 5,347,632 | A | 9/1994 | Filepp et al. |
| 5,363,245 | A | 11/1994 | Borello |
| 5,363,377 | A | 11/1994 | Sharpe |
| 5,365,516 | A | 11/1994 | Jandrell |
| 5,371,794 | A | 12/1994 | Diffie et al. |
| 5,390,237 | A | 2/1995 | Hoffman et al. |
| 5,404,505 | A | 4/1995 | Levinson |
| 5,432,841 | A | 7/1995 | Rimer |
| 5,444,444 | A | 8/1995 | Ross |
| 5,451,757 | A | 9/1995 | Heath, Jr. |
| 5,455,807 | A | 10/1995 | Nepple |
| 5,461,627 | A | 10/1995 | Rypinski |
| 5,475,735 | A | 12/1995 | Williams et al. |
| 5,485,163 | A | 1/1996 | Singer et al. |
| 5,487,103 | A | 1/1996 | Richardson |
| 5,493,309 | A | 2/1996 | Bjornholt et al. |
| 5,497,414 | A | 3/1996 | Bartholomew |
| 5,504,482 | A | 4/1996 | Schreder |
| 5,511,111 | A | 4/1996 | Serbetcioglu et al. |
| 5,511,233 | A | 4/1996 | Otten |
| 5,512,908 | A | 4/1996 | Herrick |
| 5,513,263 | A | 4/1996 | White et al. |
| 5,528,248 | A | 6/1996 | Steiner et al. |
| 5,539,395 | A | 7/1996 | Buss et al. |
| 5,544,354 | A | 8/1996 | May et al. |
| 5,559,520 | A | 9/1996 | Barzegar et al. |
| 5,561,704 | A | 10/1996 | Samilando |
| 5,566,235 | A | 10/1996 | Hetz |
| 5,581,479 | A | 12/1996 | McLaughlin |
| 5,583,864 | A | 12/1996 | Lightfoot et al. |
| 5,586,254 | A | 12/1996 | Kondo et al. |
| 5,588,042 | A | 12/1996 | Comer |
| 5,590,196 | A | 12/1996 | Moreau |
| 5,590,398 | A | 12/1996 | Matthews |
| 5,592,470 | A | 1/1997 | Rudrapatna et al. |
| 5,594,779 | A | 1/1997 | Goodman |
| 5,596,625 | A | 1/1997 | LeBlanc |
| 5,602,843 | A | 2/1997 | Gray |
| 5,608,854 | A | 3/1997 | Labedz et al. |
| 5,610,973 | A | 3/1997 | Comer |
| 5,625,364 | A | 4/1997 | Herrick et al. |
| 5,625,668 | A | 4/1997 | Loomis |
| 5,627,549 | A | 5/1997 | Park |
| 5,636,245 | A | 6/1997 | Ernst et al. |
| 5,646,632 | A | 7/1997 | Khan et al. |
| 5,654,959 | A | 8/1997 | Baker et al. |
| 5,657,375 | A | 8/1997 | Connolly et al. |
| 5,661,492 | A | 8/1997 | Shoap et al. |
| 5,663,734 | A | 9/1997 | Krasner |
| 5,664,948 | A | 9/1997 | Dimitriadis et al. |
| 5,666,481 | A | 9/1997 | Lewis |
| 5,677,905 | A | 10/1997 | Bigham |
| 5,687,212 | A | 11/1997 | Kinser, Jr. et al. |
| 5,689,431 | A | 11/1997 | Rudow et al. |
| 5,694,453 | A | 12/1997 | Fuller et al. |
| 5,701,301 | A | 12/1997 | Weisser, Jr. |
| 5,704,049 | A | 12/1997 | Briechle |
| 5,712,899 | A | 1/1998 | Pace, II |
| 5,713,075 | A | 1/1998 | Threadgill et al. |
| 5,714,948 | A | 2/1998 | Farmakis et al. |
| 5,717,688 | A | 2/1998 | Belanger et al. |
| 5,720,033 | A | 2/1998 | Deo |
| 5,724,521 | A | 3/1998 | Dedrick |
| 5,727,057 | A | 3/1998 | Emery et al. |
| 5,729,680 | A | 3/1998 | Belanger et al. |
| 5,771,283 | A | 6/1998 | Chang et al. |
| 5,774,534 | A | 6/1998 | Mayer |
| 5,778,304 | A | 7/1998 | Grube et al. |
| 5,790,974 | A | 8/1998 | Tognazzini |
| 5,794,210 | A | 8/1998 | Goldhaber et al. |
| 5,796,727 | A | 8/1998 | Harrison et al. |
| 5,798,733 | A | 8/1998 | Ethridge |
| 5,806,018 | A | 9/1998 | Smith et al. |
| 5,812,763 | A | 9/1998 | Teng |
| 5,819,155 | A | 10/1998 | Worthey et al. |
| 5,826,195 | A | 10/1998 | Westerlage et al. |
| 5,835,061 | A | 11/1998 | Stewart |
| 5,838,774 | A | 11/1998 | Weisser, Jr. |
| 5,842,010 | A | 11/1998 | Jain et al. |
| 5,845,211 | A | 12/1998 | Roach |
| 5,852,775 | A | 12/1998 | Hidary |
| 5,855,007 | A | 12/1998 | Jovicic et al. |
| 5,870,555 | A | 2/1999 | Pruett et al. |
| 5,870,724 | A | 2/1999 | Lawlor et al. |

(56) References Cited

U.S. PATENT DOCUMENTS

| | | | | |
|---|---|---|---|---|
| 5,875,186 | A | 2/1999 | Belanger et al. | |
| 5,875,401 | A | 2/1999 | Rochkind | |
| 5,878,126 | A | 3/1999 | Velamuri et al. | |
| 5,880,958 | A | 3/1999 | Helms et al. | |
| 5,881,131 | A | 3/1999 | Farris et al. | |
| 5,884,284 | A | 3/1999 | Peters et al. | |
| 5,887,259 | A | 3/1999 | Zicker et al. | |
| 5,889,953 | A | 3/1999 | Thebaut et al. | |
| 5,892,454 | A | 4/1999 | Schipper et al. | |
| 5,896,440 | A | 4/1999 | Reed et al. | |
| 5,897,640 | A | 4/1999 | Veghte et al. | |
| 5,903,636 | A | 5/1999 | Malik | |
| 5,907,544 | A | 5/1999 | Rypinski | |
| 5,920,846 | A | 7/1999 | Storch et al. | |
| 5,922,040 | A | 7/1999 | Prabhakaran | |
| 5,923,702 | A | 7/1999 | Brenner et al. | |
| 5,933,420 | A | 8/1999 | Jaszewski et al. | |
| 5,938,721 | A | 8/1999 | Dussell et al. | |
| 5,949,867 | A | 9/1999 | Sonnenberg | |
| 5,950,130 | A | 9/1999 | Coursey | |
| 5,961,593 | A | 10/1999 | Gabber et al. | |
| 5,963,866 | A | 10/1999 | Palamara et al. | |
| 5,963,913 | A | 10/1999 | Henneuse et al. | |
| 5,968,176 | A | 10/1999 | Nessett et al. | |
| 5,969,678 | A | 10/1999 | Stewart | |
| 5,982,867 | A | 11/1999 | Urban et al. | |
| 5,983,091 | A | 11/1999 | Rodriguez | |
| 5,987,381 | A | 11/1999 | Oshizawa | |
| 5,991,287 | A | 11/1999 | Diepstraten et al. | |
| 5,995,015 | A | 11/1999 | DeTemple et al. | |
| 6,006,090 | A | 12/1999 | Coleman et al. | |
| 6,009,398 | A | 12/1999 | Mueller et al. | |
| 6,011,975 | A | 1/2000 | Emery et al. | |
| 6,018,293 | A | 1/2000 | Smith et al. | |
| 6,026,151 | A | 2/2000 | Bauer et al. | |
| 6,028,921 | A | 2/2000 | Malik et al. | |
| 6,047,327 | A | 4/2000 | Tso et al. | |
| 6,055,637 | A | 4/2000 | Hudson et al. | |
| 6,058,106 | A | 5/2000 | Cudak et al. | |
| 6,067,082 | A | 5/2000 | Enmei | |
| 6,067,297 | A | 5/2000 | Beach | |
| 6,076,080 | A | 6/2000 | Morscheck et al. | |
| 6,085,086 | A | 7/2000 | La Porta et al. | |
| 6,091,956 | A | 7/2000 | Hollenberg | |
| 6,101,381 | A | 8/2000 | Tajima et al. | |
| 6,101,443 | A | 8/2000 | Kato et al. | |
| 6,112,186 | A | 8/2000 | Bergh et al. | |
| 6,115,669 | A | 9/2000 | Watanabe et al. | |
| 6,122,520 | A | 9/2000 | Want et al. | |
| 6,133,853 | A | 10/2000 | Obradovich et al. | |
| 6,138,003 | A | 10/2000 | Kingdon et al. | |
| 6,138,119 | A | 10/2000 | Hall et al. | |
| 6,141,609 | A | 10/2000 | Herdeg et al. | |
| 6,144,645 | A | 11/2000 | Struhsaker et al. | |
| 6,154,152 | A | 11/2000 | Ito | |
| 6,154,637 | A | 11/2000 | Wright et al. | |
| 6,157,829 | A | 12/2000 | Grube et al. | |
| 6,157,946 | A | 12/2000 | Itakura et al. | |
| 6,163,274 | A | 12/2000 | Lindgren | |
| 6,167,255 | A | 12/2000 | Kennedy, III et al. | |
| 6,182,226 | B1 | 1/2001 | Reid et al. | |
| 6,184,829 | B1 | 2/2001 | Stilp | |
| 6,185,426 | B1 | 2/2001 | Alperovich et al. | |
| 6,185,484 | B1 | 2/2001 | Rhinehart | |
| 6,192,314 | B1 | 2/2001 | Khavakh et al. | |
| 6,202,054 | B1 | 3/2001 | Lawlor et al. | |
| 6,205,478 | B1 | 3/2001 | Sugano et al. | |
| 6,208,854 | B1 | 3/2001 | Roberts et al. | |
| 6,208,866 | B1 | 3/2001 | Rouhollahzadeh et al. | |
| 6,226,277 | B1 | 5/2001 | Chuah | |
| 6,229,477 | B1 | 5/2001 | Chang et al. | |
| 6,229,810 | B1 | 5/2001 | Gerszberg et al. | |
| 6,233,329 | B1 | 5/2001 | Urban et al. | |
| 6,233,452 | B1 | 5/2001 | Nishino | |
| 6,236,360 | B1 | 5/2001 | Rudow et al. | |
| 6,236,940 | B1 | 5/2001 | Rudow et al. | |
| 6,246,361 | B1 | 6/2001 | Weill et al. | |
| 6,259,405 | B1 | 7/2001 | Stewart et al. | |
| 6,263,209 | B1 | 7/2001 | Reed et al. | |
| 6,278,938 | B1 | 8/2001 | Alumbaugh | |
| 6,285,665 | B1 | 9/2001 | Chuah et al. | |
| 6,285,931 | B1 | 9/2001 | Hattori et al. | |
| 6,298,234 | B1 | 10/2001 | Brunner | |
| 6,308,273 | B1 | 10/2001 | Goertzel et al. | |
| 6,311,069 | B1 | 10/2001 | Havinis et al. | |
| 6,317,718 | B1 | 11/2001 | Fano | |
| 6,321,092 | B1 | 11/2001 | Fitch et al. | |
| 6,324,396 | B1 | 11/2001 | Vasa et al. | |
| 6,326,918 | B1 | 12/2001 | Stewart | |
| 6,327,254 | B1 | 12/2001 | Chuah | |
| 6,327,357 | B1 | 12/2001 | Meek et al. | |
| 6,332,127 | B1 | 12/2001 | Bandera et al. | |
| 6,332,163 | B1 | 12/2001 | Bowman-Amuah | |
| 6,340,958 | B1 | 1/2002 | Cantu et al. | |
| 6,343,290 | B1 | 1/2002 | Cossins et al. | |
| 6,353,664 | B1 | 3/2002 | Cannon et al. | |
| 6,359,880 | B1 | 3/2002 | Curry et al. | |
| 6,360,101 | B1 | 3/2002 | Irvin | |
| 6,366,561 | B1 | 4/2002 | Bender | |
| 6,377,548 | B1 | 4/2002 | Chuah et al. | |
| 6,377,810 | B1 | 4/2002 | Geiger et al. | |
| 6,377,982 | B1 | 4/2002 | Rai et al. | |
| 6,385,531 | B2 | 5/2002 | Bates et al. | |
| 6,385,591 | B1 | 5/2002 | Mankoff | |
| 6,389,055 | B1 * | 5/2002 | August | G06Q 30/02 348/E7.017 |
| 6,389,426 | B1 | 5/2002 | Turnbull et al. | |
| 6,393,482 | B1 | 5/2002 | Rai et al. | |
| 6,400,722 | B1 | 6/2002 | Chuah et al. | |
| 6,407,673 | B1 | 6/2002 | Lane | |
| 6,408,307 | B1 | 6/2002 | Semple et al. | |
| 6,414,635 | B1 | 7/2002 | Stewart et al. | |
| 6,414,950 | B1 | 7/2002 | Rai et al. | |
| 6,415,019 | B1 | 7/2002 | Savaglio et al. | |
| 6,418,308 | B1 | 7/2002 | Heinonen et al. | |
| 6,421,441 | B1 | 7/2002 | Dzuban | |
| 6,421,714 | B1 | 7/2002 | Rai et al. | |
| 6,427,073 | B1 | 7/2002 | Kortesalmi et al. | |
| 6,427,119 | B1 | 7/2002 | Stefan et al. | |
| 6,430,276 | B1 | 8/2002 | Bouvier et al. | |
| 6,430,562 | B1 | 8/2002 | Kardos et al. | |
| 6,442,391 | B1 | 8/2002 | Johansson et al. | |
| 6,442,479 | B1 | 8/2002 | Barton | |
| 6,442,687 | B1 | 8/2002 | Savage | |
| 6,449,272 | B1 | 9/2002 | Chuah et al. | |
| 6,449,497 | B1 | 9/2002 | Kirbas et al. | |
| 6,452,498 | B2 | 9/2002 | Stewart | |
| 6,463,533 | B1 | 10/2002 | Calamera et al. | |
| 6,470,378 | B1 | 10/2002 | Tracton et al. | |
| 6,470,447 | B1 | 10/2002 | Lambert et al. | |
| 6,473,626 | B1 | 10/2002 | Nevoux et al. | |
| 6,477,382 | B1 | 11/2002 | Mansfield et al. | |
| 6,477,526 | B2 | 11/2002 | Hayashi et al. | |
| 6,484,029 | B2 | 11/2002 | Hughes et al. | |
| 6,484,092 | B2 | 11/2002 | Seibel | |
| 6,484,148 | B1 | 11/2002 | Boyd | |
| 6,490,291 | B1 | 12/2002 | Lee et al. | |
| 6,496,491 | B2 | 12/2002 | Chuah et al. | |
| 6,496,931 | B1 | 12/2002 | Rajchel et al. | |
| 6,505,046 | B1 | 1/2003 | Baker | |
| 6,505,048 | B1 | 1/2003 | Moles et al. | |
| 6,505,049 | B1 | 1/2003 | Dorenbosch | |
| 6,505,120 | B2 | 1/2003 | Yamashita et al. | |
| 6,505,163 | B1 | 1/2003 | Zhang et al. | |
| 6,512,754 | B2 | 1/2003 | Feder et al. | |
| 6,516,055 | B1 | 2/2003 | Bedeski et al. | |
| 6,516,416 | B2 | 2/2003 | Gregg et al. | |
| 6,519,252 | B2 | 2/2003 | Sallberg | |
| 6,519,458 | B2 | 2/2003 | Oh et al. | |
| 6,522,876 | B1 | 2/2003 | Weiland et al. | |
| 6,526,275 | B1 | 2/2003 | Calvert | |
| 6,526,349 | B2 | 2/2003 | Bullock et al. | |
| 6,532,418 | B2 | 3/2003 | Chun et al. | |
| 6,545,596 | B1 | 4/2003 | Moon | |

(56) References Cited

U.S. PATENT DOCUMENTS 6,546,257 B1 4/2003 Stewart
6,560,442 B1 5/2003 Yost et al.
6,560,461 B1 5/2003 Fomukong et al.
6,577,643 B1 6/2003 Rai et al.
6,577,644 B1 6/2003 Chuah et al.
6,594,482 B1 7/2003 Findikli et al.
6,618,474 B1 9/2003 Reese
6,618,593 B1 9/2003 Drutman et al.
6,622,016 B1 9/2003 Sladek et al.
6,628,627 B1 9/2003 Zendle et al.
6,628,928 B1 9/2003 Crosby et al.
6,628,938 B1 9/2003 Rachabathuni et al.
6,633,633 B1 10/2003 Bedingfield
6,640,184 B1 10/2003 Rabe
6,647,257 B2 11/2003 Owensby
6,647,269 B2 11/2003 Hendrey et al.
6,650,901 B1 11/2003 Schuster et al.
6,654,610 B1 11/2003 Chen et al.
6,662,014 B1 12/2003 Walsh
6,665,536 B1 12/2003 Mahany
6,665,718 B1 12/2003 Chuah et al.
6,671,272 B2 12/2003 Vaziri et al.
6,675,017 B1 1/2004 Zellner et al.
6,675,208 B1 1/2004 Rai et al.
6,677,894 B2 1/2004 Sheynblat et al.
6,697,018 B2 2/2004 Stewart et al.
6,697,783 B1 2/2004 Brinkman et al.
6,701,160 B1 3/2004 Pinder et al.
6,701,251 B2 3/2004 Stefan et al.
6,704,311 B1 3/2004 Chuah et al.
6,716,101 B1 4/2004 Meadows et al.
6,721,406 B1 4/2004 Contractor
6,725,048 B2 4/2004 Mao et al.
6,732,080 B1 5/2004 Blants
6,732,101 B1 5/2004 Cook
6,732,176 B1 5/2004 Stewart et al.
6,738,808 B1 5/2004 Zellner et al.
6,754,504 B1 6/2004 Reed
6,754,582 B1 6/2004 Smith et al.
6,759,960 B2 7/2004 Stewart et al.
6,772,064 B1 8/2004 Smith et al.
6,799,049 B1 9/2004 Zellner et al.
6,801,509 B1 10/2004 Chuah et al.
6,816,720 B2 11/2004 Hussain et al.
6,819,929 B2 11/2004 Antonucci et al.
6,820,062 B1 11/2004 Gupta et al.
6,829,475 B1 12/2004 Lee et al.
6,850,758 B1 2/2005 Paul et al.
6,867,733 B2 3/2005 Sandhu et al.
6,868,074 B1 3/2005 Hanson
6,874,011 B1 3/2005 Spielman
6,876,858 B1 4/2005 Duvall et al.
6,898,569 B1 5/2005 Bansal et al.
6,937,869 B1 8/2005 Rayburn
6,937,998 B1 8/2005 Swartz et al.
6,954,147 B1 10/2005 Cromer et al.
6,985,747 B2 1/2006 Chithambaram
6,999,572 B1 2/2006 Shaffer et al.
7,005,985 B1 2/2006 Steeves
7,009,556 B2 3/2006 Stewart et al.
7,023,995 B2 4/2006 Olsson
7,043,231 B2 5/2006 Bhatia et al.
7,058,594 B2 6/2006 Stewart et al.
7,069,319 B2 6/2006 Zellner et al.
7,085,555 B2 8/2006 Zellner et al.
7,103,368 B2 9/2006 Teshima
7,103,476 B2 9/2006 Smith et al.
7,106,843 B1 9/2006 Gainsboro et al.
7,110,749 B2 9/2006 Zellner et al.
7,116,977 B1 10/2006 Moton et al.
7,124,101 B1 10/2006 Mikurak
7,130,630 B1 10/2006 Enzmann et al.
7,139,722 B2 11/2006 Perrella et al.
7,155,199 B2 12/2006 Zalewski et al.
7,181,225 B1 2/2007 Moton et al.
7,181,529 B2 2/2007 Bhatia et al.
7,188,027 B2 3/2007 Smith et al.
7,190,960 B2 3/2007 Wilson et al.
7,203,502 B2 4/2007 Wilson et al.
7,212,829 B1 5/2007 Lau et al.
7,224,978 B2 5/2007 Zellner et al.
7,236,799 B2 6/2007 Wilson et al.
RE39,717 E 7/2007 Yates et al.
7,245,925 B2 7/2007 Zellner
7,260,378 B2 8/2007 Holland et al.
7,272,493 B1 9/2007 Hamrick et al.
7,292,939 B2 11/2007 Smith et al.
7,295,924 B2 11/2007 Smith et al.
7,362,851 B2 4/2008 Contractor
7,383,052 B2 6/2008 Moton et al.
7,751,834 B2 7/2010 Park et al.
2001/0001239 A1 5/2001 Stewart
2001/0007450 A1 7/2001 Begum
2001/0021646 A1 9/2001 Antonucci et al.
2001/0028301 A1 10/2001 Geiger et al.
2001/0034709 A1 10/2001 Stoifo et al.
2001/0049275 A1 12/2001 Pierry et al.
2001/0051911 A1 12/2001 Marks et al.
2002/0035474 A1 3/2002 Alpdemir
2002/0037709 A1 3/2002 Bhatia et al.
2002/0037722 A1 3/2002 Hussain et al.
2002/0037731 A1 3/2002 Mao et al.
2002/0037744 A1 3/2002 Bhatia et al.
2002/0037750 A1 3/2002 Hussain et al.
2002/0038362 A1 3/2002 Bhatia et al.
2002/0038384 A1 3/2002 Khan et al.
2002/0038386 A1 3/2002 Bhatia et al.
2002/0046090 A1 4/2002 Stewart
2002/0052781 A1 5/2002 Aufricht et al.
2002/0077083 A1 6/2002 Zellner et al.
2002/0077084 A1 6/2002 Zellner et al.
2002/0077118 A1 6/2002 Zellner et al.
2002/0077130 A1 6/2002 Owensby
2002/0077897 A1 6/2002 Zellner et al.
2002/0087335 A1 7/2002 Meyers et al.
2002/0090932 A1 7/2002 Bhatia et al.
2002/0095312 A1 7/2002 Wheat
2002/0102993 A1 8/2002 Hendrey et al.
2002/0107027 A1 8/2002 O'Neil
2002/0120713 A1 8/2002 Gupta et al.
2002/0161637 A1 10/2002 Sugaya
2002/0174147 A1 11/2002 Wang et al.
2003/0003990 A1 1/2003 Von Kohorn
2003/0016233 A1 1/2003 Charpentier
2003/0018527 A1 1/2003 Filepp et al.
2003/0140088 A1 7/2003 Robinson et al.
2003/0169151 A1 9/2003 Ebling et al.
2004/0002329 A1 1/2004 Bhatia et al.
2004/0097243 A1 5/2004 Zellner et al.
2004/0111269 A1 6/2004 Koch
2004/0164898 A1 8/2004 Stewart
2004/0186902 A1 9/2004 Stewart et al.
2004/0203903 A1 10/2004 Wilson et al.
2004/0205198 A1 10/2004 Zellner et al.
2004/0266453 A1 12/2004 Maanoja et al.
2005/0017068 A1 1/2005 Zalewski et al.
2005/0043036 A1 2/2005 Ioppe et al.
2005/0060365 A1 3/2005 Robinson et al.
2005/0096067 A1 5/2005 Martin
2005/0114777 A1 5/2005 Szeto
2005/0151655 A1 7/2005 Hamrick et al.
2005/0246097 A1 11/2005 Hamrick et al.
2005/0272445 A1 12/2005 Zellner
2006/0030335 A1 2/2006 Zellner et al.
2006/0030339 A1 2/2006 Zhovnirovsky et al.
2006/0059043 A1 3/2006 Chan et al.
2006/0089134 A1 4/2006 Moton et al.
2006/0094447 A1 5/2006 Zellner
2006/0099966 A1 5/2006 Moton et al.
2006/0105784 A1 5/2006 Zellner et al.
2006/0106537 A1 5/2006 Hamrick et al.
2006/0164302 A1 7/2006 Stewart et al.
2006/0167986 A1 7/2006 Trzyna et al.
2006/0183467 A1 8/2006 Stewart et al.

(56) References Cited

U.S. PATENT DOCUMENTS

| | | | | |
|---|---|---|---|---|
| 2006/0189327 | A1 | 8/2006 | Zellner et al. | |
| 2006/0189332 | A1 | 8/2006 | Benco et al. | |
| 2006/0194589 | A1* | 8/2006 | Sankisa | H04W 88/021 455/456.1 |
| 2006/0195570 | A1 | 8/2006 | Zellner et al. | |
| 2006/0253252 | A1 | 11/2006 | Hamrick et al. | |
| 2007/0010260 | A1 | 1/2007 | Zellner et al. | |
| 2007/0042789 | A1 | 2/2007 | Moton et al. | |
| 2007/0066323 | A1* | 3/2007 | Park | G01S 5/02 455/456.2 |
| 2007/0105565 | A1 | 5/2007 | Enzmann et al. | |
| 2007/0124721 | A1 | 5/2007 | Cowing et al. | |
| 2007/0136603 | A1 | 6/2007 | Kuecuekyan | |
| 2007/0250920 | A1 | 10/2007 | Lindsay | |
| 2008/0096529 | A1 | 4/2008 | Zellner | |
| 2008/0311957 | A1* | 12/2008 | Jantunen | H04W 8/005 455/560 |
| 2009/0054077 | A1 | 2/2009 | Gauthier et al. | |

FOREIGN PATENT DOCUMENTS

| | | |
|---|---|---|
| EP | 917320 | 5/1999 |
| EP | 935364 | 8/1999 |
| EP | 924914 | 4/2003 |
| EP | 779752 | 6/2004 |
| EP | 1435749 | 7/2004 |
| EP | 1445923 | 8/2004 |
| EP | 838933 | 4/2008 |
| GB | 2396779 | 6/2004 |
| JP | 01-194628 | 8/1989 |
| JP | 03-128540 | 5/1991 |
| JP | 07-234789 | 9/1995 |
| JP | 07-288514 | 10/1995 |
| JP | 07-319706 | 12/1995 |
| JP | 08-44568 | 2/1996 |
| JP | 08-87296 | 4/1996 |
| JP | 11-168478 | 6/1999 |
| WO | WO 98/19484 | 5/1998 |
| WO | WO 99/16263 | 4/1999 |
| WO | WO 99/27716 | 6/1999 |
| WO | WO 99/51005 | 10/1999 |
| WO | WO 99/55012 | 10/1999 |
| WO | WO 00/02365 | 1/2000 |
| WO | WO 00/76249 | 12/2000 |
| WO | WO 02/11407 | 2/2002 |
| WO | WO 2004/80092 | 9/2004 |

OTHER PUBLICATIONS

Andy Harter and Andy Hooper, A Distributed Location system for the Active Office, IEEE Network, Jan./Feb. 1994.

Max J. Egenhofer, Spatial SQL: A Query and Presentation Language, IEEE Network, Feb. 1994.

Mike Spreitzer and Marvin Theimer, Providing Location Information in a Ubiquitous Computing Environment, Proceedings of the Fourteenth ACM Symposium on Operating Systems Principles, Dec. 1993.

George W. Fitzmaurice, Situated Information Spaces and Spatially Aware Palmtop Computers, Communication of the ACM, Jul. 1993.

Ronald Azuma, Tracking Requirements for Augmented Reality, Communications of the ACM, vol. 36 No. 1, Jan. 1992.

Roy Want, et al., The Active Badge Location System, ACM Transactions on Information Systems, vol. 10, No. 1, Jan. 1992.

Marvin White, Emerging Requirements for Digital Maps for In-Vehicle Pathfinding and Other Traveller Assistance, Vehicular Navigation and Information Systems Conference Proceedings, Part 1, Oct. 1991.

Fred Phail, The Power of a Personal Computer for Car Information and Communications Systems, Vehicular Navigation and Information Systems Conference Proceedings, Part 1, Oct. 1991.

Thomas A. Dingus, et al., Human Factors Engineering the TravTek Driver Interface, Vehicular Navigation and Information Systems Conference Proceedings, Part II, Oct. 1991.

Michael Muffat et al., European Cooperation on Dual Mode Route Guidance Perspectives for Advanced Research Partners, Vehicular Navigation and Information Systems Conference Proceedings, Part II, Oct. 1991.

High-Performance Wireless Access Point for the Enterprise, ORiNOCO™ AP-100 Access Point for the Enterprise, Lucent Technologies, 2000.

MobileStar Network, MobileStar Network First to Provide Business Travelers with High-Speed Data Access via the Internet-Wirelessly, New York, NY, Jun. 24, 1998.

ORiNCO AP-1000—Getting Started, Lucent Technologies, Aug. 2000.

Harry Chen, et al., “Dynamic Service Discovery for Mobile Computing: Intelligent Agents Meet Jini in the Aether,” Cluster Computing, Special Issue on Internet Scalability, vol. 4, No. 4, Feb. 2001.

3rd Generation Partnership Project: Technical Specification Group Services and System Aspects; Functional Stage 2 Description of Location Services in UMTS (1999).

http://www.openwave.com/us/news_room/press_releases/2001/20020320, “Open Wave Announces Availability to End-to-End Set of Location Services for Wireless Internet”.

Trembly, A., “Wireless products arm road warriors,” National Underwriter, vol. 105, No. 3, pp. 23-25, Dialog 02113577 67213220 (Jan. 2001).

* cited by examiner

/← 3002a

// Figs. 30A through 30E syntaxes (e.g. delimiters, etc) used should enforce
// appropriate unambiguous grammar parsability for Lex&Yacc, top down
// recursive parsing, XML encoding, other syntactic embodiments, applicable semantic
// representations, and any other syntactic/semantic embodiments. Figs. 30A through 30E BNF
// grammar elaborates for a corresponding interpreter, recommended syntaxes, programming
// language structures and/or objects, DB schemas, ANSI datastream encoding (e.g. X.409),
// flowchart processing blocks and locations in parent application flowcharts, and any other
// analogous implementation embodiments or subsets thereof.

// *** Common BNF grammar (e.g. in Data 8): ***

Variables        = "null" | Variables Variable
      // Variables are placed anywhere; Can be used for referencing (a="..." b=a c=b)

Variable         = VarType(VarName) = "null" | VarType(VarName) = ...value(s)... |
                   VarType(VarName) = [ Variables ] [ VarInstantiations ] |
                   VarType(VarName) = [ VarInstantiations ] [ Variables ]
      // Variables scope to following & descending nesting; "value" has appropriate syntax
      // per VarType; VarName can be set to other variables (e.g. indirect tree structure)

VarInstantiations = "null" | VarInstantiations VarInstantiate

VarInstantiate   = "VarName(Param1="x1", Param2="x2", ... ParamN="xN") for N >= 0
      // Parameters allow optionally substituting occurrences in VarName with new values
      // prior to instantiation.

VarName          = "text string"

Description      = "null" | "text string" | VarInstantiate

History          = [ CreatorInfo ] [ ModifierInfo ] | VarInstantiations

CreatorInfo      = "null" | [ CreateDateTime ] [ CreatorID] [ CreatorIDType ]
                   [ CreatorAddr ] [ CreatorSysID ] [ CreatorSysType ]
                   [ CreatorSysAddr ] | VarInstantiations ModifierInfo     = "null" | [ LastModifyDateTime ] [ LastModifyID ]
                   [ LastModifyIDType ] [ LastModifyAddr ] [ LastModifySysID ]
                   [ LastModifySysType ] [ LastModifySysAddr ] | VarInstantiations CreateDateTime   = "date/time stamp" | VarInstantiate CreatorID        = ID CreatorIDType    = IDType

```
CreatorAddr          = Address

CreatorSysID         = "text string" | VarInstantiate

CreatorSysType       = "system type" | VarInstantiate   // e.g. type of MS

CreatorSysAddr       = Address

LastModifyDateTime=  "date/time stamp" | VarInstantiate

LastModifyID         = ID

LastModifyIDType     = IDType

LastModifyAddr       = Address

LastModifySysID      = "text string" | VarInstantiate

LastModifySysType    = "system type" | VarInstantiate

LastModifySysAddr    = Address

ID                   = "MS ID" [ Description ] [ History ] |
        "MS Group ID" [ Description ] [ History ] | "User ID" [ Description ] [ History ] |
        "User Group ID" [ Description ] [ History ] | "logical handle" [ Description ] [ History ] |
        "physical handle" [ Description ] [ History ] | VarInstantiations

IDType               = "MS_ID" | "MS_Group_ID" | "User_ID" | "User_Group_ID" |
                          "logical_handle" | "physical_handle" | VarInstantiate

Address              = "ip address" | "SNA address" | "Postal address" |
                       "point" | "logical address" | "physical address" | "situational location" |
                       "2 dimensional area" | "3 dimensional area" | VarInstantiate

TimeSpec             = "Xdate/time stamp" | "Xdate/time period" | VarInstantiate

VarType              = Description | History | ID | IDType | CreatorInfo | ModifierInfo |
        CreateDateTime | CreatorID | CreatorIDType | CreatorAddr | CreatorSysID |
        CreatorSysType | CreatorSysAddr | LastModifyDateTime | LastModifyID |
        LastModifyIDType | LastModifyAddr | LastModifySysID | LastModifySysType |
        LastModifySysAddr | Address | "Xdate/time stamp" | "Xdate/time period" | "text string" |
        "system type" | TimeSpec | "MS ID" | "MS Group ID" | "User ID" | "User Group ID" |
        "logical handle" | physical handle" | "...Address elaborations..." |
        "...IDType elaborations..." | Variable // | VarInstantiate here as well (but elaborates)
```

```
// ***** BNF grammar for Permissions 10: *****

PermissionBody   = "null" | [ Variables ] [ Permissions ]
      // [ Variables ] placed anywhere (not shown in constructs below to enhance readability)

Permissions      = "null" | Permissions Permission | VarInstantiations

Permission       = Grantor Grantee [ Grants ] [ TimeSpec ] [ Description ] [ History ] |
                       VarInstantiations
      // No Grants implies granting all permissions; This embodiment ensures non-null
      // Grantor and Grantee, but "null" could be used (e.g. for placeholder entries).

Grantor          = ID [ IDType ] | VarInstantiations
      // ID defaults (e.g. MS ID) when IDType not present

Grantee          = ID [ IDType ] | VarInstantiations

Grants           = "null" | Grants Grant | Privileges | VarInstantiations

Grant            = "grant name" AND (Privileges [ TimeSpec ] [ Description ] [ History ] |
                        Grants  [ TimeSpec ] [ Description ] [ History ] |
                        VarInstantiations)

Privileges       = "null" | Privileges Privilege | VarInstantiations

Privilege        = "atomic privilege for assignment" [ MSRelevance ]
                             [ TimeSpec ] [ Description ] [ History ] | VarInstantiations

MSRelevance      = "MS relevance descriptor"

Groups           = "null" | Groups Group | VarInstantiations

Group            = "group name" AND (IDs [ Description ] [ History ] |
                        Groups  [ Description ] [ History ] |
                        VarInstantiations)

IDs              = "null" | IDs ID [ IDType ] |  VarInstantiations

VarType          = "VarType | Permissions | Permission | Grantor | Grantee | Grants |
                       Grant | Privileges | Privilege | MSRelevance | Groups | Group |
                       IDs
```

```
// ***** BNF grammar for Charters 12: *****

CharterBody        = "null" | [ Variables ] [ Charters ]
        // [ Variables ] placed anywhere (not shown in constructs below to enhance readability)

Charters           = "null" | Charters Charter | VarInstantiations

Charter            = Grantee Grantor Expression Actions [ TimeSpec ] [ Description ]
                          [ History ] | VarInstantiations

Expression         = Conditions [ TimeSpec ] | VarInstantiations
        // This embodiment ensures at least one condition to a Charter, but "null" could be
        // used (e.g. for placeholder entries).

Conditions         = Condition | Conditions CondOp Condition] | VarInstantiations

CondOp             = "and" | "or" | VarInstantiations

Condition          = Term Op Term [ TimeSpec ] [ Description ] [ History ] |
        Value [ TimeSpec ] [ Description ] [ History ] |
        Invocation [ TimeSpec ] [ Description ] [ History ] | VarInstantiations
        // Another embodiment allows unary operators (e.g. "not"), for example for boolean
        // WDR fields (e.g. Applications field(s)). Current boolean tests for "True" or "False",
        // or non-zero = "True" and zero = "False". Value & Invocation result in a boolean.

Term               = WDRTerm [ TimeSpec ] [ Description ] [ History ] |
                     AppTerm [ TimeSpec ] [ Description ] [ History ] |
                     Value [ TimeSpec ] [ Description ] [ History ] |
                     Invocation [ TimeSpec ] [ Description ] [ History ] |
                     PointSet [ TimeSpec ] [ Description ] [ History ] |
                     VarInstantiate

WDRTerm            = "Any WDR 1100 field, or any subset thereof" [ Description ]
                          [ History ] | VarInstantiate

AppTerm            = "Any Application data field, or any subset thereof" [ Description ]
                          [ History ] | VarInstantiate

Value              = Data | "number" | "text string" | "value" | "True" | "False" |
                          "atomic term" | "map term" | ID [ IDType ] | "null" | VarInstantiate

PointSet           = [2D | 3D] [Geo | Cartesian | Polar]
                          "text string" [ Description ] [ History ] |
                          "numeric(s)" [ Description ] [ History ] |
                          Data [ Description ] [ History ] | VarInstantiate
```

```
Data            = "typed memory pointer" | "typed memory value" | "typed file path" |
                      "typed file path and offset" | "typed DB qualifier" | VarInstantiate
        // i.e. pointer or value from stack, globals, shared memory, file data location, DB
        // pointer, DB value, or any other data.

Invocation      = "DLL interface(optional params...)" |
                      "Linked interface(optional params...)" |
                      "executable path(optional params...)" | VarInstantiate
        // Invocation can return any value of any type, except will be converted to a boolean
        // when used as a Term (0 = False, else = True). Best to return boolean when Term use.

Op              = [ "atomic not operator" ] "atomic operator" | ProfileMatch |
                      VarInstantiate

ProfileMatch    = "atomic profile match operator" | VarInstantiate

Actions         = "null" | Actions Action

Action          = [ Host ] Command Operand [Parameters]
                      [ TimeSpec ] [ Description ] [ History ] | VarInstantiations

Host            = "null" | ID [IDType] | VarInstantiations

Command         = "atomic command" | VarInstantiations
        // Command may map to translation member entry of natural language map

Operand         = "atomic operand" | VarInstantiations
        // Some embodiments have no need for an operand in this grammar (e.g. command file
        // reference, DLL call, self contained command, invocation callout, etc).

Parameters      = "null" | Parameters Parameter | VarInstantiations

Parameter       = WDRTerm [ Description ] [ History ] |
                      AppTerm [ Description ] [ History ] |
                      Value [ Description ] [ History ] |
                      Invocation [ Description ] [ History ] |
                      ID [ IDType ] [ Description ] [ History ] |
                      VarInstantiate [ Description ] [ History ]

VarType         = "VarType | Charters | Charter | Expression | Conditions | Condition |
                  CondOp | WDRTerm | Term | Value | PointSet | Data | Invocation | Op |
                  Actions | ProfileMatch | Action | Command | Operand | Parameters |
                  Parameter | Host
```

*Fig. 7E*

| Operand ↓ | Command | | | | | | | | | | |
|---|---|---|---|---|---|---|---|---|---|---|---|
| | 101 | 103 | 105 | 119 | 107 | 109 | 111 | 113 | 115 | 117 | . . . |
| 201 | #, sender, msg/subj, attribs, recip(s) | #, sender, msg/subj, attribs, recip(s) | # | # | #, system(s) | #, system(s) | #, ack, source, system(s) | #, ack, system(s) | #, ack, source, system(s) | #, system(s) | |
| 203 | link, sender, msg/subj, attribs, recip(s) | link, sender, msg/subj, attribs, recip(s) | link, params | link, params | link, params, system(s) | link, params, system(s) | link, ack, source, system(s) | link, ack, system(s) | link, ack, source, system(s) | link, params, system(s) | |
| 205 | body, sender, msg/subj, attribs, recip(s) | body, sender, msg/subj, attribs, recip(s) | body, sender, msg/subj, attribs, recip(s) | body, sender, msg/subj, attribs, recip(s) | email, system(s) | body, sender, msg/subj, attribs, recip(s) | email, ack, source, system(s) | email, ack, system(s) | email, ack, source, system(s) | email, system(s) | |
| 207 | msg, sender, msg/subj, attribs, recip(s) | msg, sender, msg/subj, attribs, recip(s) | msg, sender, msg/subj, attribs, recip(s) | body, sender, msg/subj, attribs, recip(s) | msg, system(s) | body, sender, msg/subj, attribs, recip(s) | msg, ack, source, system(s) | msg, ack, system(s) | msg, ack, source, system(s) | msg, system(s) | |
| 209 | body, sender, msg/subj, attribs, recip(s) | body, sender, msg/subj, attribs, recip(s) | body, sender, msg/subj, attribs, recip(s) | body, sender, msg/subj, attribs, recip(s) | email, system(s) | body, sender, msg/subj, attribs, recip(s) | email, ack, source, system(s) | email, ack, system(s) | email, ack, source, system(s) | email, system(s) | |
| 211 | msg, sender, msg/subj, attribs, recip(s) | msg, sender, msg/subj, attribs, recip(s) | msg, sender, msg/subj, attribs, recip(s) | msg, sender, msg/subj, attribs, recip(s) | msg, system(s) | body, sender, msg/subj, attribs, recip(s) | msg, ack, source, system(s) | msg, ack, system(s) | msg, ack, source, system(s) | msg, system(s) | |
| 213 | indicator, sender, msg/subj, attribs, recip(s) | indicator, sender, msg/subj, attribs, recip(s) | indicator, sender, msg/subj, attribs, recip(s) | indicator, sender, msg/subj, attribs, recip(s) | indicator, system(s) | indicator, system(s) | indicator, ack, source, system(s) | indicator, ack, system(s) | indicator, ack, source, system(s) | indicator, system(s) | |

*Fig. 8A*

| Operand ↓ | Command | | | | | | | | | | |
|---|---|---|---|---|---|---|---|---|---|---|---|
| | 101 | 103 | 105 | 119 | 107 | 109 | 111 | 113 | 115 | 117 | ... |
| 215 | app, sender, msg/subj, attribs, recip(s) | app, sender, msg/subj, attribs, recip(s) | app, params | app, params | app, params, system(s) | app, params, system(s) | app, params, ack, source, system(s) | app, params, ack, system(s) | app, params, ack, source, system(s) | app, params, system(s) | |
| 217 | doc, sender, msg/subj, attribs, recip(s) | doc, sender, msg/subj, attribs, recip(s) | doc | doc | doc, system(s) | doc, system(s) | doc, ack, source, system(s) | doc, ack, system(s) | doc, ack, source, system(s) | doc, system(s) | |
| 219 | path, sender, msg/subj, attribs, recip(s) | path, sender, msg/subj, attribs, recip(s) | path | path | path, system(s) | path, system(s) | path, ack, source, system(s) | path, ack, system(s) | path, ack, source, system(s) | path, system(s) | |
| 221 | content, sender, msg/subj, attribs, recip(s) | content, sender, msg/subj, attribs, recip(s) | content | content | content, system(s) | content, system(s) | content, ack, source, system(s) | content, ack, system(s) | content, ack, source, system(s) | content, system(s) | |
| 223 | DB-obj, sender, msg/subj, attribs, recip(s) | DB-obj, query, sender, msg/subj, attribs, recip(s) | DB-obj | DB-obj, query | DB-obj, system(s) | DB-obj, query, system(s) | DB-obj, ack, source, system(s) | DB-obj, ack, system(s) | DB-obj, ack, source, system(s) | DB-obj, query, system(s) | |
| 225 | data, sender, msg/subj, attribs, recip(s) | data, value, sender, msg/subj, attribs, recip(s) | data, value | data, value | data, system(s) | data, value, system(s) | data, ack, source, system(s) | data, ack, system(s) | data, ack, source, system(s) | data, value, system(s) | |

*Fig. 8B*

| Operand ↓ | Command | | | | | | | | | | |
|---|---|---|---|---|---|---|---|---|---|---|---|
| | 101 | 103 | 105 | 119 | 107 | 109 | 111 | 113 | 115 | 117 | . . . |
| 227 | sem, sender, msg/subj, attribs, recip(s) | sem, cmd, sender, msg/subj, attribs, recip(s) | sem, cmd | sem, cmd | sem, system(s) | sem, cmd, system(s) | sem, ack, source, system(s) | sem, ack, system(s) | sem, ack, source, system(s) | sem, cmd, system(s) | |
| 229 | path, sender, msg/subj, attribs, recip(s) | path, sender, msg/subj, attribs, recip(s) | path | path | path, system(s) | path, system(s) | path, ack, source, system(s) | path, ack, system(s) | path, ack, source, system(s) | path, system(s) | |
| 231 | app, macro, sender, msg/subj, attribs, recip(s) | app, macro, sender, msg/subj, attribs, recip(s) | app, macro | app, macro | app, macro, system(s) | app, macro, system(s) | app, params, ack, source, system(s) | app, params, ack, system(s) | app, params, ack, source, system(s) | app, macro, system(s) | |
| 233 | "<alt> <prtscr>", sender, msg/subj, attribs, recip(s) | "<alt> <prtscr>", sender, msg/subj, attribs, recip(s) | "<alt> <prtscr>" | "<alt> <prtscr>" | objtxt, system(s) | cmds, system(s) | "<alt> <prtscr>", ack, source, system(s) | objtxt, ack, system(s) | "<alt> <prtscr>", ack, source, system(s) | "<alt> <prtscr>", system(s) | |
| 235 | macro, sender, msg/subj, attribs, recip(s) | macro, sender, msg/subj, attribs, recip(s) | macro | macro | macro, system(s) | macro, system(s) | macro, ack, system(s) | app, params, ack, system(s) | macro, ack, system(s) | macro, system(s) | |
| 237 | iodev, input, sender, msg/subj, attribs, recip(s) | iodev, input, sender, msg/subj, attribs, recip(s) | iodev, input | iodev, input | iodev, input, system(s) | iodev, input, system(s) | iodev, input, ack, system(s) | iodev, ack, system(s) | iodev, input, ack, system(s) | iodev, input, system(s) | |

*Fig. 8C*

| Operand ↓ | Command | | | | | | | | | | |
|---|---|---|---|---|---|---|---|---|---|---|---|
| | 101 | 103 | 105 | 119 | 107 | 109 | 111 | 113 | 115 | 117 | . . . |
| 239 | iodev, output, sender, subj, attribs, recip(s) | iodev, output, sender, subj, attribs, recip(s) | iodev, output | iodev, output | iodev, output, system(s) | iodev, output, system(s) | iodev, output, ack, system(s) | iodev, ack, system(s) | iodev, output, ack, system(s) | iodev, output, system(s) | |
| 241 | alert, sender, msg/subj, attribs, recip(s) | alert, sender, msg/subj, attribs, recip(s) | alert | alert | alert, system(s) | alert, system(s) | alert, ack, source, system(s) | alert, ack, system(s) | alert, ack, source, system(s) | alert, system(s) | |
| 243 | pid, signal, sender, msg/subj, attribs, recip(s) | pid, signal, sender, msg/subj, attribs, recip(s) | pid, signal | pid, signal | prname, system(s) | pid, signal, system(s) | prname, ack, source, system(s) | prname, ack, system(s) | prname, ack, source, system(s) | prname, signal system(s) | |
| 245 | container, sender, msg/subj, attribs, recip(s) | container, sender, msg/subj, attribs, recip(s) | container | container | container, system(s) | container, system(s) | container, ack, source, system(s) | container, ack, system(s) | container, ack, source, system(s) | container, system(s) | |
| 247 | progobj, data, sender, msg/subj, attribs, recip(s) | progobj, data, sender, msg/subj, attribs, recip(s) | progobj, data | progobj, data, sender, msg/subj, attribs, recip(s) | progobj, data, system(s) | progobj, data, system(s) | progobj, ack, source, system(s) | progobj, ack, system(s) | progobj, ack, source, system(s) | progobj, data, system(s) | |
| 249 | cursor, sender, msg/subj, attribs, recip(s) | cursor, sender, msg/subj, attribs, recip(s) | cursor | cursor, sender, msg/subj, attribs, recip(s) | cursor, system(s) | cursor, attribs, system(s) | ack, source, system(s) | ack, system(s) | ack, source, system(s) | cursor, attribs, system(s) | |

*Fig. 8D*

| Operand ↓ | Command | | | | | | | | | | |
|---|---|---|---|---|---|---|---|---|---|---|---|
| | 101 | 103 | 105 | 119 | 107 | 109 | 111 | 113 | 115 | 117 | ... |
| 251 | calobj, sender, msg/subj, attribs, recip(s) | calobj, sender, msg/subj, attribs, recip(s) | calobj, sender, msg/subj, attribs, recip(s) | calobj, sender, msg/subj, attribs, recip(s) | calobj, system(s) | calobj, attribs, system(s) | calobj, ack, source, system(s) | calobj, ack, system(s) | calobj, ack, source, system(s) | calobj, attribs, system(s) | |
| 253 | ABobj, sender, msg/subj, attribs, recip(s) | ABobj, sender, msg/subj, attribs, recip(s) | ABobj, sender, msg/subj, attribs, recip(s) | ABobj, sender, msg/subj, attribs, recip(s) | ABobj, system(s) | ABobj, attribs, system(s) | ABobj, ack, source, system(s) | ABobj, ack, system(s) | ABobj, ack, source, system(s) | ABobj, attribs, system(s) | |
| ... | | | | | | | | | | | |

| | appname | Application Description | Status |
|---|---|---|---|
| 8002a | source | Configurable MS ID | Registered |
| 8002b | profile | % and # operator object | Registered |
| 8002c | email | Electronic mail | Registered |
| 8002d | calendar | Electronic calendar | Registered |
| 8002e | ab | Electronic address book | Registered |
| 8002f | phone | Electronic phone | Registered |
| 8002g | emergency | Emergency use | Registered |
| 8002h | loc | LBX locational data sharing | Registered |
| 8002i | rfid | Radio Frequency Identification | Registered |
| 8002j | hotspot | Wifi/Wimax/Xan | Registered |
| 8002k | services | Published services for service propagation | Registered |
| 8002l | statistics | MS statistics (may be shared between MSs) | Registered |
| 8002m | shoot | Aim MS and shoot | Registered |
| 8004a | traffic | Traffic Reports | RFP |
| 8004b | appliance | Appliance Control | RFP |
| 8004c | acctmgt | Account Management (ATM, Banking) | RFP |
| 8004d | transport | Public Transportation (Bus, Taxi, Air, Train) | RFP |
| 8004e | carpool | Automotive "car-pooling" | RFP |
| 8004f | advertise | Advertising | RFP |
| 8004g | news | News | RFP |
| 8004h | media | Video, Pictures | RFP |
| 8004i | parking | Parking lot awareness | RFP |
| 8006a | employ | Employment, Job Awareness | Presented |
| 8006b | real | Real Estate | Presented |

| Field 1100k reference | Description |
|---|---|
| appfld.shoot.purpose | Purpose used to process shoot action |
| appfld.shoot.params.X | Optional parameters for the shoot action |
| appfld.shoot.fuzzyD | Estimated distance to target |
| appfld.shoot.fuzzyT | Size of target |
| appfld.shoot.maxTargs | Maximum # of targets for single shoot action |
| appfld.shoot.mag.X | Inertial Measurement Unit sensing history |
| appfld.shoot.confirm | Boolean for whether to confirm shot by target(s) |
| ... | |

| App | Scenario | Result |
|---|---|---|
| AD | Configured special event causes process of ADs | AD MADRs Expressions checked; MADR(s) processed when Expression = True |
| OGM | Unanswered inbound phone call triggers event to process OGMs | OGM MADRs Expressions checked; MADR(s) processed when Expression = True |
| OCM | Active outbound call; OCM action causes event to process OCMs | OCM MADRs Expressions checked; MADR(s) processed when Expression = True; Call subsequently terminated |
| OCM | Active inbound call; OCM action causes event to process OCMs | OCM MADRs Expressions checked; MADR(s) processed when Expression = True; Call continues normally |
| email | Email sent/received at local MS with COM-L enabled | COM-L-email MADRs Expressions checked; MADR(s) processed when Expression = True |
| email | Email sent with COM-R enabled | COM-R for email application MADRs presented to sender for selection; selected MADR(s) appended to email and sent to recipient(s) for processing |
| calendar | Calendar item (e.g. meeting notice) sent/received at local MS with COM-L enabled | COM-L-calendar MADRs Expressions checked; MADR(s) processed when Expression = True |
| calendar | Calendar item (e.g. meeting notice) sent with COM-R enabled | COM-R-cal MADRs presented to sender for selection; selected MADR(s) appended to calendar item and sent to recipient(s) for processing there |
| phone | Call made/received with COM-L enabled | COM-L-phone MADRs Expressions checked; MADR(s) processed when Expression = True |
| phone | Call made with COM-R enabled | COM-R-phone MADRs presented to caller for selection before placing call; selected MADR(s) appended to out-of-band call parameters and sent to callee(s) for processing there |
| ... | ... | ... |

*Fig. 12D*

SYSTEM AND METHOD FOR VECTOR PROCESSING ON BEHALF OF IMAGE APERTURE AIM

CROSS-REFERENCES TO RELATED APPLICATIONS

This application is a continuation of application Ser. No. 14/941,398 filed Nov. 13, 2015 and entitled “System and Method for Confirming Data Processing System Target(s)” which is a continuation of application Ser. No. 14/551,437 (now U.S. Pat. No. 9,204,275 issued Dec. 1, 2015) filed Nov. 24, 2014 and entitled “System and Method for Targeting Data Processing System(s) With Data” which is a continuation of application Ser. No. 14/217,661 (now U.S. Pat. No. 8,942,693 issued Jan. 27, 2015) filed Mar. 18, 2014 and entitled “System and Method for Targeting Data Processing System(s) With Data” which is a continuation of application Ser. No. 12/807,806 (now U.S. Pat. No. 8,761,751 issued Jun. 24, 2014) filed Sep. 14, 2010 and entitled “System and Method for Targeting Data Processing System(s) With Data” which is a continuation in part of application Ser. No. 12/800,394 (now U.S. Pat. No. 8,566,839 issued Oct. 22, 2013) and Ser. No. 12/800,395 (now U.S. Pat. No. 8,750,841 issued Jun. 10, 2014) each filed May 14, 2010 and entitled “System and Method for Automated Content Presentation Objects” and “System and Method for Automatically Leaving an Outgoing Caller Message”, respectively, which are each a continuation in part of application Ser. No. 12/590,831 (now U.S. Pat. No. 8,634,796 issued Jan. 21, 2014) filed Nov. 13, 2009 and entitled “System and Method for Location Based Exchanges of Data Facilitating Distributed Locational Applications” which is a continuation in part of application Ser. No. 12/287,064 (now U.S. Pat. No. 8,639,267 issued Jan. 28, 2014) filed Oct. 3, 2008 and entitled “System and Method for Location Based Exchanges of Data Facilitating Distributed Locational Applications” which is a continuation in part of application Ser. No. 12/077,041 (now U.S. Pat. No. 8,600,341 issued Dec. 3, 2013) filed Mar. 14, 2008 and entitled “System and Method for Location Based Exchanges of Data Facilitating Distributed Locational Applications”, hereinafter referred to as the parent applications. This application contains an identical specification to Ser. No. 14/941,398. Only the title, claims and abstract differ.

TECHNICAL FIELD

The present disclosure relates generally to communicating data from one data processing to another, and more particularly to communicating data from a first data processing system to a second data processing by physically pointing (aiming) the first data processing (e.g. Mobile data processing System (MS)) at the second data processing system (e.g. MS) and performing a “shoot” action.

BACKGROUND

Different users use different types of Mobile data processing Systems (MSs) which are also called mobile devices: laptops, tablet computers, Personal Computers (PCs), Personal Digital Assistants (PDAs), cell phones, automobile dashboard mounted data processing systems, shopping cart mounted data processing systems, mobile vehicle or apparatus mounted data processing systems, Personal Navigational Devices (PNDs), Android enabled devices, iPhones (iPhone is a trademark of Apple, Inc.), iPads (iPad is a trademark of Apple, Inc.), and other various handheld mobile data processing systems, etc. There are many applications which use various message formats to carry out a variety of functionality. Many of these applications involve communicating data between systems, for example over a wireless wave spectrum. Targeting a receiving system, for example over Radio Frequency (RF) waves, typically involves using a destination address in one form or another. It is possible that many receiving data processing systems in the vicinity “can see” the data which is being sent, in particular as wireless spectrum advances increase coverage distance. Processing at the receiving data processing systems may use destination address information and/or originator information to filter out data packets which are not meant to be received and processed. Many wireless wave spectrums, for example RF waves, radiate out uncontrollably in all directions. For security and privacy reasons, it is desirable to minimize the number of data processing systems in the vicinity that may “see” certain data. There are also fun gaming and useful business applications for aiming a mobile data processing system at a target data processing system and “shooting” it to initiate subsequent interaction. It is desirable to control the direction of data carried on RF waves without relying on target address processing.

Intuitive user interfaces are preferred in many technology areas. Easing a learning curve and leveraging instinctive human behavior is preferred. Recent touch user interfaces have demonstrated that a user interface can be made natural and intuitive, thereby enhancing the user experience. Application user interfaces should always strive for improved user interfaces. Physically pointing, aiming, or directing is an instinctive human action.

User interfaces can also be fun to use, thereby further improving the user experience. For example, Bump Technologies provides a “cool” Bump application for communicating data from one MS to another. Bump is a quick and easy way to send data between MSs by simply bumping them together. Data such as phone number, photos, or friend information can be exchanged with just a bump. The detectable simultaneous bump of MSs is used to connect the MSs together for communicating data. A drawback of bump processing is that each MS must be right next to each for the bump contact. There can be a variety of reasons you may want to send or receive data from a MS, but also not want to bump or come in contact with that MS (e.g. germs, inconvenient locations of the bumper and/or bumpee at the time of wanting to bump, don’t want bumper or bumpee to know at the time of bump that they are being bumped, etc). The bump methodology does provide an interesting approach however for secure targeting of data without relying on addressing.

Location Based Exchanges (LBX) MS embodiments are heavily involved in communicating data between systems. For example, MSs in the vicinity of each other may communicate directly and wirelessly with each other. A MS may also communicate directly and wirelessly with a data processing system that may be in the vicinity. It is intuitive for a user to point to, or aim at, something they wish to act upon, perhaps preferably from a distance. It is perhaps fun for a user to physically point to, or aim at, something (e.g. data processing system) they wish to act upon from some distance. It is desirable to make a user interface fun and intuitive. Providing more secure data communications, and providing means for targeting of data using uncontrollable/ non-directional waves (e.g. radio, sound, etc) makes such a user interface more desirable.

SUMMARY

Disclosed is a system and method for targeting data processing system(s) with data by aiming a sending data processing system at a receiving data processing system and performing a shoot action. In a preferred embodiment, aiming information is used to qualify a shoot action for targeting of the data. Aiming information is transmitted from the sending data processing system to receiving data processing systems in the vicinity for determining whether or not a receiving data processing system was aimed at by the sending data processing system, for example to direct data. Data may be included (e.g. sent) with the shoot action, or subsequently sent after the shoot action. Data may be immediately received after the shoot action, or subsequently received after the shoot action. Various embodiments or protocols govern processing initiated by a shoot action. In one example, a user "shoots" a target data processing system by first aiming his sending data processing system at the target data processing system. After aiming, the sending user "shoots" at the target data processing system. Sent to the target data processing system is a data packet containing aiming information including location information of the sending data processing system, directional and posture information for determining a target of the shoot action, distance information for determining a distance of the shoot action, and target size for determining the inclusion of targeted data processing system(s). Embodiments are also available for lobbing, or curving, a shoot action to a target data processing system, for example to go around or avoid other data processing systems that may be viewed as "in the way", or to emulate a specific user action in context of a particular application (e.g. casting a fishing rod, swinging a racket, etc). The disclosed techniques may be incorporated to any of the variety of wave forms discussed in parent applications. Permissions, charters, Message Area Data Record (MADR) objects, and other configurations may be used to govern processing that occurs thereafter.

A primary advantage herein is to further enhance security of directing data between mobile data processing systems by using aiming information together with address information in order to enforce directing data by radio waves (or sound waves or the like). Only the targeted data processing system(s) become candidate for interaction. The sending and receiving data processing system bind for subsequent interaction through a receiving data processing system confirming the aim and shoot action by a sending data processing system. Coupling the physical aim of an intended recipient with other recipient identifier information ensures a high level of security over uncontrollable/non-directional wave forms (e.g. Radio Frequency (RF), blue-tooth, sound, any radio wave carried protocol, or other wave form requiring clarification with data for what is being pointed to (aimed at)).

It is an advantage to provide a MS with options for "shooting" other data processing systems. A MS may be equipped with infrared interfaces and/or laser interfaces, as well as uncontrollable/non-directional wave form interfaces. Because of the way MSs are designed, held, or carried, it may be undesirable to shoot a directed conventional infrared or laser guided wave form to another MS, for example like shooting (i.e. operating) a remote controlled television or the methods of laser tag games. Also, non-directional wave forms (e.g. RF, sound, etc) have an advantage of not requiring a direct line of sight to signal receiving means. There is no guarantee a direct line of sight will be available to the receiving MS, or that the receiving MS has well placed signal reception means. However, it still may be useful to equip a MS with infrared, a laser, or another directed wave form for the purpose of shooting data to data processing systems which provide an easy target, for example when the housing is made of appropriate receptor means or receiving material. A cell phone can shoot another cell phone with data, or a cell phone can shoot a remote data processing system (e.g. for a transaction) with data.

It is an advantage to deploy Virtual Vector (VV) determination for data communications between MSs. A VV is defined herein as a vector implied (i.e. virtual) in non-directional wave forms (e.g. Radio Frequency, Sound, etc) for carrying data, wherein the vector starting point is initiated at a sending MS and then determined geometrically (or geodetically, geocentrically, Euclidian-ally, or like methods) for the intended endpoint (e.g. the receiving MS). Vector characteristics are mathematically determined as well known to those skilled in the art when calculating characteristics of Euclidean vectors, spatial vectors, geometric vectors, or the like. A variety of different well known mathematical models and coordinate systems may be used such as geocentric, geodetic, Cartesian, polar, etc, or combinations thereof.

While it is not the intent to limit the present disclosure to a particular embodiment, one preferred three dimensional model for VV determination is a geodetic coordinate system using earth latitude, longitude and an altitude (alternately elevation, or the like). Dynamic elliptical latitude and longitude adjustments for earth's non-conformance to a perfect sphere are accounted for in modern Global Positioning System (GPS) deployments. While such units are good for identifying points in space for substantially long distances, they may not be so good for short distances between MS users. Preferably, a precise localized mathematical model and coordinate system is used after determining reference points to an earth mathematical model. "Survey grade" GPS to 1 cm accuracy is more commonplace today than ever before, and equipment is smaller and cheaper. Latest survey improvements provide computerized theodolites (optical survey instrument) such as "Total Stations" which also include an Electronic Distance Measurement device (EDM). Since their introduction, total stations have made the technological shift from being optical-mechanical devices to being fully electronic with an onboard data processing system. In fact, modern total stations no longer require a reflector or prism (used to return light pulses for distancing) to return distance measurements. Useful total station processing with respect to "shooting" disclosed herein can be incorporated into a MS, with or without EDM functionality. Also, all available geometric measurements are determined for a sending MS, and they are transmitted to a receiving MS for facilitating a most accurate vector determination. In another embodiment, high precision triangulation is performed for identifying, or adjusting, MS locations, as disclosed in parent applications. Recursive Whereabouts Determination (RWD) is also leveraged to provide most accurate location and position information.

Another advantage is maintaining of statistical data for why, how, when, and where shoot actions take place, and who is involved with related processing. This provides means for reporting.

Yet another advantage is using permissions and/or charters to govern aspects of shoot action processing, for example governing why, how, when and where to process shoot actions at a sending or receiving MS.

Another advantage is providing a shoot platform wherein a vast range of differing applications are easily "plugged into" the implementation. Many applications are supported for participating in shoot actions.

Further features and advantages of the disclosure, as well as the structure and operation of various embodiments of the disclosure, are described in detail below with reference to the accompanying drawings. In the drawings, like reference numbers generally indicate identical, functionally similar, and/or structurally similar elements. Dashed outlines (e.g. process blocks, data record fields) may be used in the drawings to highlight, or indicate optional embodiments. None of the drawings, discussions, or materials herein is to be interpreted as limiting to a particular embodiment. The broadest interpretation is intended. Other embodiments accomplishing same functionality are within the spirit and scope of this disclosure. It should be understood that information is presented by example and many embodiments exist without departing from the spirit and scope of this disclosure.

DESCRIPTION OF DRAWINGS

There is no guarantee descriptions in this specification explain every novel feature found in the drawings. Parent application drawings have been included herein for pointing out some present disclosure details in light of parent applications. The present disclosure will be described with reference to the accompanying drawings, wherein:

FIGS. 7A through 7E depict the preferred embodiment BNF grammar disclosed in detail in parent applications;

FIGS. 8A through 8E depict a preferred embodiment set of command and operand candidates referenced in charters executed for shoot processing, as described in detail in parent applications;

FIG. 11A depicts a LBX application fields implementation status table described in detail in parent applications;

FIG. 11B depicts a section description of the registered LBX shoot application fields;

FIG. 12D depicts a table to facilitate explanation of message repository data processing;

DETAILED DESCRIPTION

Figure 1:
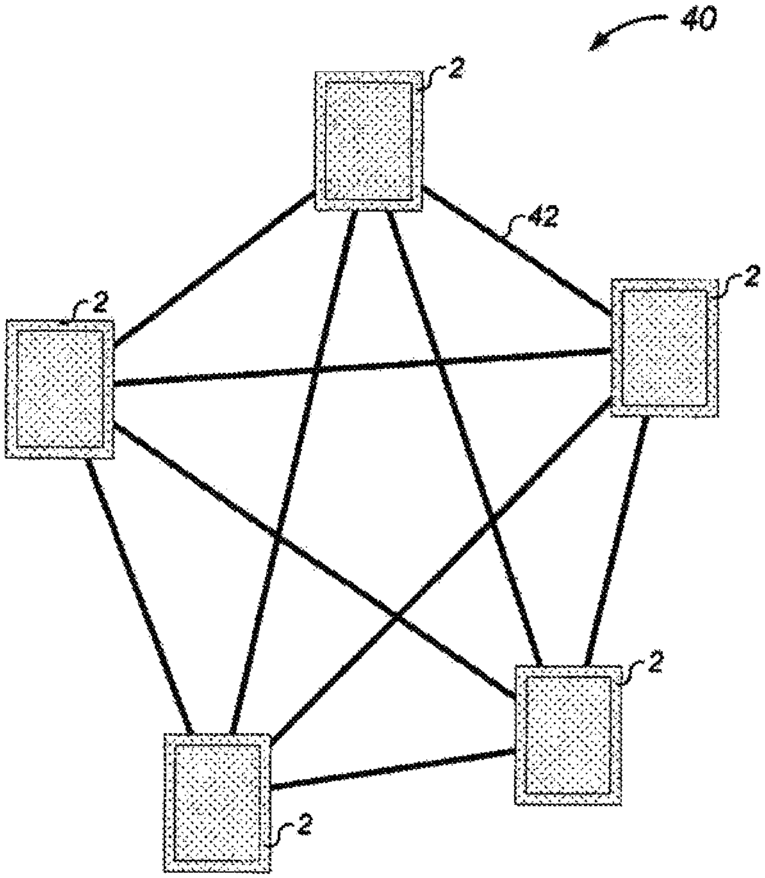
FIG. 1 depicts a Location Based eXchanges (LBX) architectural illustration for discussing the present disclosure.

With reference now to detail of the drawings, the present disclosure is described. Obvious error handling is omitted from the flowcharts in order to focus on key aspects. Obvious error handling includes database I/O errors, field validation errors, errors as the result of database table/data constraints or unique keys, data access errors, communications interface errors or packet collision, hardware failures, checksum validations, bit error detections/corrections, and any other error handling as well known to those skilled in the relevant art in context of this disclosure. A thread synchronization scheme (e.g. semaphore use) is assumed where appropriate. A semicolon may be used in flowchart blocks to represent, and separate, multiple blocks of processing within a single physical block. This allows simpler flowcharts with fewer blocks in the drawings by placing multiple blocks of processing description in a single physical block of the flowchart. Flowchart processing is intended to be interpreted in the broadest sense by example, and not for limiting methods of accomplishing the same functionality. Preferably, field validation in the flowcharts checks for SQL injection attacks, communications protocol sniff and hack attacks, preventing of spoofing system or MS addresses, syntactical appropriateness, and semantics errors where appropriate. Disclosed user interface processing and/or screenshots are also preferred embodiment examples that can be implemented in various ways without departing from the spirit and scope of this disclosure. Alternative user interfaces (since this disclosure is not to be limiting) will use similar mechanisms, but may use different mechanisms without departing from the spirit and scope of this disclosure. Novel features disclosed herein need not be provided as all or none. Certain features may be isolated in some embodiments, or may appear as any subset of features and functionality in other embodiments.

FIG. 1 depicts a Location Based eXchanges (LBX) architectural illustration for discussing the present disclosure. LBX MSs are peers to each other for locational features and functionality. An MS 2 communicates with other MSs without requiring a service for interaction. For example, FIG. 1 depicts a wireless network 40 of five (5) MSs wherein each is able to directly communicate with others that are in the vicinity. In a preferred embodiment, communications are limited reliability wireless broadcast datagrams having recognizable data packet identifiers. In another embodiment, wireless communications are reliable transport protocols carried out by the MSs, such as TCP/IP. An MS 2 can "shoot" data to any of its peers in the vicinity, for example over a mathematically deduced VV RF path 42, and the "shot" MS can return data back with a mathematically deduced VV RF path as well. Regardless of embodiment, a communication path 42 between any two MSs is understood to be potentially bidirectional, for example for the shooting data processing system and the shot data processing system. Shooting does involve the shooting user to aim the shooting MS at a target data processing system.

Figure 2:
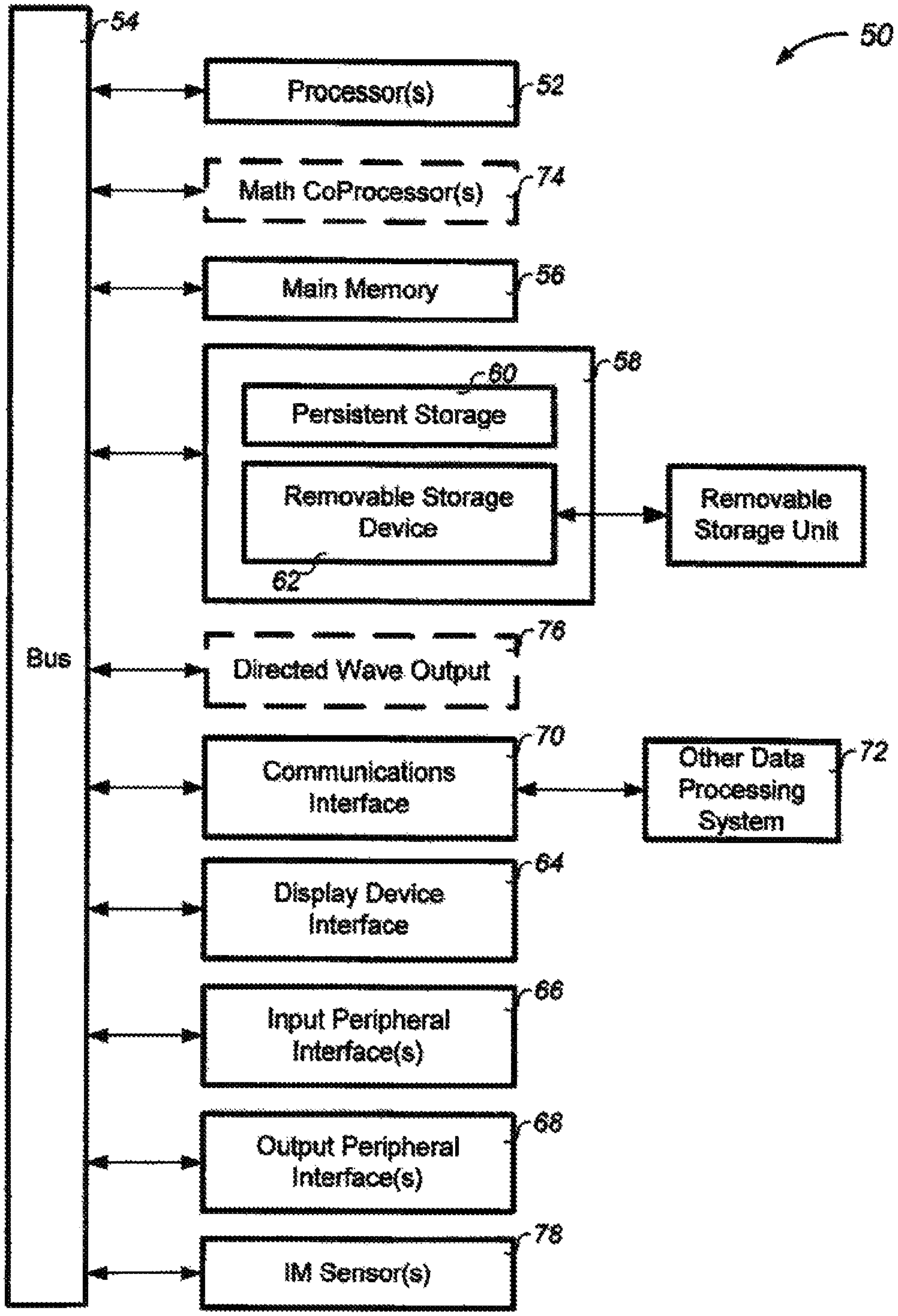
FIG. 2 depicts a block diagram of a data processing system useful for implementing a MS, a service, or any data processing system carrying out disclosed processing or functionality.

FIG. 2 depicts a block diagram of a data processing system useful for implementing a MS, a service, or any data processing system carrying out disclosed processing or functionality. In one embodiment, a MS 2 is a data processing system 50. Data processing system 50 includes at least one processor 52 (e.g. Central Processing Unit (CPU)) coupled to a bus 54. Bus 54 may include a switch, or may in fact be a switch 54 to provide dedicated connectivity between components of data processing system 50. Bus (and/or switch) 54 is a preferred embodiment coupling interface between data processing system 50 components. The data processing system 50 also includes main memory 56, for example, random access memory (RAM). Memory 56 may include multiple memory cards, types, interfaces, and/or technologies. The data processing system 50 may include secondary storage devices 58 such as persistent storage 60, and/or removable storage device 62, for example as a compact disk, floppy diskette, USB flash, or the like, also connected to bus (or switch) 54. In some embodiments, persistent storage devices could be remote to the data processing system 50 and coupled through an appropriate communications interface. Persistent storage 60 may include flash memory, disk drive memory, magnetic, charged, or bubble storage, and/or multiple interfaces and/or technologies, perhaps in software interface form of variables, a database, shared memory, etc.

The data processing system 50 may also include a display device interface 64 for driving a connected display device (not shown). The data processing system 50 may further include one or more input peripheral interface(s) 66 to input devices such as a keyboard, keypad, Personal Digital Assistant (PDA) writing implements, touch interfaces, mouse, voice interface, or the like. User input ("user input", "user events" and "user actions" used interchangeably) to the data processing system are inputs accepted by the input peripheral interface(s) 66. The data processing system 50 may still further include one or more output peripheral interface(s) 68 to output devices such as a printer, facsimile device, or the like. Output peripherals may also be available via an appropriate interface.

Data processing system 50 will include communications interface(s) 70 for communicating to another data processing system 72 via analog signal waves, digital signal waves, infrared proximity, copper wire, optical fiber, other wave spectrums, or any reasonable communication medium. A MS may have multiple communications interfaces 70 (e.g. cellular connectivity, 802.x, etc). Other data processing system 72 may be an MS. Other data processing system 72 may be a service.

Data processing system programs (also called control logic, or processing code) may be completely inherent in the processor(s) 52 being a customized semiconductor, or may be stored in main memory 56 for execution by processor(s) 52 as the result of a read-only memory (ROM) load (not shown), or may be loaded from a secondary storage device into main memory 56 for execution by processor(s) 52. Such programs, when executed, enable the data processing system 50 to perform features of the present disclosure as discussed herein. Accordingly, such data processing system programs represent controllers of the data processing system.

In some embodiments, the disclosure is directed to a control logic program product comprising at least one processor 52 having control logic (software, firmware, hardware microcode) stored therein. The control logic, when executed by processor(s) 52, causes the processor(s) 52 to provide functions of the disclosure as described herein. In another embodiment, this disclosure is implemented primarily in hardware, for example, using a prefabricated component state machine (or multiple state machines) in a semiconductor element such as a processor 52.

Those skilled in the art will appreciate various modifications to the data processing system 50 without departing from the spirit and scope of this disclosure. A data processing system, and more particularly a MS, preferably has capability for many threads of simultaneous processing which provide control logic and/or processing. These threads can be embodied as time sliced threads of processing on a single hardware processor, multiple processors, multicore processors, Digital Signal Processors (DSPs), or the like, or combinations thereof. Such multi-threaded processing can concurrently serve large numbers of concurrent MS tasks. Concurrent processing may be provided with distinct hardware processing and/or as appropriate software driven time-sliced thread processing. Those skilled in the art recognize that having multiple threads of execution on an MS may be accomplished in different ways in some embodiments. This disclosure strives to deploy software to existing MS hardware configurations, but disclosed software can be deployed as burned-in microcode to new hardware of MSs.

Data processing aspects of drawings/flowcharts are preferably multi-threaded so that many MSs and applicable data processing systems are interfaced with in a timely and optimal manner. Data processing system 50 may also include its own clock mechanism (not shown), if not an interface to an atomic clock or other clock mechanism, to ensure an appropriately accurate measurement of time in order to appropriately carry out time related processing.

Further provided to data processing 50 may be one or more math coprocessor(s) 74 for providing a set of interfaces for very fast mathematical calculations. Those skilled in the art appreciate that optimal mathematical calculation (e.g. floating point) speeds are best accomplished in an interfaced customized hardware component.

Data processing system 50 may also include one or more directed wave output interfaces 76, for example to shoot using well known infrared or laser wave forms that are already aim-able in nature. For example, a smartphone 2 can shoot other data processing systems with a directed infrared or laser wave form containing data. Data processing system 50 may also include one or more directed wave input interfaces (not shown), for example to receive data from a remote shooting MS. A directed wave input interface is preferably maximized over the MS housing and may form the MS housing itself.

Data processing system 50 will include one or more Inertial Measurement sensor(s) 78 (each called Inertial Measurement Unit (IMU)) to detect MS yaw, pitch and roll as well as IMU forces when the MS is in motion, for example at the time of shooting. Sensor(s) include, and are not limited to, yaw/pitch/roll sensing, accelerometer sensing, gyroscopes for IMU sensing, tri-axial gyroscope, tri-axial accelerometer, compass, and any like sensor means for three dimensional or two dimensional MS posture and/or motion sensing.

Data processing system 50 may further include Electronic Distance Measurement EDM means (device not shown) for targeting with a known distance to the subject. When an EDM is used, the MS of FIG. 2 can transmit the known distance measurement along with other shoot action data for accurate target determination.

Figure 18A:
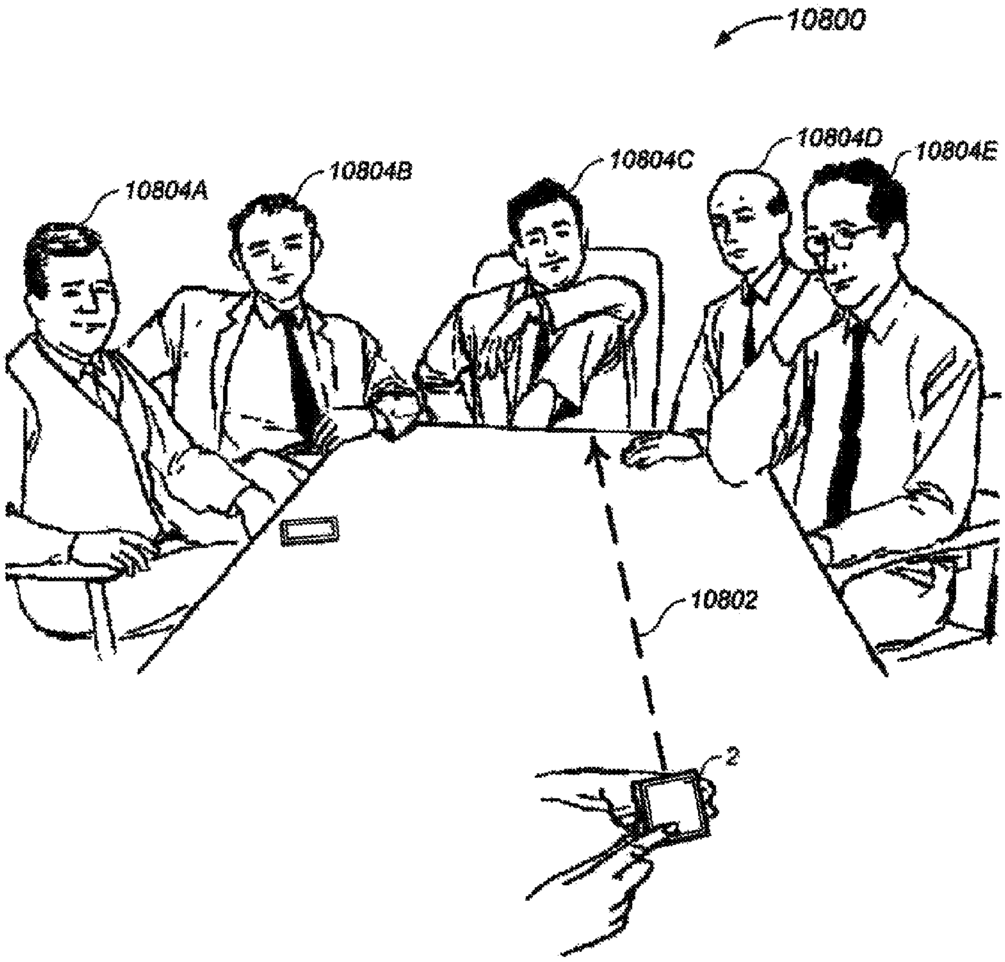
FIG. 18A depicts an illustration describing one preferred embodiment of aiming a MS at another MS and shooting the MS with data, in accordance with the present disclosure.

With reference now to FIG. 18A, depicted is an illustration describing one preferred embodiment of aiming a MS at another MS and shooting the MS with data. Consider a guided aim shooting scenario 10800, for example at a meeting (i.e. guided by MS hardware indication or software graphic indication). Person 10804A has a MS as shown laying on the table in front of him, person 10804B has a MS in a shirt pocket, person 10804C has a MS in his jacket pocket behind his leg, person 10804D does not have a MS with him, and person 10804E has a MS under the table in his left hand. The shooting person holds the MS 2 as shown, aims at the desired target (i.e. MS known to be in jacket pocket of person 10804C) and performs a user action to shoot data to the MS of person 10804C, perhaps for a variety of reasons as disclosed. In some embodiments, an aim indicator to facilitate aiming is manufactured as part of the MS housing so as to guide a user in how to aim the MS. In other embodiments, the MS is placed into a mode by the user for displaying an aim graphic, and subsequently depicts an aim indicator graphic (e.g. arrow) to facilitate aiming the MS by a user. Scenario 10800 demonstrates an embodiment wherein a plane of the MS and the top middle of the MS may be used to (do a visually perceptible) aim at another MS in order to shoot it. A VV 10802 is determined by comparing known aiming information of the shooting MS with anticipated end point information determined. Preferably, the receiving MS determines if it is candidate for being a valid VV end point when using the aiming information received, however other embodiments may involve the shooting MS or another data processing system to help make the determination. When MS 2 shoots a non-directional wave form (e.g. RF waves, sound, etc), all participating MSs in the vicinity may process the shoot attempt, but only a valid VV end point targeted MS will continue processing the data.

The MS 2 may also shoot infrared or laser at another MS, but this requires a direct line of sight. Person 10804C intentionally blocks the direct line of sight with his leg to show that his MS does indeed determine to be the valid target without a direct line of sight when using RF or another non-directional wave form. Similarly, the MS of person 10804B or 10804E, although hidden from a line of sight from an aimed MS, can also be successfully shot because non-directional wave forms (e.g. RF, sound, etc) need no direct line of sight. Of course, the MS of person 10804A which is lying in plain sight on the table could alternately be shot with data using conventional infrared or laser assuming appropriate receptor means is on his MS. Thus, non-directional wave forms can potentially shoot data processing systems with a VV through walls, windows, objects, people, or other obstacles while directional wave forms (e.g. laser, infrared) cannot. It is also advantageous to leverage RF wave forms already available to a MS rather than add unnecessary directional wave form functionality which may increase the size of a MS, increase the MS cost, etc.

Figure 18B:
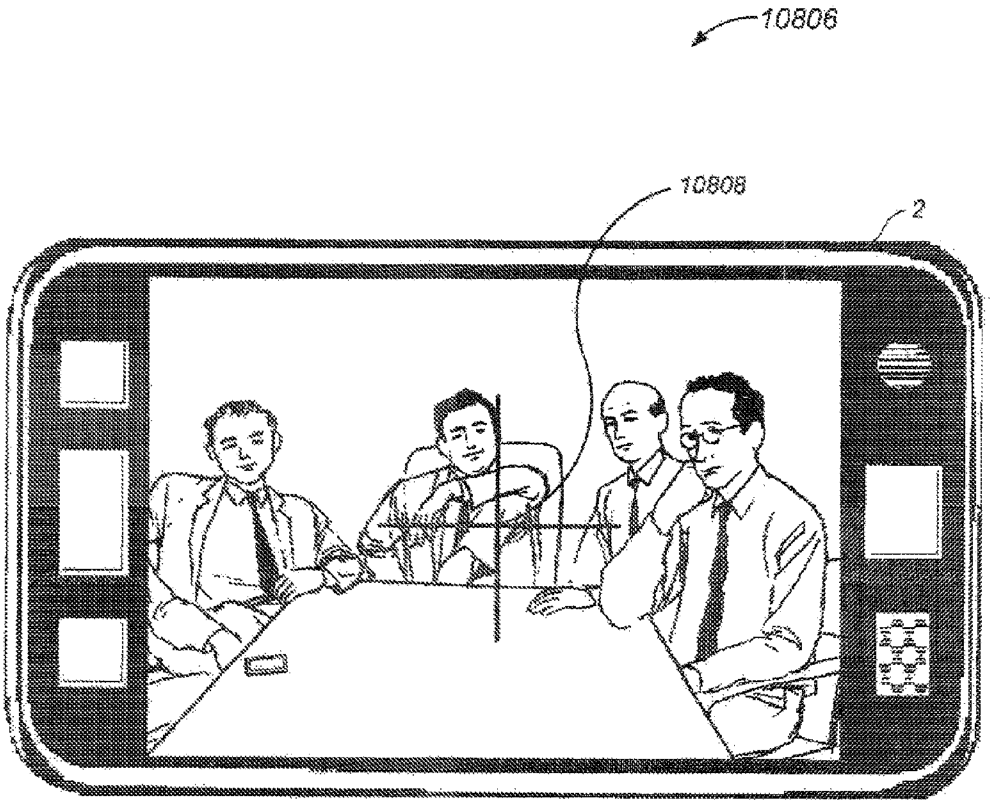
FIG. 18B depicts an illustration describing one preferred embodiment of aiming a MS at another MS and shooting the MS with data, in accordance with the present disclosure.

FIG. 18B depicts an illustration describing one preferred embodiment of aiming a MS at another MS and shooting the MS with data. Consider an image aperture aim shooting scenario 10806, for example at the same meeting and setting of FIG. 18A. The shooting person holds the MS 2 as shown to display the targeted MS through an image aperture such as when taking a photograph, video recording, or the like. The shooting person (visually perceptible) aims at the desired target (i.e. MS known to be in jacket pocket of person 10804C) and performs a user action to shoot data to the MS of person 10804C, perhaps for a variety of reasons as disclosed herein. In some embodiments, an aim indicator (e.g. cross hairs 10808) is lightly embossed on the view finder to facilitate aiming (i.e. manufactured as part of the MS housing) so as to guide a user in how to aim the MS. In other embodiments, the MS is placed into a mode by the user for displaying an aim graphic, and subsequently depicts an aim indicator graphic (e.g. cross hairs 10808, dot, graphical sight indicator, etc) to facilitate aiming the MS by a user. Scenario 10806 demonstrates an embodiment wherein an image system aperture of the MS is used to aim the MS at a target. A VV 10802 is determined analogously to scenario 10800 by comparing known aiming information of the shooting MS with anticipated end point information determined. The MS 2 may also shoot infrared or laser at another MS in an analogous manner as discussed for FIG. 18A.

Figure 18C:
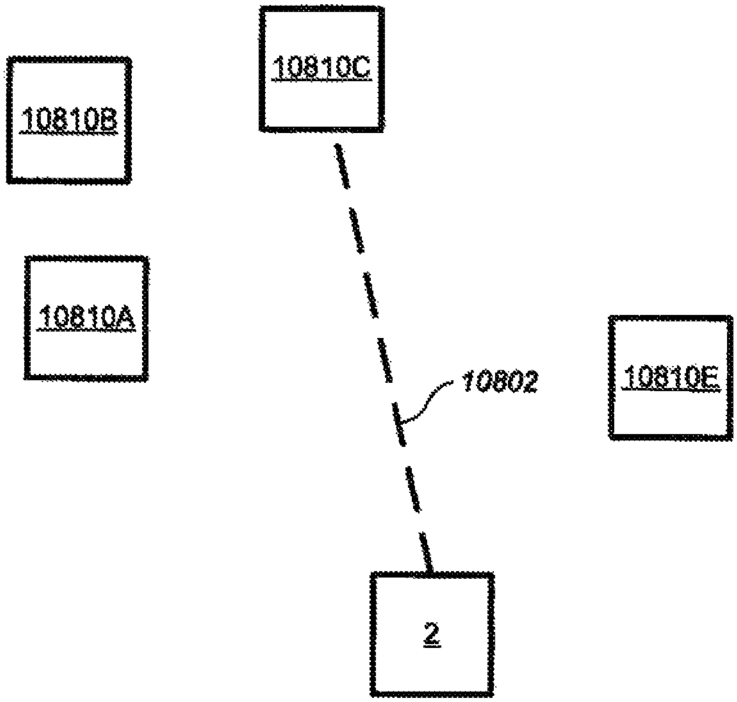
FIG. 18C depicts an illustration describing a top view overview for discussing shoot processing of FIGS. 18A and 18B.

FIG. 18C depicts an illustration describing a top view for discussing shoot processing of FIGS. 18A and 18B, for example from a ceiling vantage point. Assuming MS 10810A of person 10804A, MS 10810B of person 10804B, MS 10810C of person 10804C and MS 10810E of person 10804E contain processing disclosed herein, each MS 10804 (all four of them) will receive the RF data from the MS 2. MS 10810A, 10810B and 10810E will determine they are not a good match for the VV 10802 end point from the shooting MS 2. MS 10810C will determine that it is a good VV 10802 end point and subsequent processing will occur as disclosed, depending on the type of shoot action performed.

Figure 18D:
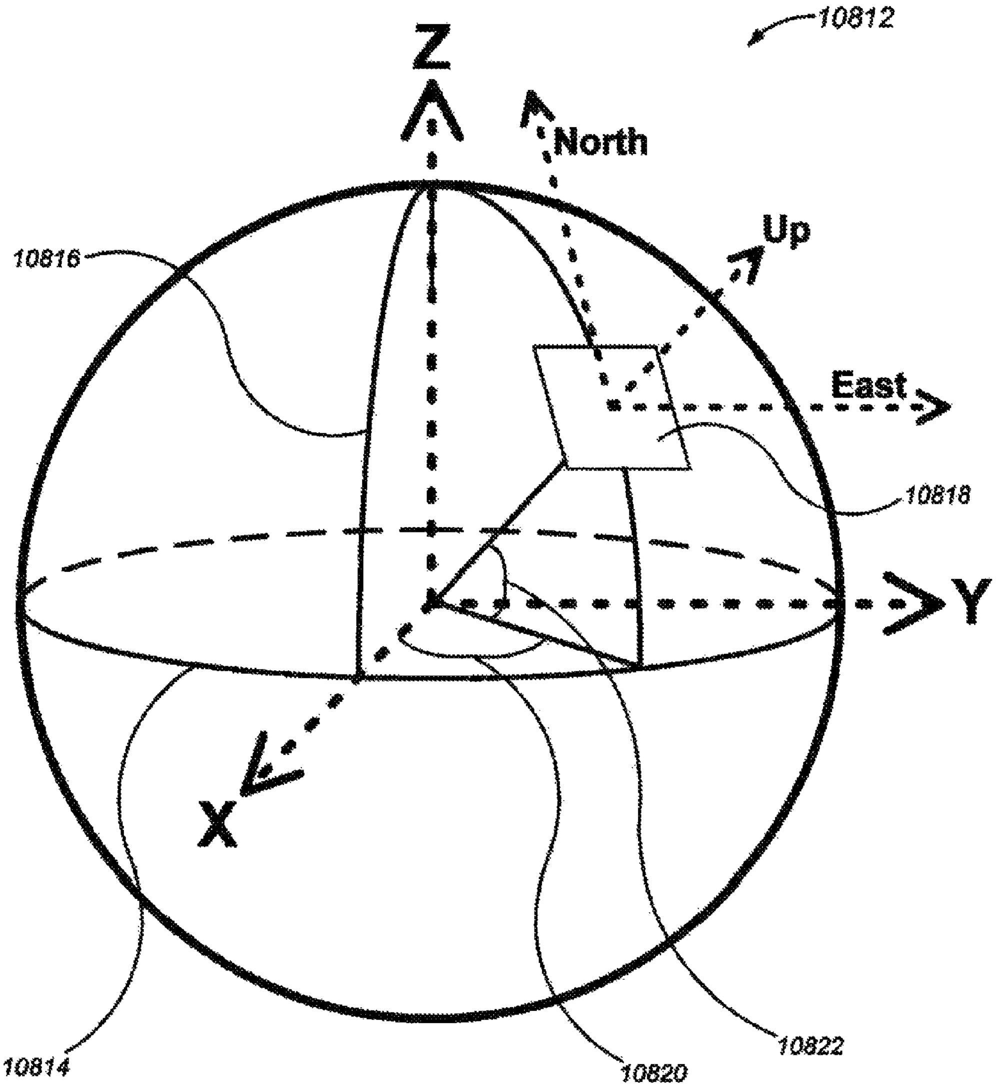
FIG. 18D depicts an illustration for discussing and describing preferred embodiments for mathematical models used in carrying out shoot processing.

FIG. 18D depicts an illustration for discussing and describing preferred embodiments for mathematical models used in carrying out shoot processing. A globally referenced coordinate system 10812 is preferred for a starting point, but there are many different mathematical models that can be deployed depending on model errors, VV distances for particular applications, MS capabilities, implementation preferences, and other considerations. A preferable earth model uses latitude 10822 (angle between the equatorial plane 10814 and a line that runs from the reference ellipsoid center to surface, for example to the center of plane 10818), and longitude 10820 (angle east or west of prime meridian reference 10816 between the two poles to another meridian that passes through a point, for example to the center of plane 10818) for a reference ellipsoid to approximate shape to account for flattening of the poles and bulging of the equator. Plane 10818 is theoretically tangent to the earth surface at a single point and perpendicular (perhaps with ellipsoid adjustment) to the line running from its center point to the center of the earth. Altitude or elevation may be measured from the center of plane 10818 to the center of a translated parallel plane in the "Up" direction as shown (i.e. further away from the earth's center), perhaps using sea level as the reference. Latitude, longitude and elevation (or altitude) are well known to those skilled in the art. Survey grade systems are capable to 1 cm accuracy, however a selected planar local coordinate system at plane 10818 may be more practical for optimal accuracy, in particular for short distance vectors which do not need to account for earth curvature or terrain. Latitude, longitude and elevation provide at least good starting reference point coordinates for relative finer measurements.

Other positioning models may be used for simplification such as an overall Cartesian coordinate system (represented by large X, Y, Z axis) or polar coordinate system. A planar coordinate system at plane 10818 may also use a Cartesian coordinate system (represented by North, East, Up axis) or polar coordinate system.

Figure 18E:
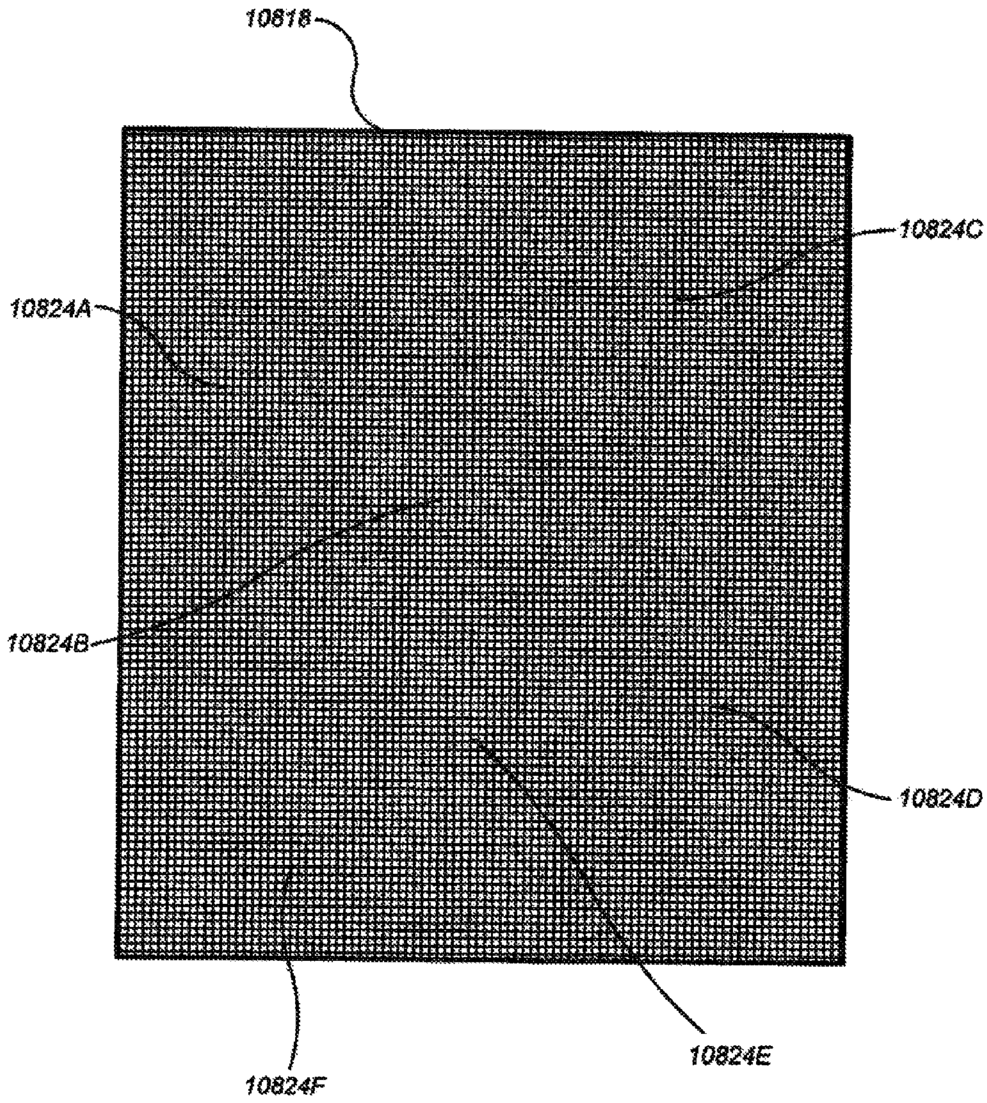
FIG. 18E depicts an illustration for describing a preferred localized coordinate system used to carry out shoot processing.

FIG. 18E depicts an illustration for describing a preferred localized coordinate system used to carry out shoot processing. In one preferred embodiment, plane 10818 is a two dimensional plane with fine Cartesian coordinate system measurements (X and Y axis) wherein one axis points to North and the other points to East with a particular point at the origin. In another preferred embodiment, plane 10818 is a North and East plane of a three dimensional fine Cartesian coordinate system (X, Y and Z axis) wherein the additional axis points "Up" for altitude (or elevation). A two dimensional or three dimensional polar coordinate system may be used. Plane 10818 includes one or more known location points which map directly to a point described by a latitude and longitude (and elevation in 3D embodiment). Point(s) 10824 of the plane (10824A through 10824F) are precise globally referenced coordinate system points that correspond with precise reference points of the coordinate system in use by plane 10818. This facilitates precise calculations where earth curvature and imperfections are not to be considered (e.g. reasonably short VV 10802 distances (e.g. 1 meter to hundreds of meters)) while enabling reasonable representations in world coordinates. Plane 10818 is preferably distinct for a particular date/time stamp to ensure point(s) 10824 are as accurate as possible at the time of use. Plane 10818 is much like the State Plane Coordinate System (SPS or SPCS) which is a set of 124 geographic zones or coordinate systems designed for specific regions of the United States so that a simple and highly accurate Cartesian coordinate system is used rather than a more complex ellipsoid coordinate system.

Point(s) 10824 provide geodetic datum for reference from which measurements are made. In surveying and geodesy, a datum is a set of reference points on the Earth's surface against which position measurements are made. There are hundreds of locally-developed reference datums around the world, usually referenced to some convenient local reference points. Converting between geodetic coordinates and Cartesian coordinates, as well as from Cartesian coordinates to geodetic coordinates, is well known by those skilled in the art. There are many techniques, including those described in:

"Methods to convert local sampling coordinates into geographic information system/global positioning systems (GIS/GPS)-compatible coordinate systems" by Mark Rudnicki and Thomas H. Meyer (Department of Natural Resources and the Environment, 2007);

"GRID, GROUND, AND GLOBE: DISTANCES IN THE GPS ERA" by Thomas H. Meyer

U.S. Pat. No. 7,647,199 ("Method for determining positions of points to be measured", Green et al).

U.S. Pat. No. 5,774,826 ("Optimization of survey coordinate transformations", McBride);

U.S. Pat. No. 5,233,357 ("Surveying system including an electro-optic total station and a portable receiving apparatus comprising a satellite position-measuring system", Ingensand et al.); and U.S. Pat. No. 4,791,572 ("Method for accurately displaying positional information on a map", Green et al).

Planets other than earth can use similar models as described above, and places in ambiguous space can use a manufactured globally referenced coordinate system provided MSs involved share, or can transform, the model, for example a space station referenced coordinate system.

Figure 18F:
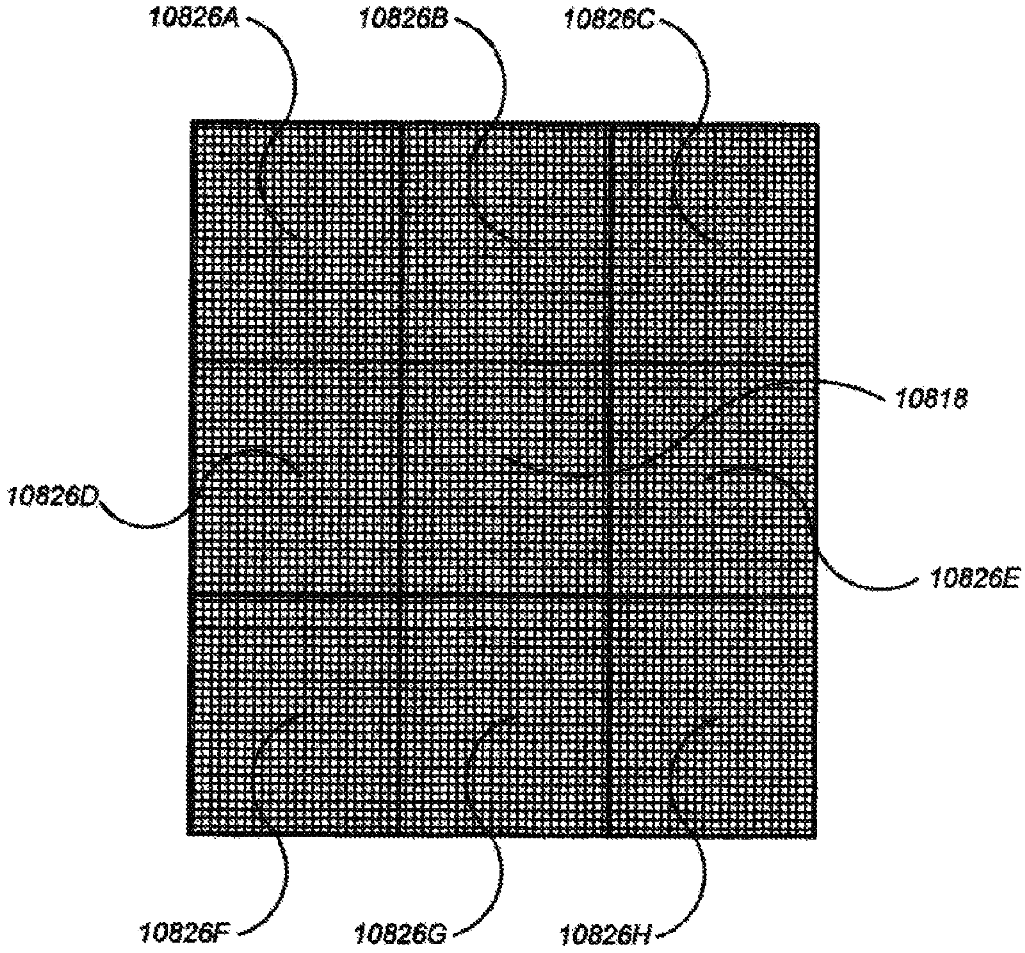
FIG. 18F depicts an illustration for further describing a preferred localized coordinate system used to carry out shoot processing.

FIG. 18F depicts an illustration for further describing a preferred localized coordinate system used to carry out shoot processing. A Cartesian coordinate system plane 10818 may be geographically surrounded by other reference coordinate system planes 10826 (i.e. 10826A through 10826H). In some embodiments, planes 10826 have common datum points 10824 so that the same coordinate system measurements can be used consistently. In other embodiments, each surrounding planes 10826 have associated transformation matrices for transforming points from their native coordinate system to the coordinate system of plane 10818 and/or visa-versa. As well known to those skilled in the art, a transformation matrix enables mathematical translation, rotation and scaling between different coordinate systems for accurate measurements between systems. There should be eight adjacent coordinate system planes 10826 which are preferably associated by date/time to plane 10808 also selected by date/time for use. It will be a rare occurrence for one MS to shoot another MS in a different Cartesian coordinate system, but the present disclosure handles this situation properly. FIG. 18F depicts a two dimensional Cartesian coordinate system model, but three dimensional models also have analogous transformation of points between different three dimensional models for accurate measurement results.

Figure 18G:
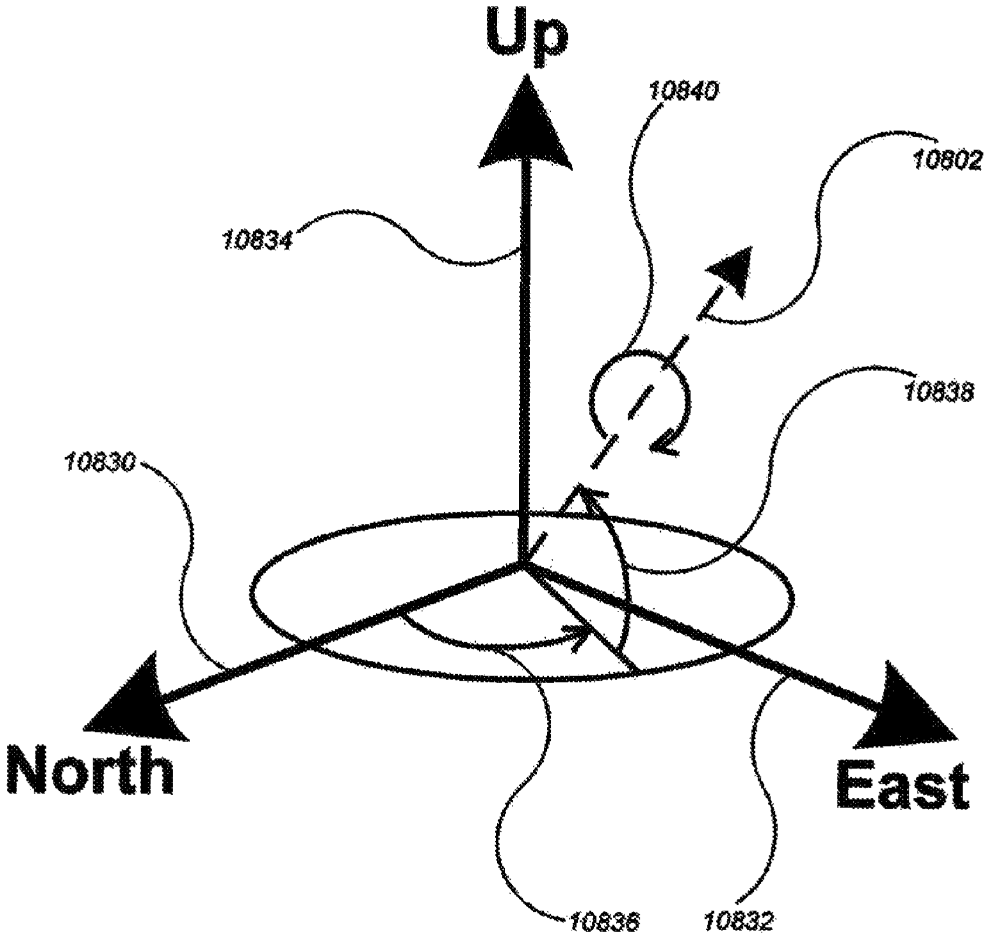
FIG. 18G depicts an illustration for further describing a preferred localized coordinate system used to carry out shoot processing.

FIG. 18G depicts an illustration for further describing a preferred localized coordinate system used to carry out shoot processing. A Cartesian coordinate system from FIG. 18D is shown for plane 10818 wherein North may be Y axis 10830, East is preferably X axis 10832 and Up is preferably Z axis 10834. When a three dimensional model is used, the starting point for VV 10802 is mathematically translated to be placed at the origin. At time of shooting, MS yaw 10836 is a measured angle on the X/Y plane relative North (heading is typically measured clockwise from North, but FIG. 18G shows a negative angle which can be used to determine the positive angle by subtraction from 360 degrees), MS pitch 10838 is a measured angle in the Z (Up) direction from the x/y plane (perpendicular to X/Y plane up to the VV 10802), and MS roll is a measured angle of turning/rolling the MS from side to side as through the VV were an axle through the line of aim of the MS which can be rolled around. Preferably, MS roll is not used in calculations because the aimed vector does not change with different roll values. In a two dimensional model, MS pitch is not needed. The present disclosure is not to be limited to a particular mathematical model. There are many different models that may be used. Angles 10836 and 10838 are easily determined (e.g. using polar coordinates) given the starting point (e.g. origin) coordinates, end point coordinates and distance between the starting point and end point.

Figure 4:
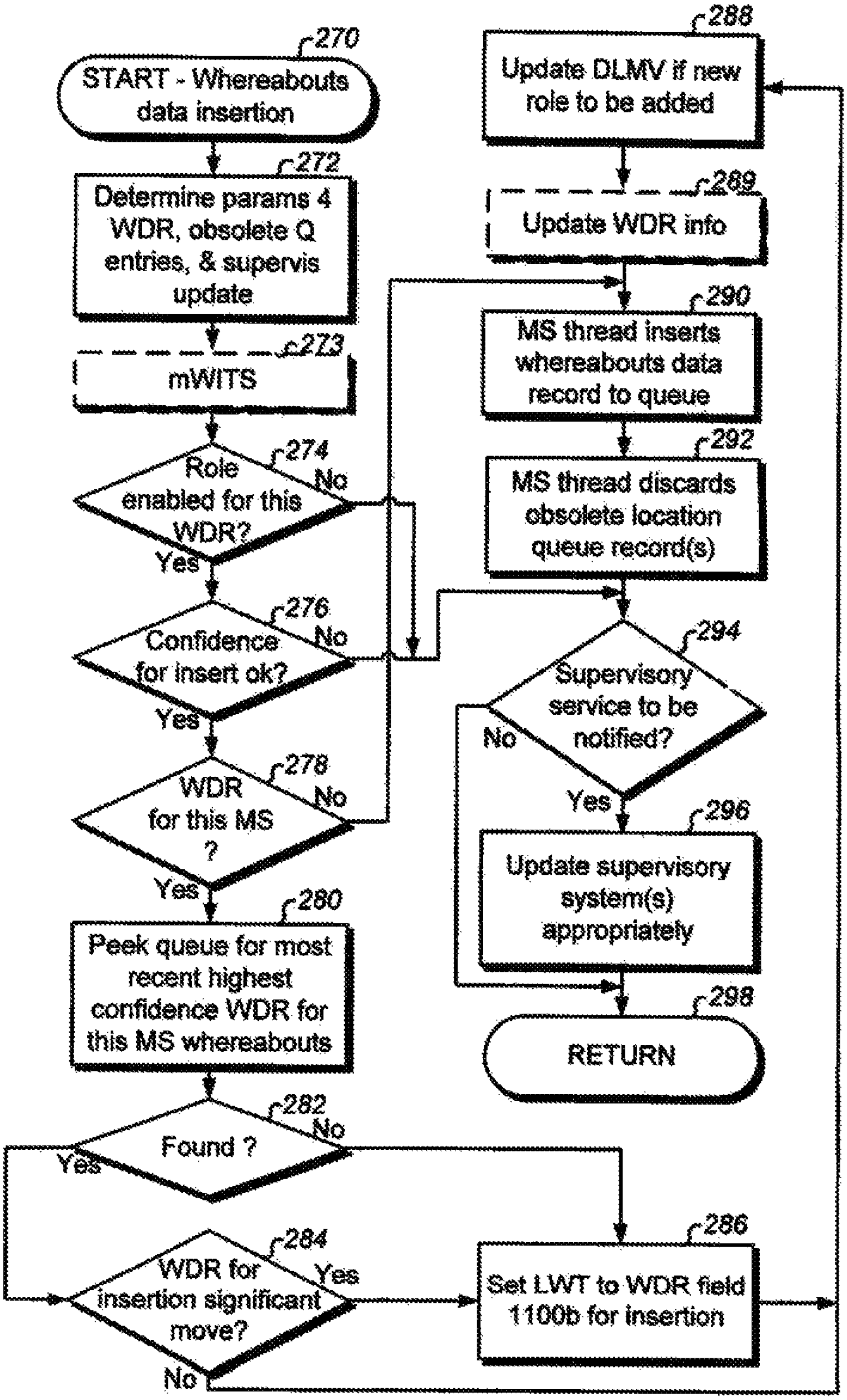
FIG. 4 depicts a flowchart for describing a preferred embodiment of a procedure for inserting a Whereabouts Data Record (WDR) to an MS whereabouts data queue, as described in detail in parent applications.

With reference now to FIG. 4, depicted is a flowchart for describing a preferred embodiment of a procedure for inserting a Whereabouts Data Record (WDR) 1100 into a queue at a MS as was well described in parent applications. While FIG. 4 is provided for memorable reference, the reader should appreciate the full scope, meaning, processing, and many embodiments possible. FIG. 4 provides means for maintaining the most accurate location possible at any given time of the MS during MS travels. Whereabouts Data Records (WDRs) 1100 may result from a plurality of different location systems and methods in use at the MS. A WDR will contain all the information necessary to represent a location. An appropriate Whereabouts Timeliness Variable (WTV), along with movement determination, may ensure location information is available when needed.

As discussed in parent applications (e.g. Ser. No. 12/077,041), the MS contains the most accurate location information at any point in time during MS travels, and is a chameleon in making use of the best location technology available at a particular time. For example, accuracy is around 10 meters in low cost outdoor GPS use of satellites. The GPS receiver equipped MS uses broadcast signals sent from the satellites to measure the distance from each of the known-location satellites (e.g. 4 satellites). Differential GPS (DGPS) can enhance GPS accuracy to as low as a half meter. DGPS typically uses one reference receiver where the exact position (latitude, longitude and elevation) is already known with high accuracy. The reference receiver tracks the same satellites as the MS at the same time and stores similar location data. Data used to locate the MS and the reference receiver is processed to remove position errors. Additional reference receivers can be used to further improve accuracy. Survey grade GPS accuracy can be provided to 1 centimeter accuracy using a similar scheme to DGPS, albeit with at least one highly accurate reference receiver and a highly accurate GPS receiver in the MS, wherein data from each receiver is processed for precision and error removal.

Triangulating using Time Of Arrival (TOA), Time Difference Of Arrival (TDOA), Angle Of Arrival (AOA), Missing Part Triangulation (MPT), or the like can also provide high accuracies depending on the number of located reference antennas in use, their distance from the MS at the time of location determination, and the underlying mathematical model in use for vector space calculations. Assisted Direct Location Technology (ADLT) enhances location determination by using at least one other moving receiver (i.e. another MS). MPT and ADLT are heterogeneous locating methods. Another heterogeneous locating method may use different wave forms and/or frequencies to determine a single location. Recursive Whereabouts Determination (RWD) populates useful WDR measurements in process such as TOA, TDOA, AOA, reference locations, etc, into new WDRs which can be processed for facilitating accurate determination of more accurate MS locations. Parent applications also describe locating a MS using other technologies (e.g. graphical means, physical address means, touch means, relative other MSs, etc). In fact, a high precision geodetic model may be used for all VV calculations (i.e. no need for a local coordinate system).

Regardless of whether any of the above locating technologies are reflected in describing a current whereabouts the MS, the present disclosure processing is at the mercy of the accuracy available in data describing current MS whereabouts.

Figure 5:
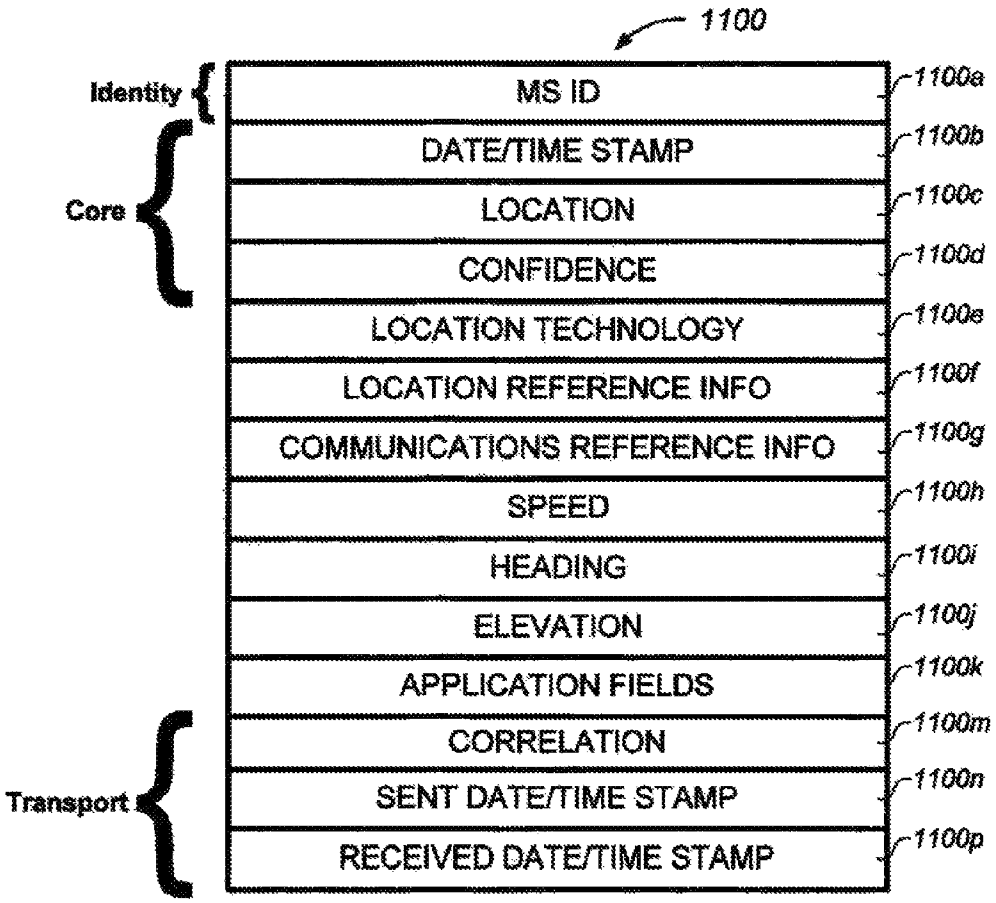
FIG. 5 depicts a preferred embodiment of a Whereabouts (or Wireless) Data Record (WDR) 1100 disclosed in detail in parent applications.

FIG. 5 depicts a preferred embodiment of a Whereabouts Data Record (WDR) 1100 for discussing operations of the present disclosure, as was well described in parent applications. While FIG. 5 is provided for memorable reference, the reader should appreciate the full scope, meaning, processing, and many embodiments possible. A Whereabouts Data Record (WDR) 1100 may also be referred to as a Wireless Data Record (WDR) 1100, as described in parent applications. Thus, a WDR may in fact contain a single field of application data. Each individual field (e.g. 1100*c*, 1100*f* through 1100*j*) is relied upon for accuracy (e.g. number of significant digits to right of decimal point) or an anticipated accuracy is used across all WDRs in a MS or group of MSs, however an alternate embodiment will store an overall accuracy in Location Technology field 1100*e* for all location technology values provided in the WDR.

A WDR takes on a variety of formats depending on the context of use. There are several parts to a WDR depending on use. There is an identity section which contains a MS ID field 1100*a* for identifying the WDR. Field 1100*a* can contain a null value if the WDR is for whereabouts information received from a remote source which has not identified itself. MSs do not require identities of remote data processing systems in order to be located. There is a core section which is required in WDR uses. The core section includes date/time stamp field 1100*b*, location field 1100*c*, and confidence field 1100*d*. There is a transport section of fields wherein any one of the fields may be used when communicating WDR information between data processing systems. Transport fields include correlation field 1100*m*, sent date/time stamp field 1100*n*, and received date/time stamp field 1100*p*. Transport fields may also be communicated to send processing, or received from receive processing. Other fields are of use depending on the MS or applications thereof, however location technology field 1100*e* and location reference info field 1100*f* are of particular interest in carrying out additional novel functionality of the present disclosure. Communications reference information field 1100*g* may be valuable, depending on communications embodiments in the LN-expanse.

Some fields are multi-part fields (i.e. have sub-fields). Whereabouts Data Records (WDRs) 1100 may be fixed length records, varying length records, or a combination with field(s) in one form or the other. Some WDR embodiments will use anticipated fixed length record positions for subfields that can contain useful data, or a null value (e.g. −1). Other WDR embodiments may use varying length fields depending on the number of sub-fields to be populated. Other WDR embodiments will use varying length fields and/or sub-fields which have tags indicating their presence.

Other WDR embodiments will define additional fields to prevent putting more than one accessible data item in one field. In any case, processing will have means for knowing whether a value is present or not, and for which field (or sub-field) it is present. Absence in data may be indicated with a null indicator (−1), or indicated with its lack of being there (e.g. varying length record embodiments).

When a WDR is referenced in this disclosure, it is referenced in a general sense so that the contextually reasonable subset of the WDR of FIG. 5 is used. For example, when communicating WDRs between data processing systems, a reasonable subset of WDR 1100 is communicated in preferred embodiments as described with flowcharts. When a WDR is maintained to the MS, preferably most (if not all) fields are set for a complete record, regardless if useful data is found in a particular field (e.g. some fields may be null (e.g. −1)). Most importantly, Whereabouts Data Records (WDRs) are maintained to the MS for maintaining whereabouts of the MS. When the WDR 1100 contains a MS ID field 1100*a* matching the MS ID containing the WDR, that WDR contains the location (location field 1100*c*) with a specified confidence (field 1100*d*) at a particular time (date/time stamp field 1100*b*) for that MS. MS ID field 1100*a* is a unique handle to an MS as previously described. Depending on the installation, MS ID field 1100*a* may be a phone #, physical or logical address, name, machine identifier, serial number, encrypted identifier, concealable derivative of a MS identifier, correlation, pseudo MS ID, or some other unique handle to the MS. An MS must be able to distinguish its own unique handle from other MS handles in field 1100*a*. MS Identifiers (MS IDs) of other MSs (or unique correlations thereof) are also maintained at a MS for awareness of locations and data of interest of MSs, for example those in the vicinity.

Date/Time stamp field 1100*b* contains a date/time stamp of when the WDR record 1100 was completed by an MS for its own whereabouts prior to WDR queue insertion. It is in terms of the date/time scale of the MS inserting the local WDR (NTP derived or not). Date/Time stamp field 1100*b* may also contain a date/time stamp of when the WDR record 1100 was determined for the whereabouts of another MS, but it should still be in terms of the date/time scale of the MS inserting the local WDR (NTP derived or not) to prevent time conversions when needed, and to promote consistent searches/sorts/etc. The date/time stamp field 1100*b* should use the best possible granulation of time, and may be in synch with other MSs and data processing systems according to NTP. A time zone, day/light savings time, and NTP indicator is preferably maintained as part of field 1100*b*. The NTP indicator (e.g. bit) is for whether or not the date/time stamp is NTP derived.

Location field 1100*c* depends on the installation of the present disclosure, but can include a latitude and longitude, cellular network cell identifier, geocentric coordinates, geodetic coordinates, three dimensional space coordinates, area described by GPS coordinates, overlay grid region identifier or coordinates, GPS descriptors, altitude/elevation (e.g. in lieu of using field 1100*j*), MAPSCO reference, physical or logical network address (including a wildcard (e.g. ip addresses 145.32.*.*)), particular address, polar coordinates, or any other two/three dimensional location methods/means used in identifying the MS location. Data of field 1100*c* is preferably a consistent measure (e.g. all latitude and longitude) for all location technologies. Some embodiments will permit using different measures to location field 1100*c* (e.g. latitude and longitude for one, address for another; polar coordinates for another, etc) which will be translated to a consistent measure at appropriate processing times.

Confidence field 1100*d* contains a value for the confidence that location field 1100*c* accurately describes the location of the MS when the WDR is originated by the MS for its own whereabouts. Confidence field 1100*d* contains a value for the confidence that location field 1100*c* accurately describes the location of the MS that originated the WDR. A confidence value can be set according to known timeliness of processing, communications and known mobile variables (e.g. MS speed, heading, yaw, pitch, roll, etc) at the time of transmission. Confidence values should be standardized for all location technologies used to determine which location information is of a higher/lower confidence when using multiple location technologies (as determined by fields 1100*e* and 1100*f*) for enabling determination of which data is of a higher priority to use in determining whereabouts. Confidence value ranges depend on the implementation. In a preferred embodiment, confidence values range from 1 to 100 (as discussed previously) for denoting a percentage of confidence. 100% confidence indicates the location field 1100*c* is guaranteed to describe the MS location. 0% confidence indicates the location field 1100*c* is guaranteed to not describe the MS location. Therefore, the lowest conceivable value for field 1100*d* should be 1. In most cases, WDRs 1100 contain a confidence field 1100*d* up to 100.

Location Technology field 1100*e* contains the location technology used to determine the location of location field 1100*c*. An MS can be located by many technologies. Field 1100*e* also contains an originator indicator (e.g. bit) for whether the originator of the WDR 1100 was a Directly Located Mobile data processing system (DLM) or Indirectly Located Mobile data processing system (ILM).

Location Reference Info field 1100*f* preferably contains one or more fields useful to locate a MS in processing. In other embodiments, it contains data that contributed to confidence determination. Location Reference Info field 1100*f* may contain information useful to locate a MS in the future when the WDR originated from the MS for its own whereabouts. Field 1100*f* will contain selected triangulation measurements, wave spectrum used and/or particular communications interfaces 70, signal strength(s), TDOA information, AOA information, or any other data useful for location determination. Field 1100*f* can also contain reference whereabouts information to use relative a TDOA or AOA. In one embodiment, field 1100*f* contains the number of DLMs and ILMs which contributed to calculating the MS location to break a tie between using WDRs with the same confidence values. In another embodiment, a tier of ILMs used to locate the MS is maintained so there is an accounting for the number of ILMs in the LN-expanse between the currently located MS and a DLM. In other embodiments, MS heading, yaw, pitch and roll, or accelerometer values are maintained therein, for example for antenna AOA positioning. Inertial Measurement Unit (IMU) values in general may be stored therein (e.g. tri-axial gyroscope, tri-axial accelerometer, compass, etc). When wave spectrum frequencies or other wave characteristics have changed in a transmission used for calculating a TDOA measurement, appropriate information may be carried along, for example to properly convert a time into a distance. Field 1100*f* should be used to facilitate correct measurements and uses, if needed conversions have not already taken place.

Communications reference information field 1100*g* is a multipart record describing the communications session, channel, and bind criteria between the MS and MSs, or service(s), that helped determine its location. In some embodiments, field 1100_g_ contains unique MS identifiers, protocol used, logon/access parameters, and useful statistics of the MSs which contributed to data of the location field 1100_c_.

Speed field 1100_h_ contains a value for the MS speed when the WDR is originated by the MS for its own whereabouts. Speed is maintained in any suitable units.

Heading field 1100_i_ contains a value for the MS heading when the WDR is originated by the MS for its own whereabouts. Heading values are preferably maintained in degrees up to 360 from due North, but is maintained in any suitable directional form.

Elevation field 1100_j_ contains a value for the MS elevation (or altitude) when the WDR is originated by the MS for its own whereabouts. Elevation field 1100_j_ may contain a value for elevation (altitude) of another MS when the WDR was originated elsewhere. Elevation (or altitude) is maintained in any suitable units.

Application fields 1100_k_ contains one or more fields for describing application(s) at the time of completing, or originating, the WDR 1100. Application fields 1100_k_ may include field(s) for:

a) MS Application(s) in use at time;
b) MS Application(s) context(s) in use at time;
c) MS Application(s) data for state information of MS Application(s) in use at time, for example any data of FIG. 11A;
d) MS Application which caused WDR 1100;
e) MS Application context which caused WDR 1100;
f) MS Application data for state information of MS Application which caused WDR 1100;
g) Application(s) in use at time of remote MS(s) involved with WDR;
h) Application(s) context(s) in use at time of remote MS(s) involved with WDR;
i) MS Application(s) data for state information of remote MS(s) involved with WDR;
j) Remote MS(s) criteria which caused WDR 1100;
k) Remote MS(s) context criteria which caused WDR 1100;
l) Remote MS(s) data criteria which caused WDR 1100;
m) Application(s) in use at time of service(s) involved with WDR;
n) Application(s) context(s) in use at time of service(s) involved with WDR;
o) MS Application(s) data for state information of service(s) involved with WDR;
p) Service(s) criteria which caused WDR 1100;
q) Service(s) context criteria which caused WDR 1100;
r) Service(s) data criteria which caused WDR 1100;
s) MS navigation APIs in use;
t) Web site identifying information;
u) Physical or logical address identifying information;
v) Situational location information as described in U.S. Pat. Nos. 6,456,234; 6,731,238; 7,187,997 (Johnson);
w) Transactions completed at a MS;
x) User configurations made at a MS;
y) Environmental conditions of a MS;
z) Application(s) conditions of a MS;
aa) Service(s) conditions of a MS;
bb) Date/time stamps (like field 1100_b_) with, or for, any item of a) through aa); and/or
cc) Any combinations of a) through bb).

Correlation field 1100_m_ is optionally present in a WDR when the WDR is in a transmission between systems. Field 1100_m_ provides means for correlating a response to an earlier request, or to correlate a response to an earlier broadcast. Correlation field 1100_m_ contains a unique handle. Alternatively, a MS ID is used for correlation.

Sent date/time stamp field 1100_n_ is optionally present in a WDR when the WDR is in transmission between systems. Field 1100_n_ contains when the WDR was transmitted. A time zone, day/light savings time, and NTP indicator is preferably maintained as part of field 1100_n_.

Received date/time stamp field 1100_p_ contains when the WDR was received by the MS. A time zone, day/light savings time, and NTP indicator is preferably maintained as part of field 1100_p_.

Any fields of WDR 1100 which contain an unpredictable number of subordinate fields of data preferably use a tagged data scheme, for example an X.409 encoding for a Token, Length, and Value (called a TLV encoding). Any field of WDR 1100 may be converted: a) prior to being maintained to the MS; or b) after access at the MS; or c) when appropriate. Any field of WDR 1100 may be converted when sending/receiving/broadcasting, or related processing, to ensure a standard format. Other embodiments will store and access values of WDR 1100 field(s) which are already in a standardized format. WDR 1100 fields can be in any order, and a different order when comparing what is in data transmitted versus data maintained. Some embodiments to WDRs maintained to a MS preserve transport fields 1100_m_, 1100_n_ and/or 1100_p_ with the WDR.

Figure 19:
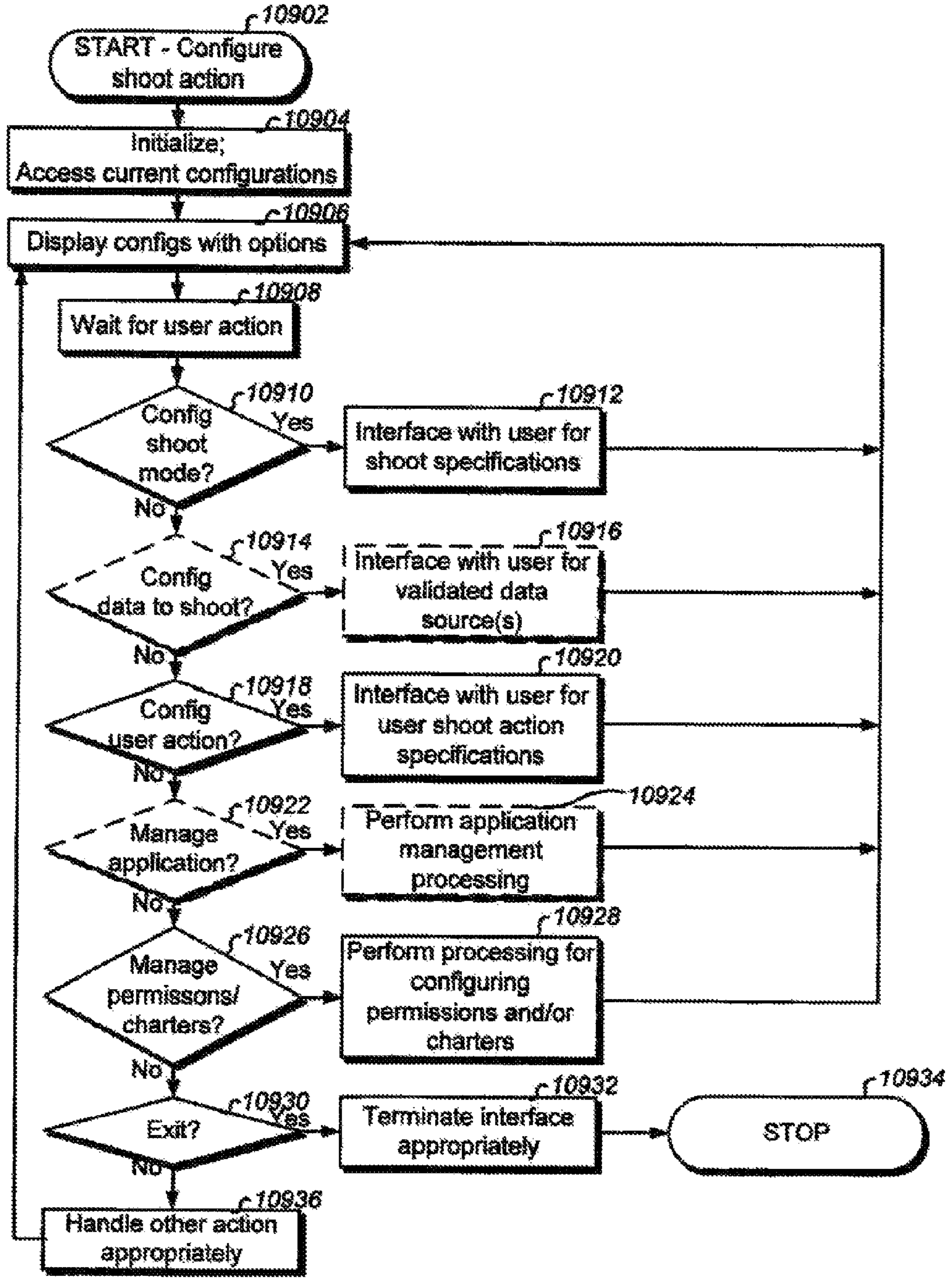
FIG. 19 depicts a flowchart for describing preferred embodiments of shoot action configuration processing.

With reference now to FIG. 19, depicted is a flowchart for describing preferred embodiments of shoot action configuration processing. Processing begins at block 10902 upon a valid user request at the MS, continues to block 10904 where FIG. 19 processing is initialized including access to the most current configuration settings (may be initially defaulted), block 10906 where the current configurations are presented to the user, and to block 10908 for waiting for a user action In response to options presented at block 10906. When a user action is detected, processing continues to block 10910.

If block 10910 determines the user selected to configure the shoot mode, block 10912 interfaces with the user for placing the MS in one of the following shoot modes:

Use aperture aim methodology (scenario 10806); or
Use MS pointer (scenario 10800).

In some embodiments wherein the MS is appropriately equipped, a shoot mode is available for each type of shoot method (i.e. non-directional wave form (e.g. RF, sound, etc), infrared, or laser). In some uses, a WDR is shot from the originating MS to a target MS and WDR In-process Triggering Smarts (WITS) processing occurs so that permissions and charters govern processing, some of which includes actions for pulling data from targeted data processing system(s) (e.g. MS(s)), pushing data to targeted data processing system(s) (e.g. MS(s)), probing data processing system(s) (e.g. MS(s)) for a response or data, beaconing targeted data processing system(s) (e.g. MS(s)), playing an interactive game such as LBX tag, spawning a Sudden Proximal User Interface (SPUI) at a data processing system (e.g. MS), or any other set of actions and processing already known for LBX permissions and charters. Determining a MS to be a valid VV end point indicates that that MS will "see" the WDR for subsequent WITS processing.

Figure 6:
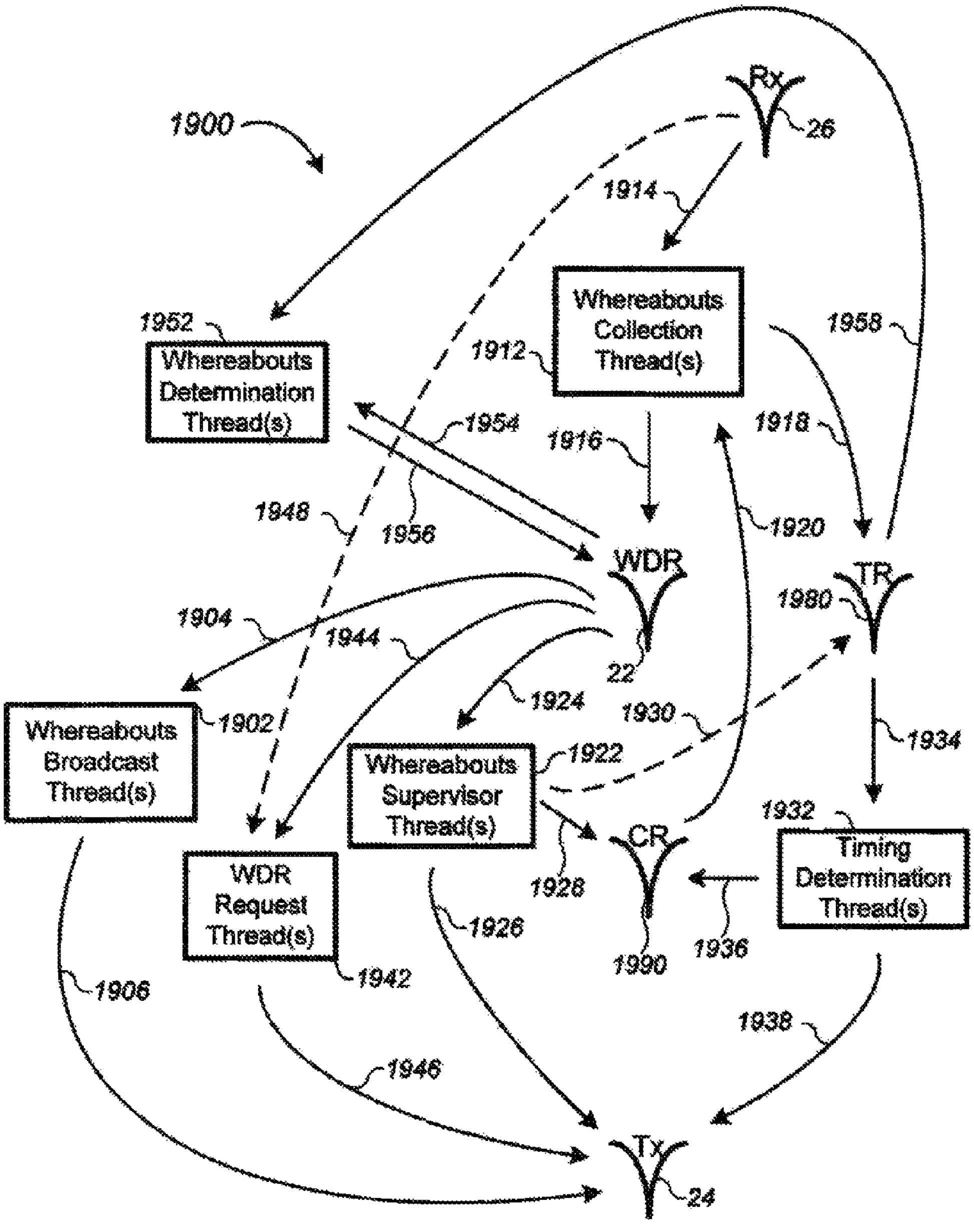
FIG. 6 depicts an illustration for describing a preferred embodiment multithreaded architecture of peer interaction processing of a MS in accordance with the present disclosure, as described in detail in parent applications.

With reference now to FIG. 6, depicted is an illustration for describing a preferred embodiment multithreaded architecture of peer interaction processing of a MS in accordance with the present disclosure, as was well described in parent applications. While FIG. 6 is provided for memorable reference, the reader should appreciate the full scope, meaning, processing, and many embodiments possible, in particular for MS WDR and WITS processing.

With reference back to FIG. 19, in other uses a WDR is shot from the originating MS to a target MS and Message Area Data Records (MADRs) 9850 are used to govern the outbound shoot event at the shooting MS and inbound shoot event at the shot MS, thereby treating the shot as a generic application inbound or outbound event. In other uses, both WITS processing and MADR processing are used for processing the shot WDR.

The specification is saved at block 10912 before continuing back to block 10906 for a configuration presentation refresh. If block 10910 determines the user did not select to configure a shoot mode, processing continues to block 10914.

If block 10914 determines the user selected to configure a default data source, block 10916 interfaces with the user for specifying data source(s) to be defaulted for the shoot data packet so that the user need not specify at the time of shooting. Data source specifications include:

File data, optionally with file pointer (offset and length);
Database object data;
Map term data (described in detail parent applications);
Application Term (FIG. 7D AppTerm);
Specific contextual application data reference(s);
Privilege data (FIG. 7C);
Grant data (FIG. 7C);
Group data (FIG. 7C);
Charter data (FIG. 7D);
Clipboard data; and/or
Prefix Registry Record (PRR) data.

Predefined data source specification(s) are saved at block 10916 before continuing back to block 10906. In some embodiments, the user also specifies the data type, for example how to typecast the data when shooting it. In some embodiments, the user specifies which application sections of fields 1100*k* (e.g. of FIG. 11A) are to be populated and how. If block 10914 determines the user did not select to configure a data source, processing continues to block 10918.

If block 10918 determines the user selected to configure a user action, block 10920 interfaces with the user for specifying a particular user action to designate a particular shoot action. The user can specify any reasonable user interface action (touch screen gesture, voice command, keystroke(s), etc) to invoke a non-directional wave form shoot action, a laser shoot action (if MS is equipped), or an infrared shoot action (if MS is equipped). If block 10918 determines the user did not select to configure a user action, processing continues to block 10922.

If block 10922 determines the user selected to manage an application, then processing continues to block 10924 where any of a plurality of applications are managed. Block 10906 preferably displays which applications can be managed so that processing at block 10924 can determine which application was selected for being managed. Block 10924 is described by FIG. 14. Block 10924 continues back to block 10906 upon FIG. 14 processing termination. If block 10922 determines the user did not select to manage an application, processing continues to block 10926.

If block 10926 determines the user selected to manage shoot related privileges or charters, processing continues to block 10928 where the user is able to create, delete, alter, or work with privileges and/or charters. Privilege and charter configuration was well described in parent applications. Similarly, any aspect of shoot processing disclosed can be privileged for proper interoperability between MSs, and charters may or may not be managed for replacing, complementing, or enhancing functionality disclosed herein. Block 10928 continues back to block 10906 after configuration processing has been completed. The user may or may not have altered privilege or charter data (e.g. viewed privileges or charters). If block 10926 determines the user did not select to manage privileges or charters, processing continues to block 10930.

If block 10930 determines the user selected to exit FIG. 19 processing, block 10932 terminates FIG. 19 processing appropriately (e.g. terminate access to data (e.g. stop using database interface to SQL embodiment)), and FIG. 19 processing terminates at block 10934, otherwise processing continues to block 10936 where other monitored user actions leaving block 10908 are appropriately handled before continuing back to block 10906.

FIG. 19 processing should occur after appropriate authentication, for example to ensure a valid user, administrator, or valid credentials are used. In some embodiments, FIG. 19 includes authentication processing rather than relying on authentication prior to invocation. In some embodiments, any subset of FIG. 19 processing can be accessible to an authenticated user, administrator, or driving process, and authentication can be used to determine what subset(s) of processing are made available. In other embodiments, credentials provided to FIG. 19 processing are validated at block 10904 and used at block 10906 to reveal which subset of options are made available for configuration based on credentials provided. Permissions (privileges) may be enforced at FIG. 19 processing blocks for preventing or allowing viewing, creation, alterations, deletions, or any other maintenance, in particular when the originating user is not the same as the maintaining user.

Figure 3:
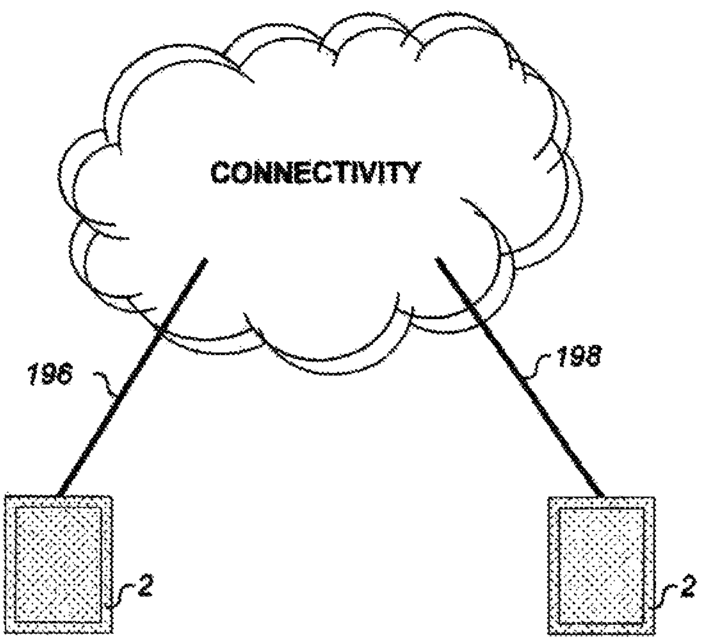
FIG. 3 depicts an architectural illustration for discussing communications between any two mobile data processing systems of the present disclosure.

With reference now to FIG. 3, depicted is an architectural illustration for discussing communications between any two mobile data processing systems of the present disclosure, as was well described in parent applications. While FIG. 3 is provided for memorable reference, the reader should appreciate the full scope, meaning, processing, and many embodiments possible. In the present context, any two MSs can communicate with each other with the disclosed shoot methodologies. A shooting MS communicates location information automatically over an aimed non-directional wave form (RF, sound, etc) path 196 to a shot MS by way of a path 198. Paths 196 and 198 are the same for a VV in most point and shoot applications. Although impractical for most applications, it is possible to use the technology disclosed to aim at a target many miles away wherein routers facilitate communicating VV information to the target MS for end point determination. Whereabouts information of sufficient confidence is automatically accessed at the source MS and appropriately used in data to be shot. Whereabouts information is preferably accessed from a local MS queue maintaining the highest confidence location of the MS at any particular time using one or more location technologies that may be available, but an accurate location may be determined at the time of shooting. When a first MS shoots a second MS, there is always Caller Location (CLOC) information carried with the initial shot data to accomplish VV end point determination.

Figure 12A:
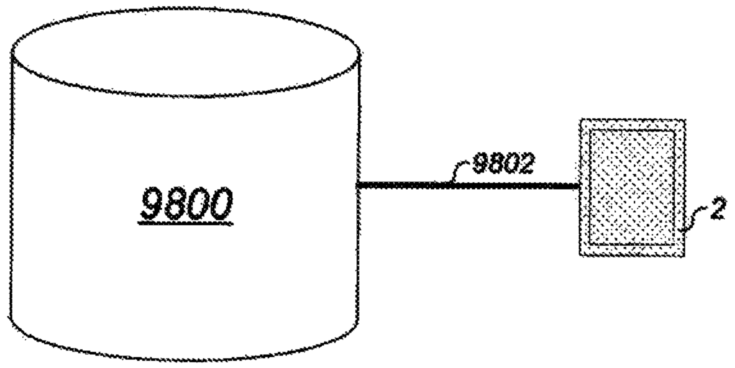
FIG. 12A depicts an illustration for discussing various access embodiments to a message repository of the present disclosure.

With reference now to FIG. 12A, depicted is an illustration for discussing various access embodiments to a message repository of the present disclosure. A MS 2 accesses the message repository 9800 (also referred to as a message area) via an access path 9802 by access to local data, remote data, or a combination thereof, depending on embodiments. Any of the memory or storage embodiments described with FIG. 2 may be used for repository 9800. Access path 9802 may involve a local API, a hardware interrupt interface, processing at the MS 2, a communication path to remote data perhaps over any of various topologies, or any other method for getting access to the repository 9800. Repository 9800 contains a centralized collection of presentation/messaging information for carrying out operations of the present disclosure.

Figure 12B:
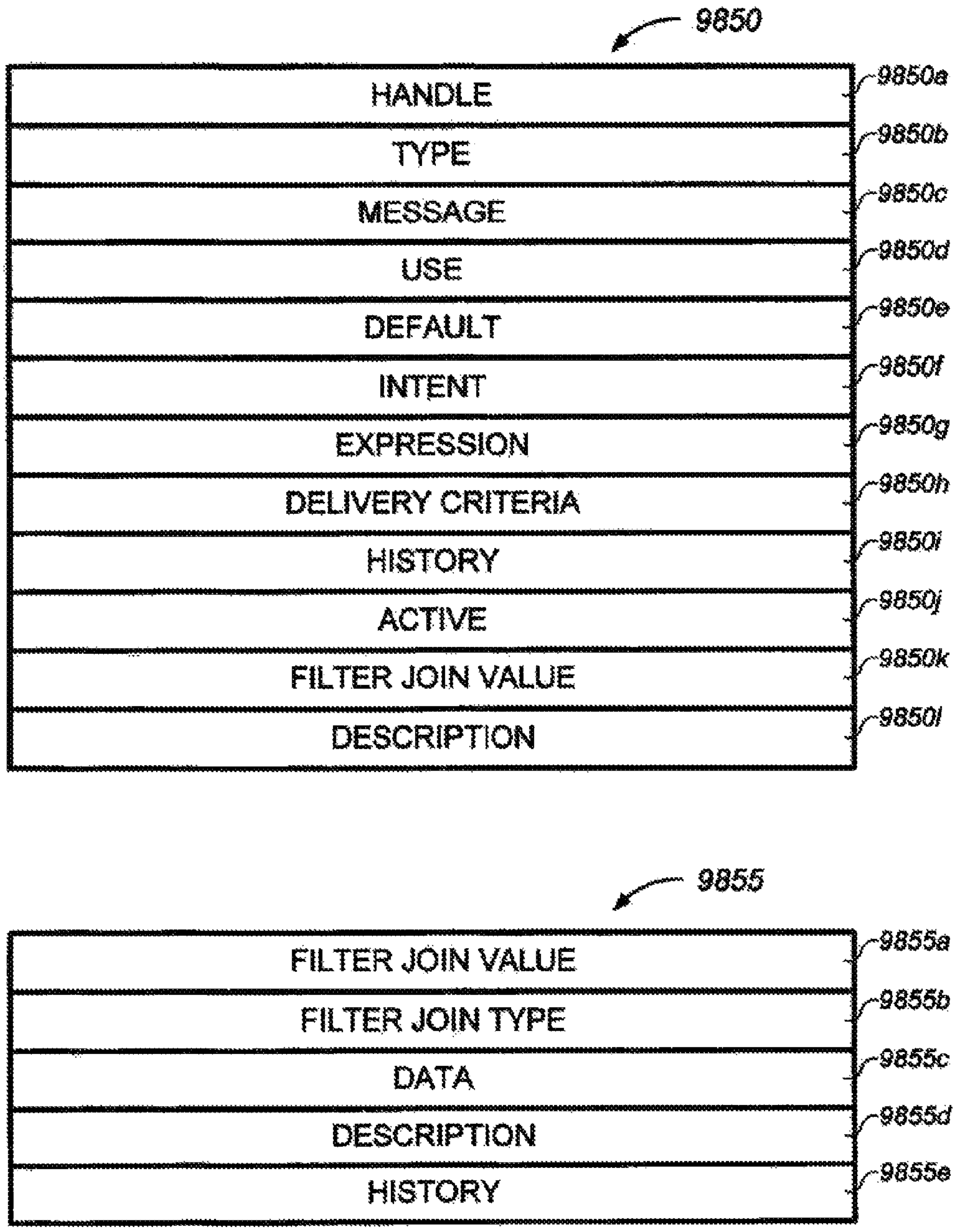
FIG. 12B depicts a preferred embodiment of a Message Area Data Record (MADR) for discussing synergistic message processing and configuration.

FIG. 12B depicts a preferred embodiment of a Message Area Data Record (MADR) 9850 for discussing synergistic message processing and configuration. Message Area Data Records (MADRs) 9850 are a preferred embodiment for data maintained (e.g. user configured/maintained, system defaulted/maintained) in repository 9800, and each is referred to as a presentation object (or messaging object). The intelligence for when, where, how and why messaging takes place is maintained in the MADRs themselves. Fields therein are described below.

Present disclosure data records (FIGS. 12A-12D or any other disclosed data records), may be maintained in an SQL database, or maintained in record form by a data processing system. Appropriate indexes and/or constraints are defined in a SQL embodiment. Depending on the embodiment, some data record fields disclosed may be multi-part fields (i.e. have sub-fields), fixed length records, varying length records, or a combination with field(s) in one form or another. Some data record field embodiments will use anticipated fixed length record positions for subfields that can contain useful data, or a null value (e.g. −1). Other embodiments may use varying length fields depending on the number of sub-fields to be populated, or may use varying length fields and/or sub-fields which have tags indicate their presence. Other embodiments will define additional data record fields to prevent putting more than one accessible data item in one field. Other embodiments may implement pointers in fields to memory (e.g. memory pointer) or storage locations (e.g. file pointer and perhaps file offset therein) which may or may not have been dynamically allocated. In any case, processing will have means for knowing whether a value is present or not, and for which field (or sub-field) it is present. Absence in data may be indicated with a null indicator (−1), or indicated with its lack of being there (e.g. varying length record embodiments). Fields described may be converted: a) prior to storing; or b) after accessing; or c) by storage interface processing (e.g. for standardized processing). Fields described may not be converted (i.e. used as is). Any field may contain a join value (e.g. SQL) to one or more other data entities (e.g. tables) which contain a matching value (e.g. in at least one column) to associate additional data (e.g. one or more other columns of data) to any record 9850 field.

Handle field 9850*a* contains a unique handle to a particular MADR. Various embodiments include a user assigned name (e.g. string), a unique integer (e.g. generated by a SQL Database (DB) unique sequence number generator), or other unique data instance for accessing a particular MADR 9850. Field 9850*a* is to contain a unique value across all MADRs regardless of embodiment, for example when created or altered. Type field 9850*b* contains the type of message field 9850*c* of the MADR 9850, for example categorized in audio recording types, video recording types, text types, executable types, and application information types. There are many different message types depending on what formats will or can be supported in field 9850*c*. Some examples:

audio recording types: WAV (WaveForm), WMA (Windows Media Audio), ALE (Apple Lossless), MP3, bit sample rate information, or any combination of information describing an audio recording type for processing;

video recording types: MPEG-1, MPEG-2, WMV, MOV, AVI, pixel and/or scan line information, frame sampling rate information, or any combination of information describing a video recording type for processing;

text types: single byte characters, double byte characters, character set information, font, size, appearance, or any combination of information describing a text string for processing;

executable types: Motorola (MSB to LSB order), Intel (reverse byte order), 16 bit, 32 bit, 64 bit, stack size required, linkable code libraries required, run time variable settings, or any combination of information describing an executable for processing; or application information types: current location, current date/time, calendar information reference, current application in use (e.g. game), waymark or map term information (see LRDRs 9860), or any combination of information describing application information. Application information also includes accessing status from an external application (e.g. Twitter status, Facebook status, etc), using LRDRs to "skip" handling the presentation (e.g. do not process OGM), and/or determining the information to be presented for the nearest person(s) at the time of a distribution (e.g. a call). Application information may be referenced in user designated destinations of a specified recording, text for annunciation, or other presentation data stream, or as a single reference for an entire message output.

Some embodiments of type field 9850*b* simply carry a file extension or special qualifier which is recognized by an operating system for handling the MADR. Other embodiments define a plurality of fields formed together to determine a particular type. Message field 9850*c* contains (or points to) the message in the appropriate format as described by field 9850*b* and may be maintained to a file or suitable MS memory. In context of a particular message type, message field 9850*c* may contain the substitution identifiers of U.S. Pat. No. 5,434,910 ("Method and system for providing multimedia substitution in messaging systems", Johnson et al). Field 9850*c* may involve an executable that does no presentation (e.g. MADR configured to perform desired processing). Field 9850*c* may be advertising content, for example where a source shared/communicated the MADR(s) to the MS for conditional presentation at the MS. Use field 9850*d* contains use information of the message of the MADR 9850. A single message can have many uses (e.g. multiple bits set). In a preferred embodiment, field 9850*d* is a bit mask wherein specific bit positions indicate a particular event use. For example, a bit set to 1 is enabled and a bit set to 0 is disabled. There may be bit settings for OGM, OCM, varieties of COM-R (e.g. COM for particular application to process at Remote MS), varieties of COM-L (e.g. COM for particular application to process at Local MS (e.g. a receiving or sending MS)) for inbound or outbound distributions, or other uses. Varieties of COM-R and COM-L accommodate confirmation of delivery messaging for different applications such as email, calendar, address book, phone, advertising, shoot, or any other application where acknowledgement is desired for a related distribution (e.g. delivery of another message), or the inbound/outbound event serves as a useful trigger for presentation. Various embodiments will granulate COM use settings differently. For example, the calendar application can have bit settings for: COM-R-cal (e.g. MADRs for processing at a Remote receiving MS), COM-L-in-cal (e.g. MADRs for processing at the Local MS for inbound calendar items), COM-L-out-cal (e.g. MADRs for processing at the Local MS for outbound calendar items); or for a preferred embodiment of:

COM-R-cal (e.g. MADRs for processing at a Remote receiving MS), COM-L-cal (e.g. MADRs for processing at the Local MS for inbound or outbound calendar items); or for: COM-cal (e.g. MADRs for processing at any (local/remote) MS); or the use field 9850*d* may be removed from a MADR so that the use is completely specified via expression field 9850*g*. Any application (like the Calendar example) may also have different use field embodiments. In the preferred embodiment, use field 9850*d* supports many types of events which result in MADR processing. Default field 9850*e* indicates whether or not the message of the MADR 9850 is a default message for processing (i.e. True or False). There can be one default MADR for each of the uses (e.g. described by field 9850*d*) so that a default exists when all matching MADRs have expressions that evaluate to False. Originator intent field 9850*f* contains various originator instructions to be associated with the message which was not, or could not, be specified or communicated in type field 9850*b*. Field 9850*f* includes information for message presentation that can be applied differently to messages of the same type field 9850*b*. Field 9850*f* information includes specifications for an expiration of the MADR, priority setting (e.g. high or normal), appearance or presentation information, volume or volume override information, data processing system control operation, ghosting the message image (like a watermark) over a video recording, or any other originator preference for affecting play/presentation of the particular message to a user. A visual mode setting can be set here for the originator's intent of: full screen, dedicated user interface visual area, newly spawned window, pop-up (e.g. window) with "stolen" focus, title-bar area of currently focused window, use observer's preference, or other visual method for presenting MADR information. An audio mode setting can also be set for the originator's intent of: mix, preempt, or use observer's preference. Field 9850*f* may also include a prescription for which users, groups of users, authority levels of users, or which specific privilege(s) configured can maintain, distribute/share, manage, view, alter, present, or delete the MADR. Expression field 9850*g* contains an expression of conditions which can be determined at the data processing system sending and/or receiving the message (i.e. information). Delivery criteria field 9850*h* may contain information for how to deliver the message (e.g. by email, MS2MS, etc) and where to deliver the message to (e.g. recipient(s)). Recipient groups (e.g. MS ID group) and recipient wildcarding is supported for delivering to a plurality of recipients. A prioritized attempt may also be specified wherein unsuccessful deliveries cause further delivery attempts. A null setting in field 9850*h* is resolved to the user of the MS where presentation is to occur. History field 9850*i* preferably contains a plurality of fields including creation date/time stamp, last changed date/time stamp, creator identity information, updater identity information, system address information where actions took place, and any other information useful for forming useful history of why MADR data is the way it is. Identity information may be a specific identifier or a group identifier, for example used in enforcing intent field 9850*f* for specific MS processing. Active field 9850*j* is preferably a Boolean (Yes/No) indicating whether or not the MADR is active (i.e. participates in being considered for automated processing). Filter join value field 9850*k* contains a null, or a join link to at least one Event Filter Record (EFR) 9855. Description field 9850*l* contains an optional user documentary (e.g. text) for the MADR 9850. MADRs are operating system independent objects for being processed locally or remotely, and are shared between systems based on permissions.

Event Filter Records (EFRs) 9855 may contain one or more records (rows) which are joined to one or more MADRs by matching filter join field 9855*a* with filter join field 9850*k*. A filter join type field 9855*b* contains the type of data being joined to the MADR(s), and data field 9855*c* contains data of the type described by field 9855*b*. For example, data field 9855*c* is whereabouts information (e.g. location) when type field is WHEREABOUTS, data field 9855*c* is keyword(s) information (e.g. a string or delimiter separated text strings) when type field is KEYWORDS, and data field 9855*c* is scheduling information (e.g. date/time expressions) when type field is DATETIME. There may be many supported type fields 9855*b* with corresponding data 9855*c*. Description field 9855*d* contains an optional user documentary (e.g. text) for the EFR 9855. History field 9855*e* preferably contains a plurality of fields including creation date/time stamp, last changed date/time stamp, creator identity information, updater identity information, system address information where actions took place, and any other information useful for forming useful history of why EFR data is the way it is.

In one embodiment, EFR data is maintained as part of the MADR object itself in fields of intent field 9850*f* for originator (author) intent for the presentation that can be shared between systems based on permissions, maintained by permissions, and presented using permissions. A preferred embodiment separates out EFR data so that a plurality of MADRs can reference a single EFR. There may be MS applications which use EFRs for other purposes. Although EFRs extend MADR processing, the MADR plus EFR together are viewed semantically as a single MADR object for processing.

Figure 12C:
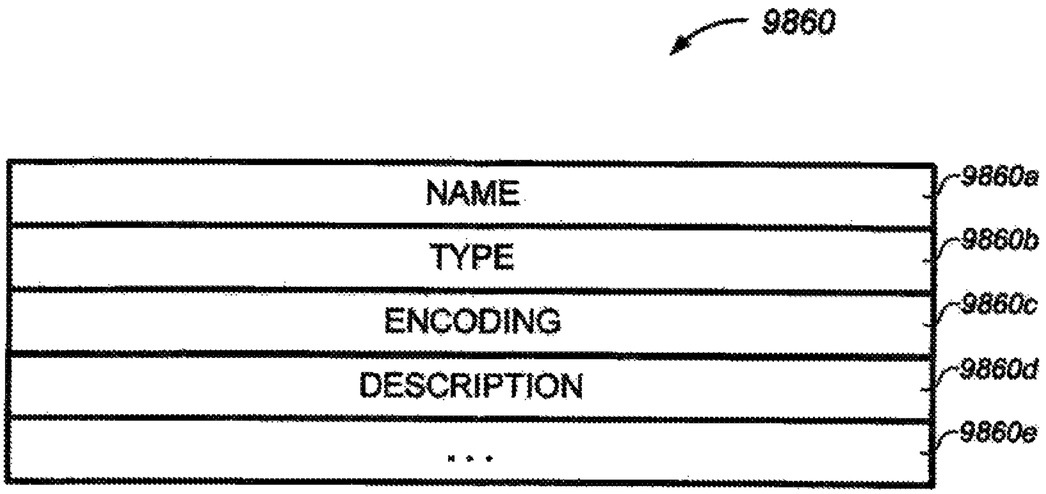
FIG. 12C depicts a preferred embodiment of a Location Reference Data Record (LRDR) for discussing message processing.

FIG. 12C depicts a preferred embodiment of a Location Reference Data Record (LRDR) 9860 for discussing message processing. Location Reference Data Records (LRDRs) 9860 contain reference-able location data which has been saved by a MS user, for example from a map application, navigation application, or other application where a user can mark a saved location. Typical industry terminology includes "waymarks", "waypoints", "pushpins", "bookmarks", "geofence", or any other metaphor whereby a user saves a location from an application, perhaps with a radius, boundary(s) or measurements indicating an area or place in space. The web service (www.gpsping.com and www.pinggps.com) of patent pending Ser. No. 11/207,080 ("System And Method For Anonymous Location Based Services", Johnson) coined terms of "PingSpots" and "Pingimeters" which are similar location metaphors and may be contained in LRDRs 9860. LRDRs 9860 may or may not be maintained local to a MS. The terminology "waymark information" used herein is to include all these embodiments to facilitate explanation brevity. Encoding field 9860*c* contains any reasonable whereabouts embodiment for such metaphors, for example such as those used in a graphical user interface. LRDRs are preferably created using a convenient map navigation interface for marking locations on a map, and can be modified (i.e. LRDR fields), moved (i.e. for modifying field 9860*c*), or discarded by a user with a suitable interface.

Name field 9860*a* contains a name for the LRDR 9860, type field 9860*b* contains a type of LRDR for correct interpretation of field 9860*c* (e.g. a plurality of applications sharing a waymark information repository), encoding field 9860*c* contains the whereabouts encoding which can be parsed and processed as indicated by type field 9860*b*, description field 9860*d* contains a user defined description for the LRDR (preferably a text description which can be annotated/annunciated unambiguously), and other fields 9860*e* are not of immediate interest here. In some embodiments, name field 9860*a* contains the description and field 9860*d* is not necessary. In some embodiments, description information (e.g. field 9860*d*) is a recording (e.g. made by a user for audio and/or video presentation for describing LRDR information), and a description type field (e.g. additional field 9860*t*) may be provided to facilitate interpreting different description formats in field 9860*d*. A user may ensure descriptions are unique if an application does not enforce unique descriptions. Map Term Data Records (MTDRs) of the parent applications can also be maintained as LRDRs and accessed appropriately when used. LRDRs 9860 provide the interface for activities of applications used to mark locations so MADR presentation processing can use those locations for useful functionality.

With reference now to FIGS. 7A through 7E, depicted is the preferred embodiment BNF grammar from the parent applications, in particular for memorable reference. An Expression of FIG. 7D may be specified for field 9850*g*. Such an Expression or derivative embodiments thereof may be user configured/specified, preconfigured user selected choices at a data processing system, configuration generated, or defaulted/set in accordance with other user configurations. Various embodiments will interpret at message access time the expression of field 9850*g*, or a data processing system (e.g. MS 2) may internalize field 9850*g* at configuration time for efficient processing at a later time (e.g. at block 9936 upon any configuration changes) when the message is accessed. The reader should appreciate the full scope, meaning, processing, and many embodiments possible as represented by FIGS. 7A through 7E.

With reference now to FIG. 11A, depicted is a LBX application fields implementation status table from the parent applications, in particular for memorable reference. While FIG. 12D facilitates discussing a few application examples of message processing, any application involving a sender (or shooter, caller, invoker, submitter, etc) and recipient (or shoot-ee (e.g. MS being shot), invokee, submittee, etc) may participate in using the message processing disclosed. MADRs will be processed similarly to the descriptions herein for every application with inbound or outbound event. Generic processing is involved for any application, including the disclosed shoot application section 8002*m*. A shoot application section 8002*m* is used for shoot functionality. Presence indicates shooting a WDR, and MADRs can be used for shoot application inbound and outbound processing. Shooting specific data is appropriately stored in the shoot application section for processing by the receiving data processing system(s) (e.g. MS(s)), and data which is being shot may be contained in any of the FIG. 11A application sections (e.g. as carried in fields 1100*k*).

With reference now to FIG. 12D, depicted is a table to facilitate explanation of message processing for ADs, OGMs, OCMs, and generic application COM processing. Explanation table 9875 shows a processing result for a particular scenario including a select exemplary set of applications. Special applications are described in rows 9892 and generic applications are described in rows 9894. Any application may be involved in MADR processing in a similar manner to rows 9894.

AD application: AD specific events are configured for when to access AD specific MADRs in repository 9800 for AD processing. ADs may be presented local to the data processing system hosting the repository 9800, or ADs may be presented at remote data processing systems. When an event occurs, MADRs are accessed and any applicable MADRs with expression fields 9850*g* evaluating to True are presented according to the other MADR fields and the observing user's preferences. A COM may also be associated to inbound or outbound advertising information.

OGM application: When a call goes unanswered at the receiving data processing system, processing accesses OGM specific MADRs, and any applicable MADRs with expression fields 9850*g* which evaluate to True are presented according to the other MADR fields. Typically, a single OGM is presented to the caller and an opportunity is provided to the caller for leaving a recorded message. OGM processing is well known in the art, however use of the message repository 9800 processing provides an improved method for customizing OGMs to specific callers. OGMs may be video in nature for video messaging between data processing systems (e.g. MSs).

OCM application: During an active call, a user can perform an action to invoke OCM processing. If the user made the call, it is assumed that the user (caller) has selected to automatically leave a recorded message at the callee's system, for example after the callee's system has presented an OGM (to the caller). When the user invokes OCM processing, the active call thread releases user interface focus (e.g. at the MS) and continues to execute in the background for accessing OCM specific MADRs and then presenting OCM information. The user is free to perform other application processing (i.e. use other thread(s) for other tasks) at the data processing system (MS) while the active call thread automatically processes the OCM and then terminates the call. This saves the caller time from having to leave a message at a callee's system while freeing up the MS for other activities concurrently. If OCM processing is invoked during a received call, the active call thread maintains user interface focus and the OCM is presented in parallel to the active call for both the caller and callee, for example to both hear or see a recording. While the most common embodiment is for voice calls, video calls also apply. The OCM will be presented visually as well as audibly provided the selected MADR provides visual information and the call involves a video session. Typically, a single OCM is presented to a callee's data processing system.

Email application (e.g. appfld.email.X): A COM can be associated to inbound or outbound email. An email COM comes in two forms: COM-L for processing email COM-L specific MADRs at the sender or recipient local system; and COM-R for processing specified email COM-R MADR(s) at the remote system(s). COM-L MADRs are searched for each email sent or received at the local system (e.g. MS). The SMS/texting application is analogous, preferably with out-of-band data (i.e. not part of SMS/text message) to communicate COM-R MADR information. Email descriptions are interchangeably applied to text messaging, albeit with more simple text message distributions.

Calendar application (e.g. appfld.calendar.X): A COM can be associated to inbound or outbound calendar information (e.g. meeting notice). A Calendar COM comes in the identical two forms: COM-L ("L for local) for processing calendar COM-L specific MADRs at the sender or recipient local system; and COM-R ("R" for Remote) for processing specified calendar COM-R MADR(s) at the remote system(s). COM-L MADRs are searched for each calendar item sent or received at the local system (e.g. MS).

Phone application (e.g. appfld.phone.X): A COM can be associated to inbound or outbound phone calls, voice or video, prior to OCM or OGM processing. A phone application COM comes in the identical two forms: COM-L for processing phone COM-L specific MADRs at the sender or recipient local system; and COM-R for processing specified phone COM-R MADR(s) at the remote system(s). COM-L MADRs are searched for each call made or received at the local system (e.g. MS).

Shoot application (e.g. appfld.shoot.X; not shown in FIG. 12D): A COM can be associated to inbound or outbound shots. A shoot application COM comes in the identical two forms: COM-L for processing shoot COM-L specific MADRs at the sender or recipient local system; and COM-R for processing specified shoot COM-R MADR(s) at the remote system(s). COM-L MADRs are searched for each shot made or received at the local system (e.g. MS).

For COM cases, processing takes place for MADRs which have expression field 9850*g* evaluate to True. COM-L (e.g. indicated in field 9850*d*) MADRs which have matching expressions (field 9850*g*=True) are processed for inbound and outbound scenarios. The expression itself may be used to distinguish between whether inbound or outbound distributions are of consideration, or what type of inbound or outbound event is of consideration. In some embodiments, specific COM uses (in field 9850*d*) may indicate how to search MADRs for inbound distributions, outbound distributions, and COM-R outbound distributions (e.g. COM-L-in-email, COM-L-out-email, COM-R-email).

Generic application rows 9894 provide the comprehendible model for other MS applications and COM processing that applies. The advertise application (e.g. appfld.advertise.X), profile application (e.g. appfld.profile.contents), ab application (e.g. appfld.ab.X), emergency application (e.g. appfld.emergency.X), rfid application (e.g. appfld.rfid.X), statistics application (appfld.statistics.X), shoot application (appfld.shoot.X) and appliance application (e.g. appfld.applicance.X) incorporate COM-L and COM-R processing analogously. MADRs presented to the user, or processed at a particular system have many different uses and applications. While MADRs support various presentation formats, any executable can be processed thereby performing processing which may or may not present anything. In some embodiments, the sender's data processing system automatically determines the appropriate COM-R MADR(s) without user involvement and appends the data to the distribution without the sending user being burdened with user interface for specification.

Inbound and outbound distributions for other applications are involved with receiving or sending data within the context of a particular application. For example, the presence of content within the WDR application fields section 1100*k* which is subordinate to an appfld section of fields 1100*k* is used to trigger MADR processor. Charters may be user configured to use AppTerm conditions for causing the same triggers and presentation actions can be configured when the AppTerm expressions evaluate to True. However, a MADR is a presentation object with a "content-centric" approach, "content-centric" in that an operating system independent object (i.e. the MADR) defines all necessary information for the presentation. Application configuration can be conveniently isolated in field 9850*d*. MADRs may be populated by an application installation and removed by an application uninstall. Field 9850*d* may be set by an application installation and unset by an application uninstall. WDRs are not to be the only transport of data between systems in context of the particular application. Other embodiments for communicating data between systems may be used. Continuing with some of the other examples and regardless of transmission embodiments, an inbound/outbound advertisement, inbound/outbound profile, inbound/outbound address book entity, inbound/outbound emergency communication, inbound/outbound rfid transmission, inbound/outbound statistics data entry, inbound/outbound appliance communication transmission, or inbound/outbound distribution of data in other applications can have associated objects (i.e. MADRs) for automated presentation/messaging.

Figure 13:
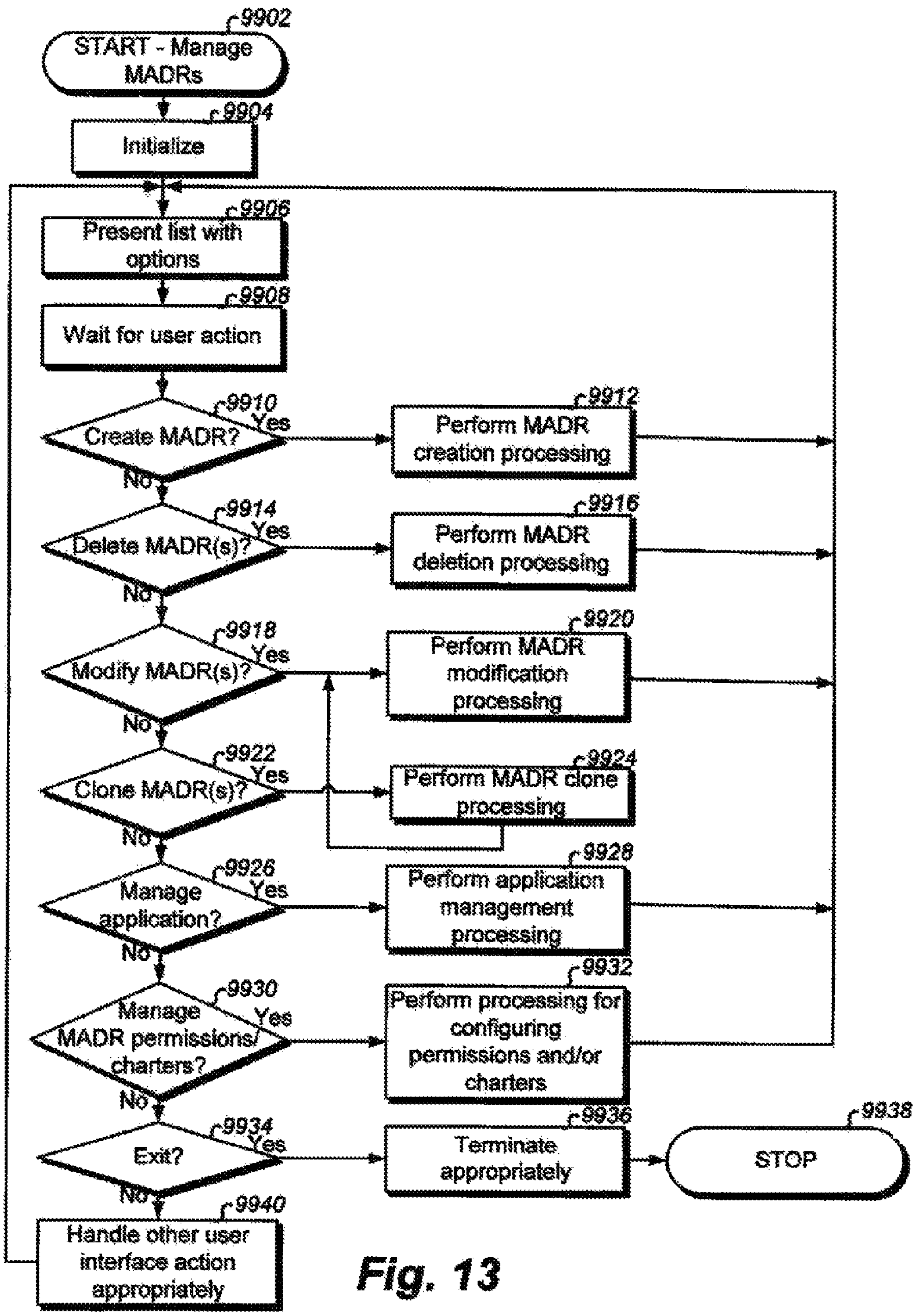
FIG. 13 depicts a flowchart for a preferred embodiment for MADR configuration processing.

With reference now to FIG. 13, depicted is a flowchart for a preferred embodiment of MADR configuration processing, as was well described in parent applications. While FIG. 13 is provided for memorable reference, the reader should appreciate the full scope, meaning, processing, and many embodiments possible for appropriate MADR maintenance and configuration. FIG. 13 provides an interface for creating, deleting, modifying, and managing MADR data in context of their specifications (e.g. FIG. 12B).

Figure 14:
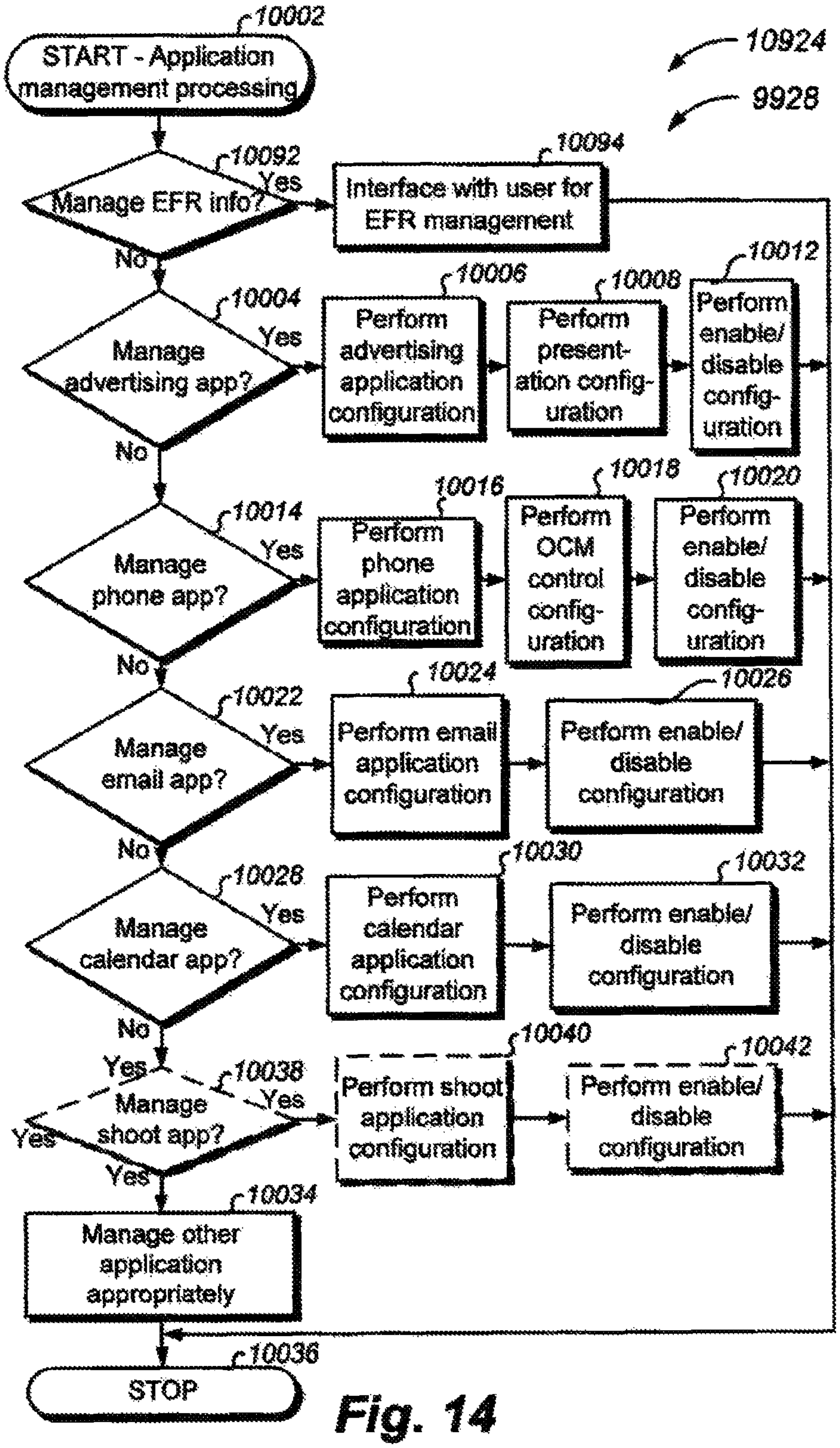
FIG. 14 depicts a flowchart for a preferred embodiment of application management processing.

FIG. 14 depicts a flowchart for a preferred embodiment of application management processing. Block 9928/10924 processing begins at block 10002 and continues to block 10092. If block 10092 determines that EFR 9855 information was selected for being managed by the user, block 10094 interfaces with the user for creating, deleting, modifying and maintaining EFRs 9855. The user may choose to save changes or exit any changes before continuing to block 10036 for terminating block 9928/10924 processing. EFRs tend to be application specific for filtering events for MADR processing, however the same EFRs may be configured for a plurality of different applications.

History field 9855*e* is to be appropriately updated to reflect user configurations made at block 10094. While not explicitly shown, field 9855*e* is used at block 10094 to enforce permissions (privileges) between the user using FIG. 14 processing and the user who originated or last updated the EFR for what EFR alterations and management is permitted to be performed. Block 10094 provides errors to the user of FIG. 14 processing when a needed privilege has not been granted.

If block 10092 determines the user did not select to manage EFRs, then processing continues to block 10004. Block 10004 starts the series of checking which particular application was selected for management from block 9906 options. If block 10004 determines the application to be managed is the advertising application, block 10006 performs advertising application configuration, for example data which may be found in section 8004*f*, and processing continues to block 10008. The user interfaces at block 10008 to set how the advertising application will present AD MADR information. A preferred embodiment of block 10008 configure a user's presentation preferences for all MADR presentations, in particular since many of the MADRs for any application may contain advertisement information, perhaps shared from another MS or system. Having block 10008 configure all MADR presentation reminds the user that advertising is involved despite there being useful MADR configurations that do not involve advertising. Block 10008 supports configuration outside of MADR data of a visual mode setting can be set here for the observer's preference of: full screen, dedicated user interface visual area, newly spawned window, pop-up (e.g. window) with "stolen" focus, title-bar area of currently focused window, user originator's intent, or other visual method for presenting MADR information. An audio mode setting can also be set for the observer's preference of: mix, preempt, or use originator's intent. Note that MADR presentation will compare an originator's intent configured in the MADR with the observer's preference for reconciling a best fit presentation of the MADR. Permissions govern authoritative reconciliation when there is a conflict between the originator's intent and the observer's preference. Block 10008 continues to block 10012.

Block 10012 preferably accesses the most recent settings of Boolean variables for enabling MADR processing as a whole. Each Boolean variable (data) accessed by FIG. 14 is preferably maintained to an application term, referred to as AppTerm. An AppTerm was well defined in the parent applications and was well described in context of the BNF grammar of FIGS. 7A through 7E (see FIG. 7D). At blocks 10012, 10020, 10026, 10032, 10040 and 10034, Boolean variables are provided for enable/disable of all MADR processing (e.g. MADR_srch), enable/disable certain application MADR processing (e.g. MADR_AD), or enable/disable certain subsets of application MADR processing (e.g. MADR_COM-R-cal for calendar). Blocks 10012, 10020, 10026, 10032, 10040 and 10034 preferably use permissions to enforce what subsets of processing can be enabled or disabled.

For example, the user can enable or disable all processing involving functionality provided by the message repository for any of: ADs, OGMs, OCMs, and COMB for inbound and/or outbound distributions in context of particular applications (shoot, advertising, phone, email, address book, calendar, profile, emergency, rfid, statistics, appliance, etc). This provides a user with the ability to enable or disable all of a category of message repository functionality as desired outside of activating/deactivating specific MADR fields 9850*j*. Current setting(s) are accessed at block 10012 and preferably presented to the user. The user may change (e.g. toggle) the setting within context of the particular application of FIG. 14 processing, or leave the current settings as they are.

Block 10012 provides the user with ability to enable/disable all MADR processing or any subset of AD and advertise application MADR processing. Processing continues to block 10036 where block 9928/10924 processing terminates. If block 10004 determines the user did not select to manage the advertising application, processing continues to block 10014.

If block 10014 determines the application to be managed is the phone application, block 10016 performs phone application configuration, for example data which may be found in section 8002*f* as described in the parent applications. For example, a user interfaces at block 10016 to set how the phone application will behave. Block 10016 preferably accesses the most recent settings, and the user confirms or changes as desired. Thereafter, block 10018 enables the user to specify how to request a desired OCM, and additionally saves any changes before continuing to block 10020. The user can specify which user action (e.g. hot-key, touch screen action, etc) will request a default OCM, which user action will request the best fit OCM, and which user action will select a specific referenced OCM (preferably using field 9850*a*). The user action specified may also indicate whether or not to wait for a recording delimiter prior to leaving the message, for any of the requests. For example, in a hot-key user action embodiment, a <ctrl-d> selects the default OCM, a <ctrl-b> selects the best fit OCM, and an <Alt> key pressed while followed by character(s) or number(s) maintained in an embodiment of field 9850*a* selects the particular OCM. However, when the capital lock key is on, this indicates to wait for a delimiter prior to automatically leaving the message. Unique touch motions may also be used. There are many different user actions which can be configured depending on the MS user interface. Waiting for a delimiter may be implemented regardless (e.g. no specific user action required), or may not be implemented at all (e.g. user waits for OGM). Depending on embodiments, block 10018 enables the user to select desirable user interface actions for making an OCM request. Block 10020 interfaces with the user for managing Boolean variables for enable/disable of all MADR processing (e.g. MADR_srch), enable/disable OGM MADR processing, enable/disable OCM MADR processing, or enable/disable certain subsets of phone application MADR processing (e.g. MADR_COM-L-phone). Thereafter, block 9928/10924 processing terminates at block 10036. If block 10014 determines the user did not select to manage the phone application, processing continues to block 10022.

If block 10022 determines the application to be managed is the email application, block 10024 performs configuration of the email application, for example data which may be found in section 8002*c* as described in the parent applications. For example, a user interfaces at block 10024 to set how the email application will behave. Block 10024 preferably accesses the most recent settings, and the user confirms or changes as desired. Thereafter, block 10026 interfaces with the user for managing Boolean variables for enable/disable of all MADR processing (e.g. MADR_srch), enable/disable all email application MADR processing or enable/disable certain subsets of email application MADR processing (e.g. MADR_COM-R-email). Thereafter, block 9928/10924 processing terminates at block 10036. If block 10022 determines the user did not select to manage the email application, processing continues to block 10028.

If block 10028 determines the application to be managed is the calendar application, block 10030 performs configuration of the calendar application, for example data which may be found in section 8002*d* as described in the parent applications. For example, a user interfaces at block 10030 to set how the calendar application will behave. Block 10030 preferably accesses the most recent settings, and the user confirms or changes as desired. Thereafter, block 10032 interfaces with the user for managing Boolean variables for enable/disable of all MADR processing (e.g. MADR_srch), enable/disable all calendar application MADR processing or enable/disable certain subsets of calendar application MADR processing. Thereafter, block 9928/10924 processing terminates at block 10036. If block 10028 determines the user did not select to manage the calendar application, processing continues to block 10038.

If block 10038 determines the application to be managed is the shoot application, block 10040 performs configuration of the shoot application, for example data which may be found in section 8002*m* (see FIG. 11B discussions). For example, a user interfaces at block 10040 to set how the shoot application will behave. Block 10040 preferably accesses the most recent settings, and the user confirms or changes as desired. Thereafter, block 10042 interfaces with the user for managing Boolean variables for enable/disable of all MADR processing (e.g. MADR_srch), enable/disable all shoot application MADR processing or enable/disable certain subsets of shoot application MADR processing (e.g. MADR_COM-R-shoot). Thereafter, block 9928/10924 processing terminates at block 10036. If block 10038 determines the user did not select to manage the shoot application, processing continues to block 10034.

Block 10034 interfaces with the user to manage an other application analogously to applications above (e.g. email, calendar). Thereafter, processing continues to block 10036 where block 9928/10924 processing terminates. Block 10034 handles other applications, such as those shown in FIG. 11A, including COM configurations for analogous processing. COM-L-app MADRs (via field 9850*d*) are utilized on inbound and outbound distributions at the local MS, and COM-R-app MADRs (via field 9850*d*) are utilized on outbound distributions for being processed at the remote (receiving) MS, for example as specified by the sending user (i.e. for all applications "app"=SMS/texting, advertise, profile, ab, emergency, rfid, statistics, appliance, etc).

With reference now to FIG. 11B depicted is a section description of the registered LBX shoot application fields. Shoot section 8002*m* includes subordinate sections including the following examples:

| | |
|---|---|
| appfld.shoot.purpose | This value is preferably set by the application context from which a shot is made. The default is "USUAL" which results in any configured inbound WDR processing and/or MADR inbound processing. |
| appfld.shoot.params | Optional shoot parameter data which may be specified for appfld.shoot.purpose other than "USUAL". appfld.shoot.params.ct for the number (ct = count) of parameters being passed and appfld.shoot.params.# (1 for first, 2 for second, etc.) for each parameter passed. Parameters preferably have a 2 byte leading indicator for the type of data which is being passed. Strings are null terminated. An alternate embodiment includes two leading bytes for the data length. |
| appfld.shoot.fuzzyD | Estimated distance (e.g. centimeters) to target(s). User may set this so as to prevent shooting a MS in front of, or behind, a desired target. EDM functionality may set this. Parabola determination may set this. A leading byte indicates if the value is user set, EDM set, or parabola set. The default is 100 (e.g. centimeters). |
| appfld.ashoot.fuzzyT | Estimated target radius (e.g. centimeter) to target(s). User may set this so as to prevent shooting a MS next to a desired target. The default is 12 (e.g. centimeters). |
| appfld.shoot.maxTargs | Maximum number of targets for a single shot. The default is 1. |
| appfld.shoot.mag.X | Historical IMU data which may be used for lobbing or throwing an arc to reach a target. The default is .ct = 0. appfld.shoot.mag.ct for the number (ct = count) of entries being passed and appfld.shoot.mag.# (1 for first, 2 for second, etc.) for each entry passed. Entries consists of an 8 byte leading Julian data followed by an IMU sensing type, followed by an axis indicator byte, followed by the IMU measurement. |
| appfld.shoot.confirm | Boolean for whether to confirm shot after seeing target information. Default is False (i.e. no wait for confirmation to arrive from target(s) before confirming shot). |
| appfld.shoot.lastout.ANY.* | All fields of any last shoot action: appfld.shoot.lastout.purpose, appfld.shoot.lastout.params, . . . , etc. |
| appfld.shoot.lastin.{id}.* | There is a field here for each appfld.shoot.lastout.ANY.* field above, however a specific id can be specified (e.g. Joe). This allows access to fields of the most recent shooting to a specific recipient. There are a plurality of fields (i.e. *) represented by this row to prevent redundantly listing each field again for an appfld.shoot.lastout.{id} section . . . |
| appfld.shoot.lastin.ANY.* | All fields of last shot received: appfld.shoot.lastin.purpose, appfld.shoot.lastin.params, . . . , etc. |
| appfld.shoot.lastin.{id}.* | There is a field here for each appfld.shoot.lastin.ANY.* field above, however a specific id can be specified (e.g. Joe). This allows access to fields of the most recent shot received from a specific identifier. There are a plurality of fields (i.e. *) represented by this row to prevent redundantly listing each field again for an appfld.shoot.lastin.{id} section . . . |
| . . . other field sections . . . | . . . |

Shoot section 8002*m* information may contain useful information for LBX sharing and novel applications thereof with respect to a shoot application. For example, a WDR received may be treated uniquely based on a shoot entry in progress (WDR in-process at receiving MS or sending MS) or a shot entry last made (in-process shot at receiving MS or sending MS). Charters can use data above in AppTerm form as well. In some MS embodiments there are multiple shoot applications (e.g. one each for infrared, laser, RF, sound, etc) wherein the hierarchical section structure would be affected for supporting each shoot application with data specific for the particular application (e.g. appfld.shoot.infrared for qualifying all infrared subordinate sections (e.g. appfld.shoot.laser, appfld.shoot.RF, etc)). Specific 8002*m* appfld sections can be enabled or disabled by the user as desired. Default processing will occur in shoot processing if not found when accessed.

Figure 15:
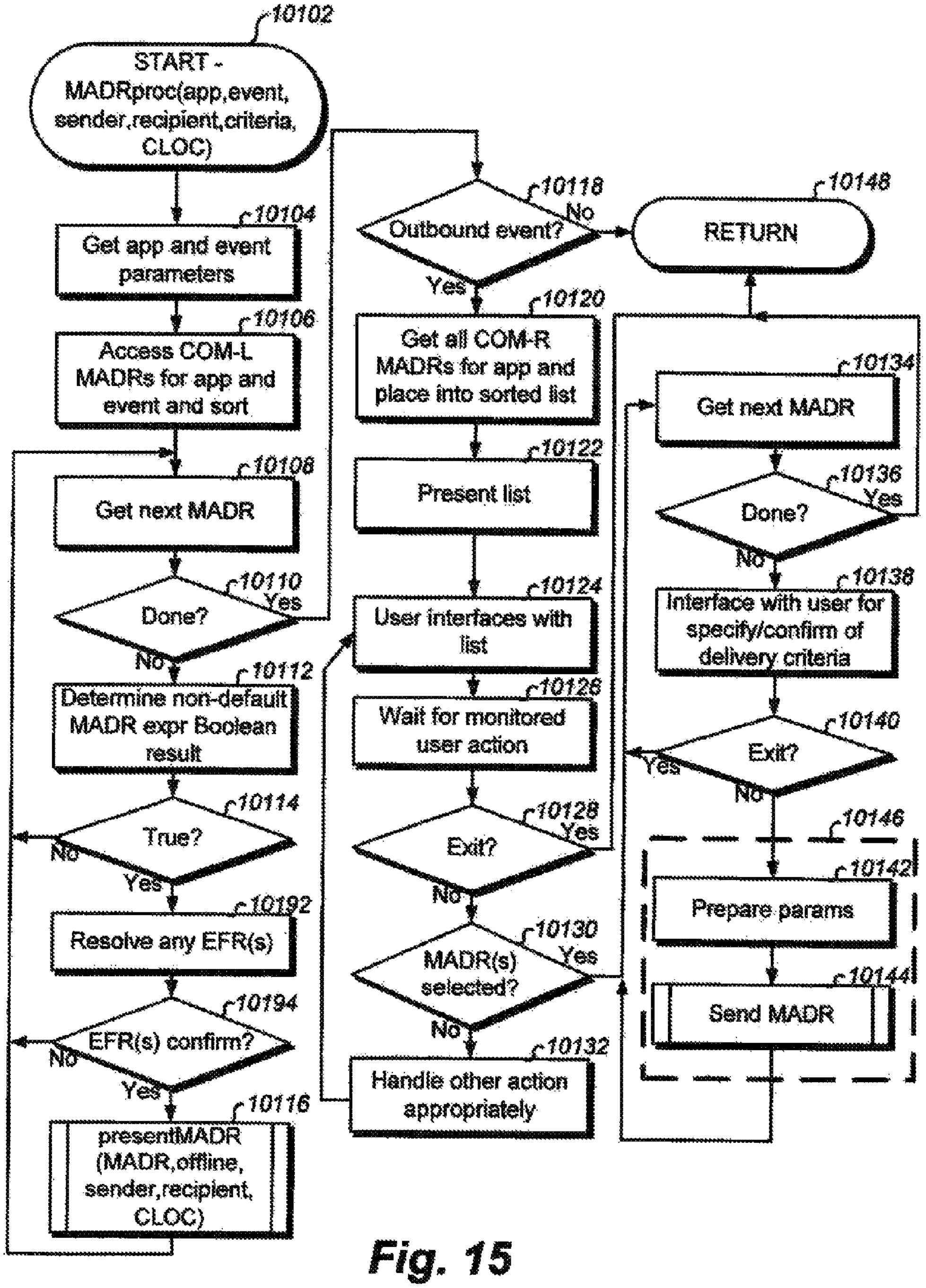
FIG. 15 depicts a flowchart for a preferred embodiment of a procedure for preferred MADR processing of a particular event for a particular application.

With reference now to FIG. 15, depicted is a flowchart for a preferred embodiment of a procedure for preferred MADR processing of an event for generic applications described by rows 9894 for a particular application, such as email, calendar, advertise, phone, shoot, profile, ab, emergency, rfid, statistics, appliance, etc. Special application rows 9892 are described elsewhere. Processing begins at block 10102 upon an inbound or outbound event (e.g. at a MS) for a particular application, and continues to block 10104 where parameters are determined. Depending on implementation, an inbound event may occur when a distribution is received, when a distribution is acted upon (e.g. seen) by a user, or as is appropriate in designating an inbound event, preferably consistent across MS applications. Depending on implementation, an outbound event may occur when a distribution is sent from the application, when a distribution is transmitted from the MS, or as is appropriate in designating an outbound event, preferably consistent across MS applications. An alternate embodiment maintains separate bits to field 9850*d* for different varieties of COM types for distinguishing between a plurality of inbound or outbound event types for the same application. While FIG. 15 demonstrates MADR processing of interest to this disclosure, it should be understood that the transport used (e.g. email transport) for the associated distribution may also be used for carrying a MADR object to prevent two separate transmissions, for example in the case of COM-R processing. For example, a MADR object can be attached as a special attachment to an email which is then sent with an email delivery API. There are other embodiments for sending the COM-R MADR to a receiving system.

The app parameter indicates which application is causing FIG. 15 invocation and the event parameter indicates which event occurred that is associated to the application. The invoking application is assumed to take care of the inbound/outbound distribution on its own so that FIG. 15 is for MADR processing. Other embodiments will support handling of the distribution (e.g. to send it) and the MADR in the same invoked interface and/or transmission. The sender parameter is the sender of the application event (e.g. phone call caller, text message sender, etc) and the recipient parameter is the recipient of the application event (e.g. callee, text message recipient, etc). In a preferred embodiment, criteria is a pointer to a text stream (email body, calendar item body, text message, text stream derived from an active call, etc) which can be compared to a field 9855*c* (e.g. keywords compare data) for when the application event is to be associated with matching EFR(s) to distribution information associated to the event. However, criteria can be any form which may be matched to EFR information. The CLOC parameter is CLOC information received with a distribution. Parameters may take on a variety of embodiments for passing the same information. The parameters sender, recipient, criteria and CLOC may or may not be null when FIG. 15 is invoked. In one embodiment, MADRs 9850 include additional fields for sender and recipient comparison information which can be used to access specific MADRs at block 10106.

Thereafter, block 10106 accesses all active and un-expired MADRs with use field 9850*d* for the particular application and event. For example, each COM-L variety includes: COM-L-email, COM-L-calendar, COM-L-phone, COM-L-advertise, COM-L-profile, COM-L-ab, COM-L-emergency, COM-L-rfid, COM-L-statistics, COM-L-appliance, COM-L-shoot, etc; and an event can be either inbound or outbound. Block 10106 preferably sorts the MADRs for ordered processing based on a select set of field settings in the MADRs. Block 10106 also uses Boolean variables set in FIG. 14 to determine if any MADRs should be searched at all. Processing continues to block 10108. In one embodiment, block 10106 first accesses all expired MADRs (checking data in field 9850*f*) and expires them (i.e. preferably inactivates, or discards).

Block 10108 gets the next MADR for processing and block 10110 checks to see if all MADRs from block 10108 have been processed, in which case processing continues to block 10118, otherwise processing continues to block 10112. One MADR is preferably found if any are found (e.g. a default), but none may be found. When a MADR is marked a default with default field 9850*e*, expression field 9850*g* (probably null for this case) is assumed to be True (i.e. no field 9850*g* check necessary) and processing will proceed to block 10192 via block 10114. Otherwise, block 10112 determines the Boolean result for expression field 9850*g* preferably in real-time by evaluating conditions of the expression using stack processing and access to applicable terms. Thereafter, if block 10114 determines expression field 9850*g* evaluated to True, then block 10192 accesses any joined EFRs to the MADR in process. Block 10192 determines: a) no EFRs are joined; b) one or more EFR(s) joined do not match criteria and/or CLOC information passed as parameters; or c) all EFR(s) joined match the criteria and CLOC information passed as parameters. Block 10192 compares location type EFRs to the CLOC parameter if not null, compares the keyword(s) type EFRs to the criteria parameter, and compares the scheduling information type EFRs to the criteria parameter, if not null. The criteria parameter may include a type field for facilitating a match so multiple EFR types can be joined, or type field 9855*b* is used for interpretation of both fields 9855*c* and the criteria parameter for a single joined type. Many types of criteria may be supported in EFRs. Location type EFRs clarify event handling for a certain location match. Keyword(s) types EFRs clarify event handling for certain associated keywords, for example as contained in the application distribution (e.g. email, text message, etc). Date/time type EFRs are typically not used since expression field 9850*g* is used for qualifying this information anyway. Thereafter, if block 10194 determines the MADR does indeed match the requirements of the application which invoked FIG. 15 processing, then block 10116 invokes a presentMADR procedure of FIG. 16A with parameters passed for: the MADR object (e.g. or pointer thereof), a constant of “offline”, sender, recipient and CLOC information if available, and processing continues back to block 10108. If block 10194 determines one or more EFRs do not match parameters, then processing continues back to block 10108. If block 10114 determines the expression evaluated to False, then processing leaves block 10114 for block 10108. When zero or more COM-L MADRs are processed, block 10018 checks to see if the application event is an outbound event. If the event is an outbound distribution, processing continues to block 10020, otherwise processing continues to block 10148 where the application context invoker is returned to. Block 10120 accesses active COM-R MADRs for the particular application (e.g. COM-R-email) and places them into a recognizable list a user can act upon, block 10122 presents the list to the user of the MS of FIG. 15 processing, block 10124 interfaces with the user for list selections, and block 10126 waits for particular user actions. Block 10120 preferably sorts the MADRs based on a select set of field settings in the MADRs. Block 10120 also uses Boolean variables set in FIG. 14 to determine if any MADRs should be searched at all. One MADR is preferably found if any are found, but none may be found. The user may examine any MADR data prior to making a selection at block 10124, for example by actions processed at block 10132. If no MADRs are found, the list is an empty list where the user can interface at block 10124 for exiting via block 10128. When an action is detected, block 10126 continues to block 10128. If block 10128 determines the user selected to exit processing, then the application context event detecting invoker of FIG. 15 is returned to at block 10148, otherwise processing continues to block 10130. If block 10130 determines the user selected one or more MADR(s) (e.g. COM-R), then processing continues to block 10134, otherwise any other action at block 10124 is appropriately handled at block 10132 and processing continues back to block 10124.

Block 10134 starts an iterative processing loop by getting each selected MADR and continuing to block 10136. If block 10136 determines all selected COM-R MADRs have not yet been processed, processing continues to block 10138, otherwise processing continues to block 10148 for returning to the invoker of FIG. 15. Block 10138 interfaces with the user to specify and/or confirm delivery criteria (field 9850*h*) for where to send/present the message field 9850*c* information (e.g. remote MS). When accessed at block 10120, COM-R MADR fields 9850*h* may be set to null, populated with a useful default or starter data, or may already contain complete information. The user can confirm or specify different delivery criteria at block 10138. In some embodiments, the user can alter any MADR fields prior to sending, preferably as governed by permissions. If the user decided to exit out of MADR processing at block 10138 as detected at block 10140, then processing continues back to block 10134, otherwise the MADR is delivered to the remote MS(s) by preparing send parameters at block 10142 and invoking send processing of FIG. 10A at block 10144 before continuing back to block 10134. Depending on settings in the application distribution for outbound processing, FIG. 10A may need to be invoked for a plurality of recipient MSs, therefore an iterative loop 10146 is appropriately incorporated around blocks 10142 and 10144 for handling multiple recipients, and for handling attempts for a prioritized retry. An alternate embodiment may handle multiple recipients in send processing invoked at block 10144 depending on a transport interface used. Parameters are prepared at block 10142 so a MADR is delivered in its entirety for processing at the receiving MS(s). Other transport mechanisms may be utilized, and of course cross application addressing may be used to map to a different addressing method. FIG. 15 focuses on MADR processing. Various embodiments may not assume the inbound or outbound application distribution associated with COM processing is processed appropriately outside of FIG. 15 processing. Preferably, a CLOC parameter is passed whenever possible, including via block 10144 (e.g. block 10142 accesses MS whereabouts for setting the CLOC data).

Another embodiment may not interface with the user at block 10138 and instead use delivery field 9850*h* to deliver the MADR for processing at the specified receiving MS(s). In this embodiment, the receiving MSs are assumed to be the targets for presentation/message information of the MADR sent.

Figure 10A:
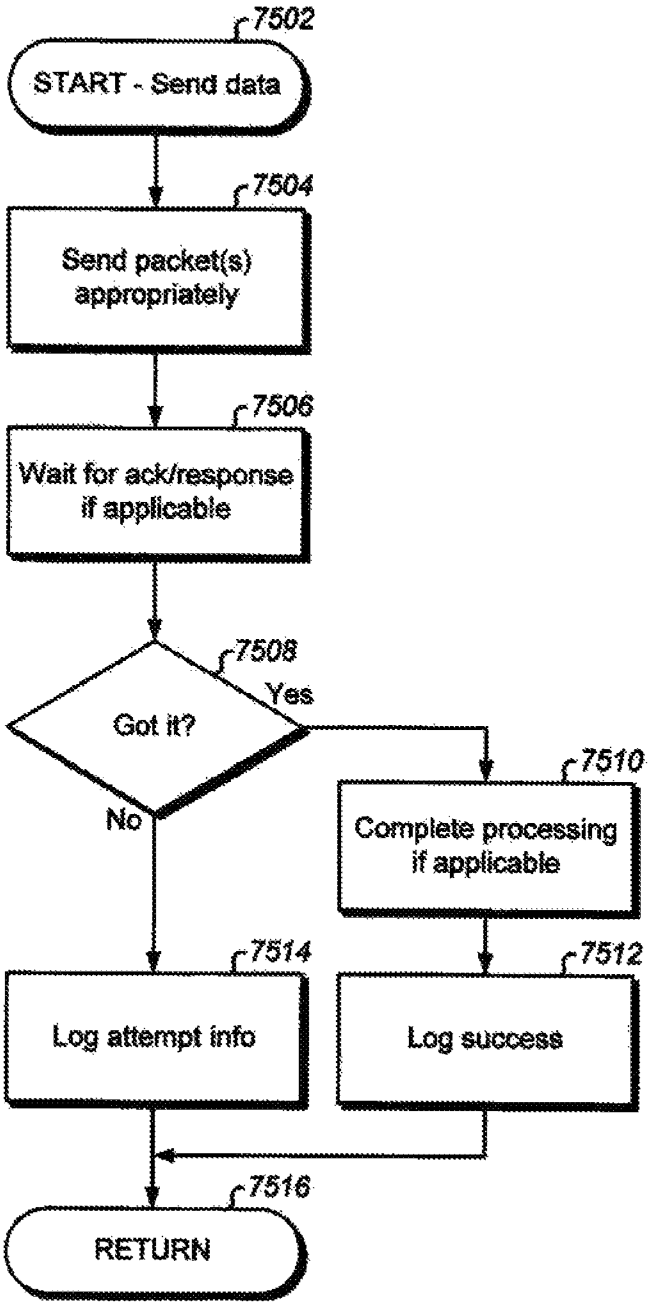
FIG. 10A depicts a flowchart for describing a preferred embodiment of a procedure for sending data to a remote MS.

With reference now to FIG. 10A, depicted is a flowchart for describing a preferred embodiment of a procedure for sending data to a remote MS, for example to perform a remote action of presenting the MADR information to a user. Parent applications contain discussions relevant to MADR processing. The purpose is for the MS of FIG. 10A processing (e.g. a first, or sending, MS) to transmit MADR data to other MSs (e.g. at least a second, or receiving, MS) for remote processing of the MADR information. The receiving MS may receive MADR data wirelessly by being within wireless range of the sending MS (i.e. no intervening data processing systems), or may receive over a peer to peer connection by way of data processing system(s) facilitating longer range data flow. Processing begins at block 7502, continues to block 7504 where the caller parameter(s) passed to FIG. 10A processing are used for sending at least one data packet containing properly formatted data for sending, and for being properly received and interpreted. Block 7504 may reformat parameters into a suitable data packet(s) format so the receiving MS can process appropriately (see FIG. 10B). Depending on the embodiment, any reasonable supported identity is a valid target (e.g. and may be derived from the delivery criteria). Thereafter, block 7506 waits for an acknowledgement from the receiving MS if the communication embodiment in use utilizes that methodology. In one embodiment, the send data packet is an unreliable datagram(s) that will most likely be received by the target MS. In another embodiment, the send data packet(s) is reliably transported data which requires a final acknowledgement that it was received in good order. In any case, block 7506 continues to block 7508.

Block 7504 formats the data for sending in accordance with the specified delivery method, along with necessary packet information (e.g. source identity, wrapper data, CLOC, etc), and sends data appropriately. The targeted MS should recognize that the data is meant for it and receives it. Block 7506 waits for a synchronous acknowledgement if applicable to the send of block 7504 until either receiving one or timing out. Block 7506 will not wait if no ack/response is anticipated, in which case block 7506 sets status for block 7508 to "got it". Thereafter, if block 7508 determines an applicable ack/response was received (i.e. data successfully sent/received), or none was anticipated (i.e. assume got it), then processing continues to block 7510 for potentially processing a response. Block 7510 will process the response if it was anticipated for being received as determined by data sent at block 7504. Thereafter, block 7512 performs logging for success. If block 7508 determines an anticipated ack was not received, then block 7514 logs the attempt. An alternate embodiment to block 7514 will log an error and may require a user action to continue processing so a user is confirmed to have seen the error. Both blocks 7512 and 7514 continue to block 7516 where the invoker is returned to for continued processing (e.g. back to block 10144).

Figure 10B:
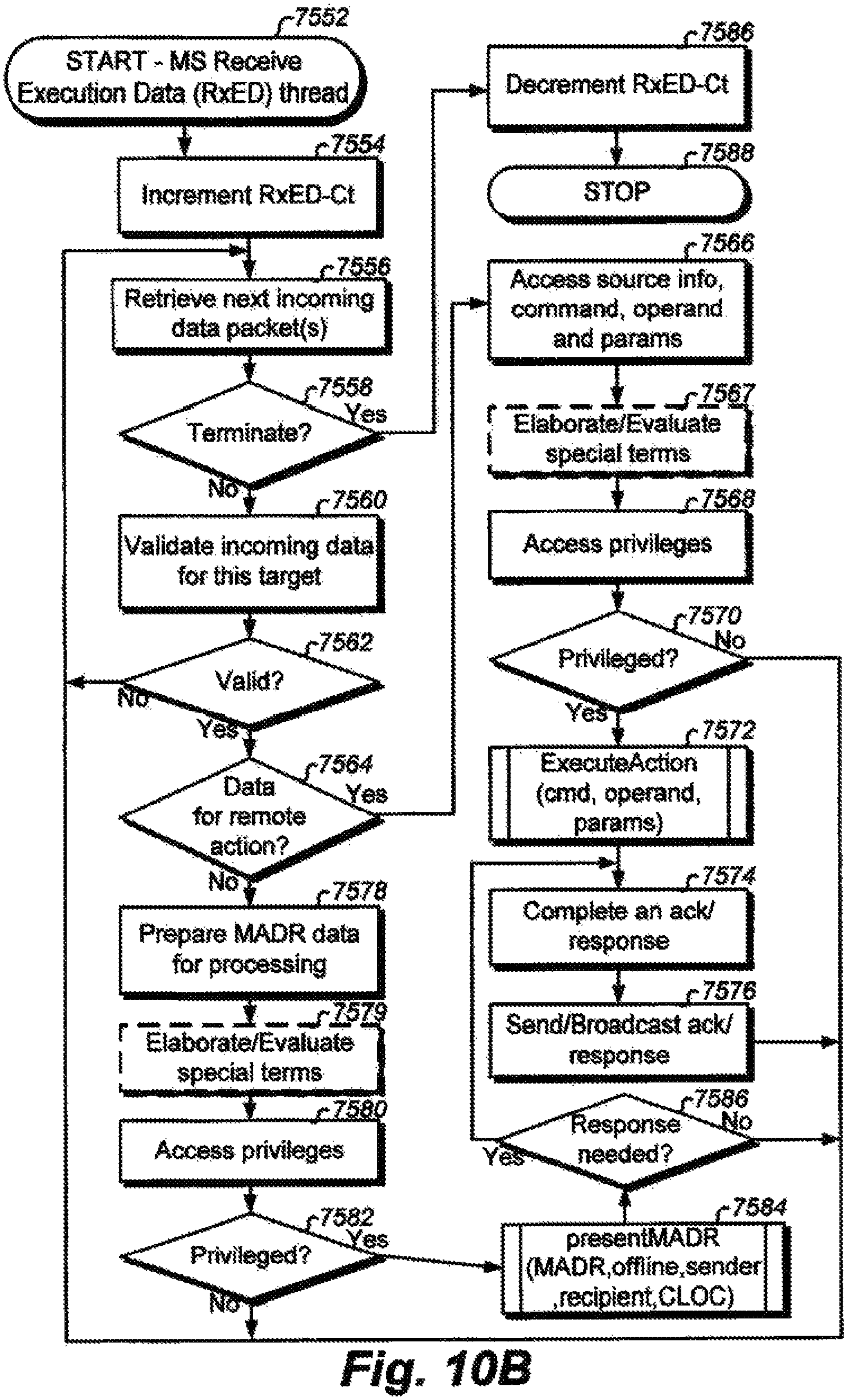
FIG. 10B depicts a flowchart for describing a preferred embodiment of processing for receiving execution data from another MS.

With reference now to FIG. 10B, depicted is a flowchart for describing a preferred embodiment of processing for receiving execution data from another MS, for example a MADR object. FIG. 10B processing describes a Receive Execution Data (RxED) process worker thread. There may be many worker threads for the RxED process. Parent applications contain discussions relevant to MADR data processing.

A RxED thread processing begins at block 7552, continues to block 7554 where a process worker thread count RxED-Ct is accessed and incremented by 1 (using appropriate semaphore access (e.g. RxED-Sem)), and continues to block 7556 for retrieving from a receive queue the sent data, perhaps a special termination request entry, and only continues to block 7558 when the MADR data, or record of data (e.g. action for remote execution, particular atomic command, or termination record) is retrieved. Block 7556 stays blocked on retrieving from a receive queue until data is retrieved, in which case processing continues to block 7558. If block 7558 determines a special entry indicating to terminate was not found in the receive queue, processing continues to block 7560. Block 7560 validates incoming data for this targeted MS before continuing to block 7562. A preferred embodiment of receive processing already validated the data is intended for this MS by having listened specifically for the data, or by having already validated it is at the intended MS destination (e.g. block 7558 can continue directly to block 7564 (no block 7560 and block 7562 required)). If block 7562 determines the data is valid for processing, then block 7564 checks the data for its purpose (remote action, particular command, or MADR processing). If block 7564 determines the data received is for processing a remote action, then processing continues to block 7566 as described in the parent applications. If block 7564 determines that the execution data is for processing MADR data, then processing continues to block 7578 where the MADR is prepared for subsequent processing. Block 7578 accesses MADR fields and block 7579 evaluates expression field 9850*g* in context of the receiving MS. Privileges should be accessed at block 7579 for special terms which require permission. If expression field 9850*g* evaluates to True, then the MADR data is so far assumed to be privileged for further processing. If the expression evaluates to False, or is not able to be evaluated because of an undefined or unprivileged term, then the MADR data is assumed to NOT be privileged for further processing, and block 7580 need not pursue access further to privilege data. Thereafter, block 7580 accesses privileges (i.e. if Expression evaluated to True) for eligible MADR processing to ensure the source has proper privileges for processing the MADR data at the MS of FIG. 10B processing. Block 7580 recognizes the MADR for not being privileged if expression field 9850*g* did not evaluate to True at block 7579. Expression field 9850*g* set to null implies a True evaluation result.

Figure 16A:
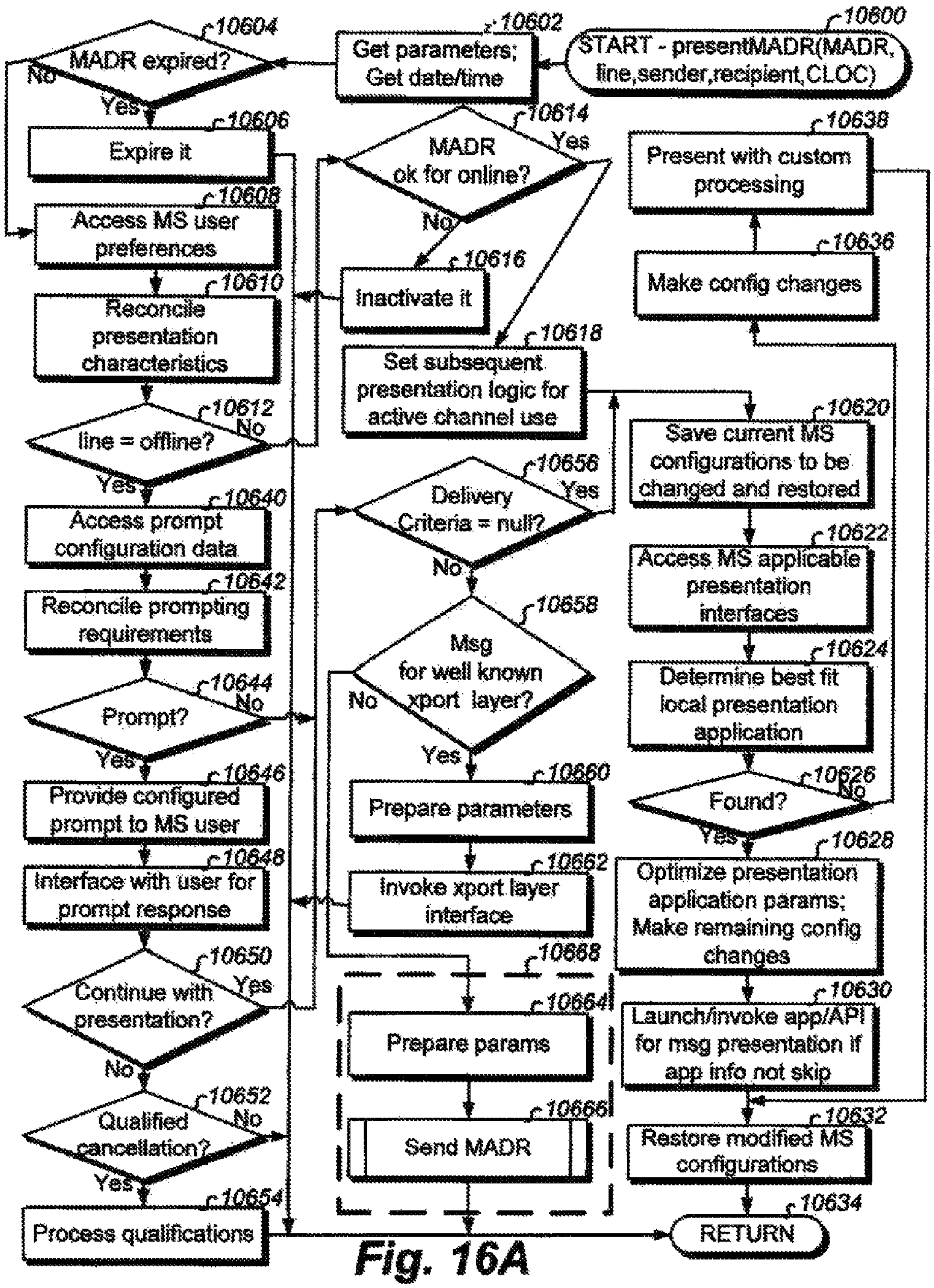
FIGS. 16A and 16B depict a flowchart for describing a preferred embodiment of a procedure for presenting MADR information.

Thereafter, if block 7582 determines the MADR data for execution is acceptable (and privileged), then block 7584 invokes the presentMADR procedure of FIG. 16A at the MS of FIG. 10B processing with parameters passed for: the MADR (e.g. a pointer thereof), a constant of "offline", and optionally (may be null) sender, receiver and CLOC information which may useful for presentation. Thereafter, block 7586 checks if a response is needed. If block 7586 determines a response is to be sent back to the originating MS, block 7574 completes a response to the originating MS of the data received at block 7556, and block 7576 sends/broadcasts the response before continuing back to block 7556 for the next incoming execution request data. If block 7586 determines a response is not to be sent back to the originating MS, then processing continues directly back to block 7556. If block 7582 determines the MADR for processing is not acceptable/privileged, then processing continues back to block 7556.

Referring back to block 7562, if it is determined that the data is not valid for the MS of FIG. 10B processing, processing continues back to block 7556. Referring back to block 7558, if a worker thread termination request was found at the receive queue, then block 7586 decrements the RxED worker thread count by 1 (using appropriate semaphore access (e.g. RxED-Sem)), and RxED thread processing terminates at block 7588. Block 7586 may also check the RxED-Ct value, and signal the RxED process parent thread that all worker threads are terminated when RxED-Ct equals zero (0).

For other acceptable receive processing, methods are well known to those skilled in the art for "hooking" customized processing into application processing of sought data received (e.g. mail application, callback function API, etc). Thus, there are well known methods for processing data for receiving MADRs for processing from an originating MS, for example when using email. Similarly, as described above, SMS/text messages can be used to communicate data, albeit at smaller data exchange sizes. The sending MS may break up larger portions of data which can be sent as parse-able text to the receiving MS. It may take multiple SMS/text messages to communicate the data in its entirety. Various embodiments will send MADR(s) along with an associated distribution.

Regardless of the type of receiving application, those skilled in the art recognize many clever methods for receiving data in context of a MS application which communicates in a peer to peer fashion with another MS. FIGS. 10A and 10B are an embodiment of MS to MS communications, referred to with the acronym MS2MS. Various MS2MS communication embodiments may include: reliable transport protocol involving a one or more packets (sends and acknowledgements) between systems for a single send; unreliable transport protocol involving one or more packets (sends and acknowledgements) between systems for a single send; or on-going communications processing which is subsequent to an initiation send of data between systems (e.g. peer to peer application processing. In some embodiments, the LBX service propagation architecture is leveraged for hopping data to the targeted peer MS wherein distance between an originating MS and a targeted MS is increased by intermediary MS(s) "middle-manning" the transmission.

COM-R event processing provides a user with useful confirmation of delivery status by sending a MADR object to a target remote system with an expression for checking presence of a previously sent distribution. If the previously sent distribution has been delivered, acted upon, or used as indicated by applicable AppTerm variables, the sending user can be delivered a message in any of the variety of presentation types for the confirmation of delivery status. Similarly, a confirmation of delivery status for a previously sent distribution not having been seen for a period of time, as indicated by applicable AppTerm variables, can be provided to the sending user in any of the variety of presentation types for the confirmation of delivery status. In some embodiments, processing of blocks 10120 through 10146 can be invoked at any time by a user, preferably with convenient user parameters for which MADRs to present in the list (e.g. by application and/or use and/or any selections of MADR field(s) values). All COM-R event processing can be accomplished with AD type MADR objects which are shared to target systems and triggered according to a plethora of configurable event options. COM-R processing is provided for convenience within context of a particular application event.

Figure 16B:
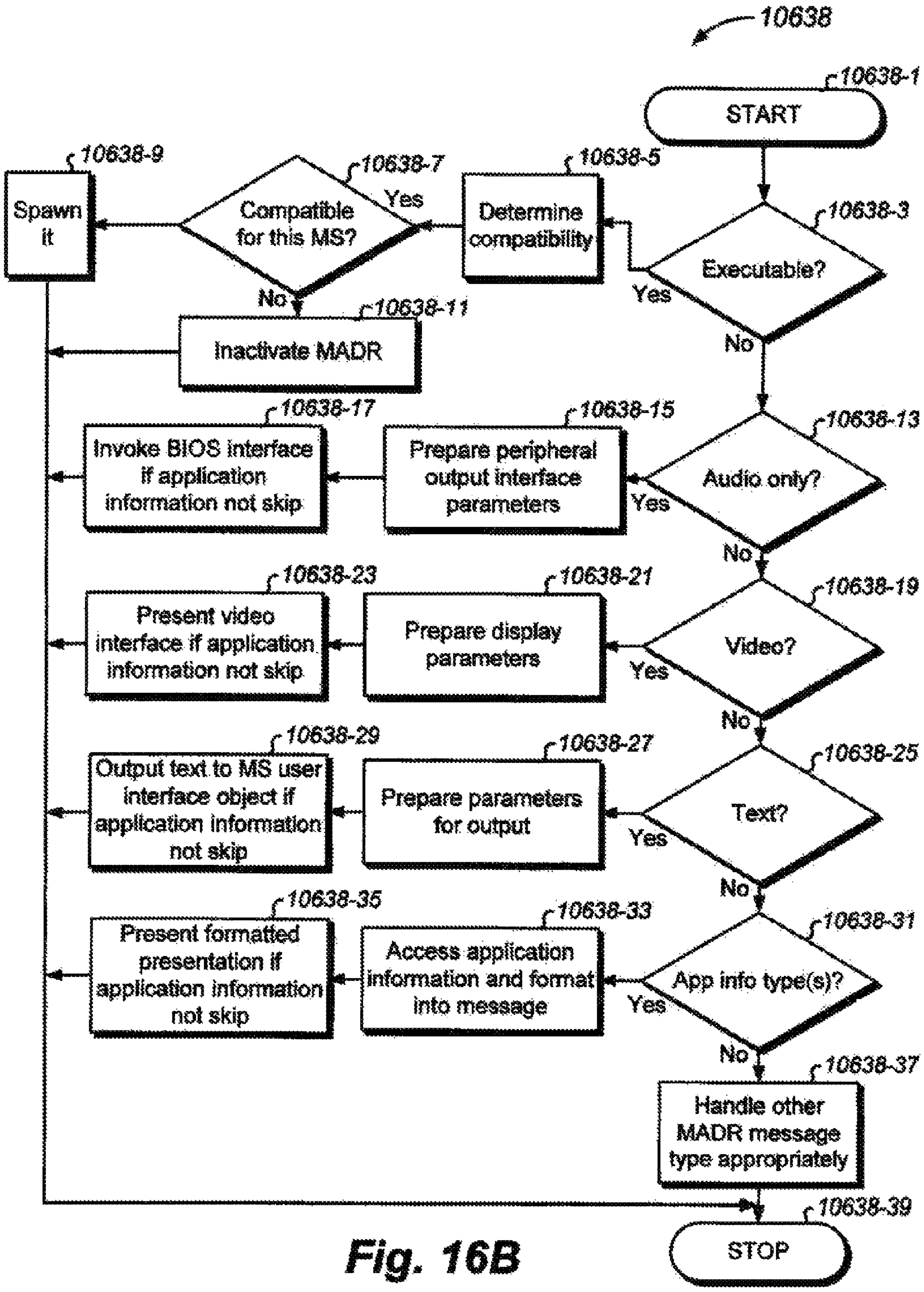

FIGS. 16A and 16B depict a flowchart for describing a preferred embodiment of a procedure for presenting MADR information. MADR presentation processing begins at block 10600, continues to block 10602 where parameters passed are determined, and a current system date/time stamp is accessed. Thereafter, block 10604 checks for expiration criteria in field 9850*f*, and if specified, compares the expiration date/time with the current date/time. If block 10604 determines the MADR is expired, block 10606 expires it (one embodiments inactivates field 9850*j* and another embodiment deletes the MADR entirely) and processing returns to the invoker at block 10634, otherwise block 10608 accesses user preferences maintained outside of MADR objects. Thereafter, block 10610 reconciles the MS (observer's) user's configured preferences with MADR (originator's) intent field 9850*f*.

Reconciliation includes setting MS configuration changes to make based on the originator's intent with the observer's preferences for any presentation characteristics (e.g. appearance specifications, volume adjustment specifications, full screen presentation, dedicated area presentation, pop-up/window, title-bar area, mix/preempt, etc), preferably using privileges to govern what can and cannot be set with authority. Thereafter, if block 10612 determines FIG. 16A was invoked for an active phone call line (channel information in parameter passed), processing continues to block 10614. If block 10614 determines the MADR cannot be presented appropriately for the active call line audio or video channel information (e.g. using type field 9850*b*), then block 10616 deactivates the MADR field 9850*j* and the invoker is returned to at block 10634. An alternate embodiment of block 10616 includes error notification processing. If block 10614 determines the MADR to be presented is suitable for the active phone call line, then block 10618 sets this FIG. 16A invocation's subsequent processing logic for making use of the active call line channel information, block 10620 saves current MS configurations determined for change at block 10610, block 10622 accesses available and suitable presentation interfaces at the MS, block 10624 determines which interface is a best fit for the MADR to be presented, and block 10626 checks if a suitable presentation interface was found. A MS should provide a variety of content presentation applications suitable for presenting MADR information. Some of these applications are prepackaged with the MS, or post-factory installed to the MS. For example, a video presentation application may be installed, or an audio application may be installed. A video presentation API may be installed, or an audio API may be installed. When arrived to from block 10618, there is preferably a phone API available for presenting audio information on the active audio channel, and there is preferably a video API for presenting video information on the active video call channel. A MS user may also install APIs or applications for certain presentation content types. Block 10622 accesses known useful applications/interfaces depending on type field 9850*b* and any active channel information, and block 10624 selects a best fit if there is more than one suitable application or interface, perhaps using a user's precedence configuration for which application to select. Thereafter, if block 10626 determines a suitable application or interface (e.g. API) was found, processing continues to block 10628.

Block 10628 optimizes parameters to the application or interface based on MADR field settings and block 10610 reconciliations, makes any remaining MS configuration changes that are not supported with parameters to the application or interface, and block 10630 invokes the application or interface with the parameters for presenting the MADR message field 9850*c*. Block 10628 will invoke FIG. 17 for resolving any application information specifications, for example to build the message for presentation, and block 10630 will not invoke the application or interface if FIG. 17 returns for skipping the presentation. Thereafter, block 10632 restores configurations (if any were modified at block 10628) saved at block 10620, and the FIG. 16A invoker is returned to at block 10634. If block 10626 determines a suitable application or interface was not identified for presenting the MADR at the MS, then block 10636 makes configuration changes (if any) determined at block 10610, block 10638 presents field 9850*c* with FIG. 16B custom processing, and processing continues to block 10632. Custom processing should be a last resort of presentation. The MS is preferably configured with suitable presentation applications or interfaces which can be determined at blocks 10622/10624. Suitable application or interfaces not already factory provided in the MS are preferably a "plug-in" and use installation. Blocks 10622/10624 may determine that the message type field 9850*b* cannot be handled, and that an attempt at presenting MADR information with custom processing should be made.

Referring back to block 10612, if it is determined FIG. 16A was not invoked for an active call (i.e. offline), then block 10640 accesses the MS (observer's) user's prompt configuration data, and block 10642 reconciles the MS (observer's) user's configured prompt preferences with any MADR (originator's) intent field 9850*f* prompt configurations. Reconciliation includes setting prompt processing based on the originator's intent with the observer's preferences, preferably using privileges to govern what can and cannot be set with authority. Thereafter, reconciled prompt processing begins at block 10644 for checking to see if a prompt should be provided at all for the presentation.

If block 10644 determines a prompt is to be provided, block 10646 provides the prompt and configured options to the user and block 10648 interfaces with the user for a response. When a user response is made, processing continues to block 10650. Some embodiments present description field 9850*l*, sender information, recipient information, MADR type information, and/or any other useful data about the presentation. Applications, event, CLOC or any other useful information may also be presented in the prompt, and may be enabled/disabled for example for software debug purposes. A preferred embodiment presentation prompt presented at block 10646 may provide any of the following options, depending on reconciliation at block 10642.

Continue with presentation (e.g. Monitor for continue user action);

Cancel presentation (e.g. Monitor for cancel user action);

Re-schedule this presentation at a future time on the MS user's calendar;

Re-schedule in convenient time units this presentation for processing in a period of time (e.g. delay for retrying presentation in 1 hour, 5 minutes or 200 seconds);

Re-schedule this presentation for a specified future date/time; or

Save presentation reference to history information for optional access at a later time;

If block 10650 determines the user did not select to continue with the presentation, then block 10652 determines if the user qualified the cancellation for any of the options provided. If block 10652 determines the user selected to qualify canceling the presentation, then block 10654 processes qualifications and the invoker is returned to at block 10634. Block 10654 processes qualifications preferably as described here:

Re-schedule this presentation at a future time on the MS user's calendar; Block 10652 creates a calendar entry containing MADR handle field 9850*a* for the user's specified date/time information. The calendar entry becomes in effect a schedule processing alert which executes at that time. The processing alert uses the MADR handle to access the MADR, sets FIG. 16A invocation parameters, and invokes FIG. 16A processing at that time.

Re-schedule in convenient time units this presentation for processing in a period of time (e.g. delay for retrying presentation in 1 hour, 5 minutes or 200 seconds)<OR> Re-schedule this presentation for a specified future date/time; An asynchronous thread is started for sleeping the specified period of time and then invoking at that time FIG. 16A parameters including the MADR. The thread terminates after invoking FIG. 16A for the re-processing of the MADR.

Save presentation reference to history information for optional access at a later time; The MADR, or handle field 9850*a*, is saved to history (e.g. LBX history) so that the MS user can later select it for presentation, perhaps with saved parameters, at that time.

If block 10652 determines the user did not qualify the cancellation (i.e. outright cancelled it), then processing continues to block 10634. Referring back to block 10650, if it is determined the user selected to continue with the presentation, processing continues to block 10656. Referring back to block 10644, if it is determined that no prompt was to be provided, processing continues to block 10656. If block 10656 determines that delivery criteria field 9850*h* is null, then processing continues for MS local presentation at block 10620. Block 10620 and subsequent processing is as described above except there is no active line (channel) information to be associated with the presentation.

If block 10656 determines delivery criteria is specified, then processing continues to block 10658. If block 10658 determines the MADR is to be sent using a well known transport layer interface (e.g. SMTP), then block 10660 prepares parameters (e.g. appearance information) for sending the MADR information, block 10662 invokes the transport interface and processing continues to block 10634. In effect, the MADR is presented by sending it to the delivery criteria which may be a single recipient, group of recipients, or wildcard specification of recipients. If block 10658 determines delivery criteria is not destined for a well known transport layer interface, the MADR is delivered to the remote MS(s) by preparing send parameters at block 10664 and invoking send processing of FIG. 10A at block 10666 before continuing to block 10634. Depending on settings in the application distribution for outbound processing, FIG. 10A may need to be invoked for a plurality of recipient MSs, therefore an iterative loop 10668 is appropriately incorporated around blocks 10644 and 10666 for handling multiple recipients, and for handling attempts for a prioritized retry. An alternate embodiment may handle multiple recipients in send processing invoked at block 10666 depending on a transport interface used. Parameters are prepared at block 10664 so a MADR is delivered in its entirety for processing at the receiving MS(s). Other transport mechanisms may be utilized. Preferably, a CLOC parameter is passed whenever possible, including via block 10666, whereby whereabouts is accessed at block 10664.

FIG. 16B depicts a flowchart for describing block 10638 custom presentation processing to do the best possible presentation in absence of a suitable application or interface. Block 10638 processing begins at block 10638-1, and continues to block 10638-3. If block 10638-3 determines field 9850*c* is an executable, block 10638-5 determines compatibility for being executed by the MS. Thereafter, if block 10638-7 determines the executable is compatible for the MS (e.g. 32 bit Intel executable for 32 bit Intel architecture), block 10638-9 spawns the executable process for execution at the MS and block 10638 processing terminates at block 10638-39, otherwise block 10638-11 deactivates MADR field 9850*j* and processing continues to block 10638-39. Some embodiments will provide an error notification at block 10638-11. If block 10638-3 determines field 9850*c* is not for an executable, processing continues to block 10638-13.

Figure 17:
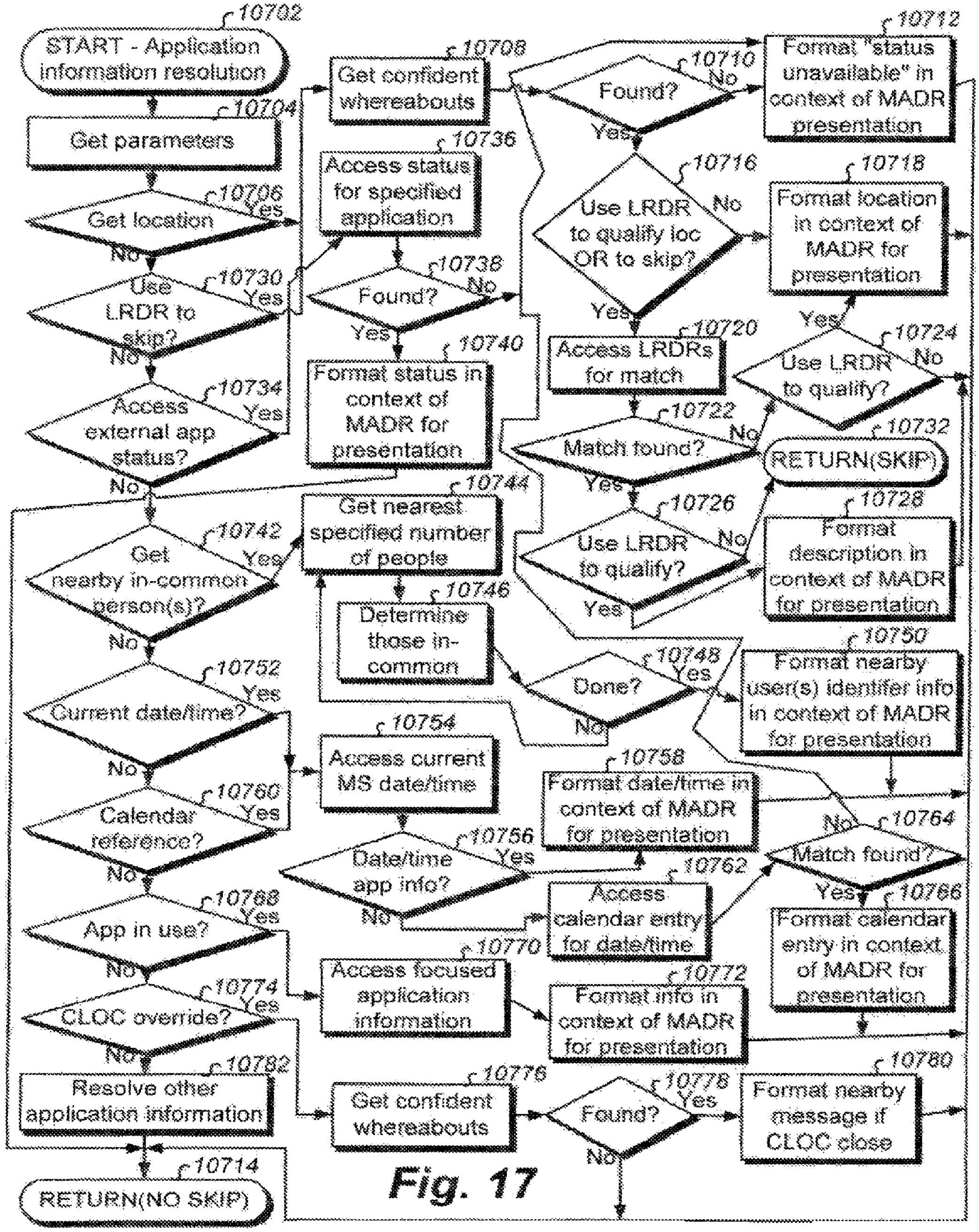
FIG. 17 depicts a flowchart for describing a preferred embodiment of application information resolution processing.

If block 10638-13 determines field 9850*c* is for audio only, block 10638-15 prepares peripheral output interface parameters using block 10610 reconciliations and first invoking the FIG. 17 procedure for resolving any specified application information. LRDR information may be used to skip presentation processing (e.g. no presenting at MS whereabouts described by a LRDR), therefore a skip return is checked for at block 10638-17. After resolving any application information, block 10638-15 finalizes the message and block 10638-17 invokes the peripheral BIOS interface for presenting the audio if no skip was to be processed. Block 10638-15 is capable of many format transformations in order to get the audio to a proper format to the interface invoked at block 10638-17. Active call line (channel) audio play was preferably handled with an API in FIG. 16A, and active call information preferably need not be used at block 10638-17, however block 10638-17 can interface for audio output. Processing leaves block 10638-17 for block 10638-39. If block 10638-13 determines field 9850*c* is not for audio only, processing continues to block 10638-19.

If block 10638-19 determines field 9850*c* is for video, block 10638-21 prepares display interface parameters using block 10610 reconciliations and first invoking the FIG. 17 procedure for resolving any specified application information. LRDR information may be used to skip presentation processing (e.g. no presenting at MS whereabouts described by a LRDR), therefore a skip return is checked for at block 10638-23. After resolving any application information, block 10638-21 finalizes the message and block 10638-23 invokes the video display interface for presenting the video if no skip was to be processed. In one embodiment, the MS display buffer is written to for display to the MS. Block 10638-21 is capable of many format transformations in order to get the video to a proper format. Depending on FIG. 17 processing and block 10610 reconciliations, MS whereabouts information may be encoded as a ghosting image over the video of message field 9850*c*. Active call line (channel) video play was preferably handled with an API in FIG. 16A, and active call information preferably need not be used at block 10638-23, however block 10638-23 can interface for video output. Processing leaves block 10638-23 for block 10638-39. If block 10638-19 determines field 9850*c* is not for video, processing continues to block 10638-25.

If block 10638-25 determines field 9850*c* is for text, block 10638-27 prepares textual display parameters using block 10610 reconciliations and first invoking the FIG. 17 procedure for resolving any specified application information. LRDR information may be used to skip presentation processing (e.g. no presenting at MS whereabouts described by a LRDR), therefore a skip return is checked for at block 10638-29. After resolving any application information, block 10638-27 finalizes the message and block 10638-29 presents text to the appropriate user interface object if no skip was to be processed. Block 10638-27 is capable of many format transformations in order to get the final form text. Active call line audio play was preferably handled with an API in FIG. 16A, and active call information preferably need not be used at block 10638-29, for example to annunciate the text during an active call, however block 10638-29 can interface for audio output. Processing leaves block 10638-29 for block 10638-39. If block 10638-25 determines field 9850*c* is not for text, processing continues to block 10638-31.

If block 10638-31 determines field 9850*c* is exclusively for an application information type, block 10638-33 prepares presentation parameters using block 10610 reconciliations and first invoking the FIG. 17 procedure for resolving the specified application information. LRDR information may be used to skip presentation processing (e.g. no presenting at MS whereabouts described by a LRDR), therefore a skip return is checked for at block 10638-35. After resolving the application information, block 10638-33 finalizes the message and block 10638-35 presents the message in accordance with other MADR fields if no skip was to be processed. Block 10638-33 is capable of many format transformations in order to get the target presentation format. Active call line play was preferably handled with an API in FIG. 16A, and active call information preferably need not be used at block 10638-35, for example to provide information during an active call, however block 10638-35 can interface for desired output. Processing leaves block 10638-35 for block 10638-39. If block 10638-31 determines field 9850*c* is not for an application information type, processing continues to block 10638-37 where other MADR types (if defined) are processed appropriately, and processing continues to block 10638-39.

FIG. 17 depicts a flowchart for describing a preferred embodiment of application information resolution processing, for example as invoked by blocks 10628, 10638-15, 10638-21, 10638-27, 10638-33 and 10638-37. Processing begins at block 10702, continues to block 10704 for accessing parameters passed (e.g. MADR, sender, recipient, CLOC), and block 10706 for starting the checks for which application information has been specified. If block 10706 determines application information is for presenting the current MS location information, block 10708 gets the current MS (of FIG. 17 processing) whereabouts of a reasonable confidence and processing continues to block 10710. If block 10710 determines a confident whereabouts of the MS could not be determined, then block 10712 uses MADR information to form an appropriate "status unavailable" message for presentation and processing returns to the invoker at block 10714 for not skipping the presentation. If block 10710 determines the MS location (whereabouts) was determined, then block 10716 checks the application information for being qualified for using LRDR information to enhance the presentation message (e.g. use user friendly description field 9860*d*) in which case processing continues to block 10720, otherwise block 10718 forms an appropriate message containing location information in as informative terms as possible (some embodiments just report latitude and longitude which is not very informative), and processing continues to block 10714. Block 10720 accesses LRDRs 9860 for a match to whereabouts from block 10708, and processing continues to block 10722. If block 10722 determines the MS whereabouts match the location of a LRDR (uses encoding field 9860*c* using type field 9860*b*), then processing continues to block 10726, otherwise processing continues to block 10724. If block 10726 determines the application information qualified using LRDR information to make a more informative message, then block 10728 uses description field 9860*d* of the matched LRDR to provide a user friendly whereabouts message of where the MS is currently located (e.g. use convenient waymark information description to describe the current MS whereabouts to: a caller for OGM processing or callee for OCM processing), and processing continues to block 10714. Block 10726 will continue to block 10732 if arrived to by way of block 10730. If block 10724 determines a LRDR should be used to qualify MS whereabouts (however no LRDR match was found), then processing continues to block 10718. Block 10724 will continue to block 10714 if arrived to by way of block 10730. Returning back to block 10706, if block 10706 determines application information is not for presenting the current MS location information, then processing continues to block 10730.

If block 10730 determines application information is for using LRDR information to potentially skip providing the presentation, then processing continues to block 10708 for processing as described above with the following exceptions:

1) Block 10716 continues unconditionally to block 10720;
2) Block 10724 continues to block 10714 when no LRDR match was found for the current MS whereabouts (i.e. do not skip the presentation); and
3) Block 10726 continues unconditionally to block 10732 for returning to the invoker for skipping the MADR presentation entirely (when a LRDR match was found). This provides the user with a way to use waymark information for defining where not to have a presentation.

If block 10730 determines application information is not for checking to skip the presentation, then processing continues to block 10734.

If block 10734 determines application information is for accessing MS user status from an external application (e.g. Facebook, Twitter), then processing continues to block 10736 for accessing the status, preferably through an API. Other embodiments can force a user interface refresh from the external application (e.g. load html page) in order to access data therein for obtaining status. Thereafter, if block 10738 determines useful status was found, then block 10740 builds an informative message with the status and processing continues to block 10714, otherwise processing continues to block 10712. If block 10734 determines application information is not for accessing MS user status from an external application, then processing continues to block 10742.

If block 10742 determines application information is for accessing information about MS users in the vicinity and "in common" with the MS of FIG. 17 processing, then processing continues to block 10744 for accessing locally maintained whereabouts information for the specified number of users in the vicinity of the MS of FIG. 17 processing. Application information specifications for nearby "in common" person(s) include a number of nearby MS users (1 or more), and a distance measurement in convenient units for how nearby (e.g. 25 feet). Thereafter, block 10746 accesses permissions granted to both the sender passed to FIG. 17 processing (if not null) and each user found in the vicinity of the MS (user) of FIG. 17 processing. Granted permissions are one embodiment for determining the "in common" condition. Other embodiments will access contact lists, call history, email history, SMS history, the like, or combination thereof, to determine the "in common" condition. Thereafter, if block 10748 determines that the sought number (e.g. 1) of "in common" MSs in the vicinity (within specified distance) are found, then block 10750 builds an informative message with user identifier information, for example to inform to call someone else nearby. Block 10750 preferably uses source section 8002*a* to build a message with the best identifier information depending on the message type field 9850*b*. Processing leaves block 10750 for block 10714. If block 10748 determines the sought number of nearby person(s) "in common" have not yet been found, then processing continues back to block 10744 for checking for additional MSs in the vicinity. Blocks 10744, 10746 and 10748 stay in a loop until MSs are identified, or there are not enough of them in the vicinity meeting specifications. Block 10750 also builds a message indicating there is no status available and no people "in common" nearby that may help. If block 10742 determines application information is not for accessing MS user information for nearby person(s) in common, then processing continues to block 10752.

If block 10752 determines application information is for accessing the current MS date/time information, block 10754 accesses the current MS time and processing continues to block 10758 through block 10756 for building a message containing date/time information. Thereafter, processing continues to block 10714. If block 10752 determines application information is not for accessing the current MS date/time information, then processing continues to block 10760.

If block 10760 determines application information is for accessing MS user calendar information, block 10754 accesses the current MS time and processing continues to block 10762 through block 10756 for accessing a calendar information scheduled for the current time. Thereafter, if block 10764 determines a calendar entry matches the current time, then block 10766 builds a message containing the informative scheduled calendar information and processing continues to block 10714, otherwise processing continues to block 10712. If block 10760 determines application information is not for accessing the calendar information, then processing continues to block 10768. An alternate embodiment supports qualifying the application information for calendar access with identifier information identifying the owner of the calendar information to be accessed.

If block 10768 determines application information is for accessing the current application in use at the MS, block 10770 accesses the currently focused application information (e.g. title-bar information, application name, description field information, or other informative data), block 10772 builds an informative message using the information found, and processing continues to block 10714. If no focused information could be determined, then default a message is built at block 10772 (e.g. message as to user is busy using MS). If block 10768 determines application information is not for accessing the current application in use, then processing continues to block 10774.

If block 10774 determines application information is for overriding a message with CLOC information, block 10776 accesses a confident MS (of FIG. 17 processing) whereabouts. Thereafter, if block 10778 determines a confident whereabouts could not be determined, then processing continues to block 10714 for normal processing of the field 9850*c*, otherwise block 10780 overrides (replaces) any message in field 9850*c* with an informative message that the sender/caller is nearby if the MS of FIG. 17 processing is nearby the CLOC associated with the sender/caller. A preferred embodiment allows qualifying with a specification for a distance in convenient units for how close to denote being nearby. Block 10780 will not override message field 9850*c* if CLOC is null, or if the nearby condition is not true. If the CLOC is nearby the whereabouts determined at block 10776, then an informative message is built that the sender is nearby, perhaps with how nearby using the qualifier specification in the message. Thereafter, processing continues to block 10714. If block 10774 determines application information is not for overriding a message with CLOC information, then processing continues to block 10782 where other application information types (if defined) are resolved, and processing continues to block 10714. In one example, a CLOC override is useful for letting a remote caller know they are within shouting range.

MS whereabouts (e.g. at blocks 10708, 10776, etc.) are determined using the MS GPS interface, a WDR queue disclosed in the parent applications, a location retrieval interface, or any other MS resource for determining the location of the MS.

One embodiment defines a new use field 9860*f* containing what application information the LRDR is to be used for (e.g. bit field mask like use field 9850*d* for: presentation skipping and/or location reporting and/or specific map application use, etc).

The sender or caller, and recipient or callee, can take on a variety of identifier embodiments. When provided in a form which should be transformed to another form for proper comparison or processing, source section 8002*a* information can be used for cross application addressing to translate from one identifier form to another identifier form when necessary.

In an alternate embodiment, MADRs do not contain an expression field 9850*g*. Permissions (privileges) in place between the sender/caller and recipient/callee are completely relied upon for governing what conditional processing is to take place. In another embodiment, both the expression and privileges are used to determine what conditional processing is to take place, preferably with privileges having precedence over expression evaluation. Wherever permissions are used herein, they are enforced through the LBX model of identifiers or groups of identifiers (e.g. field 9850*i* may carry group information).

Figure 20:
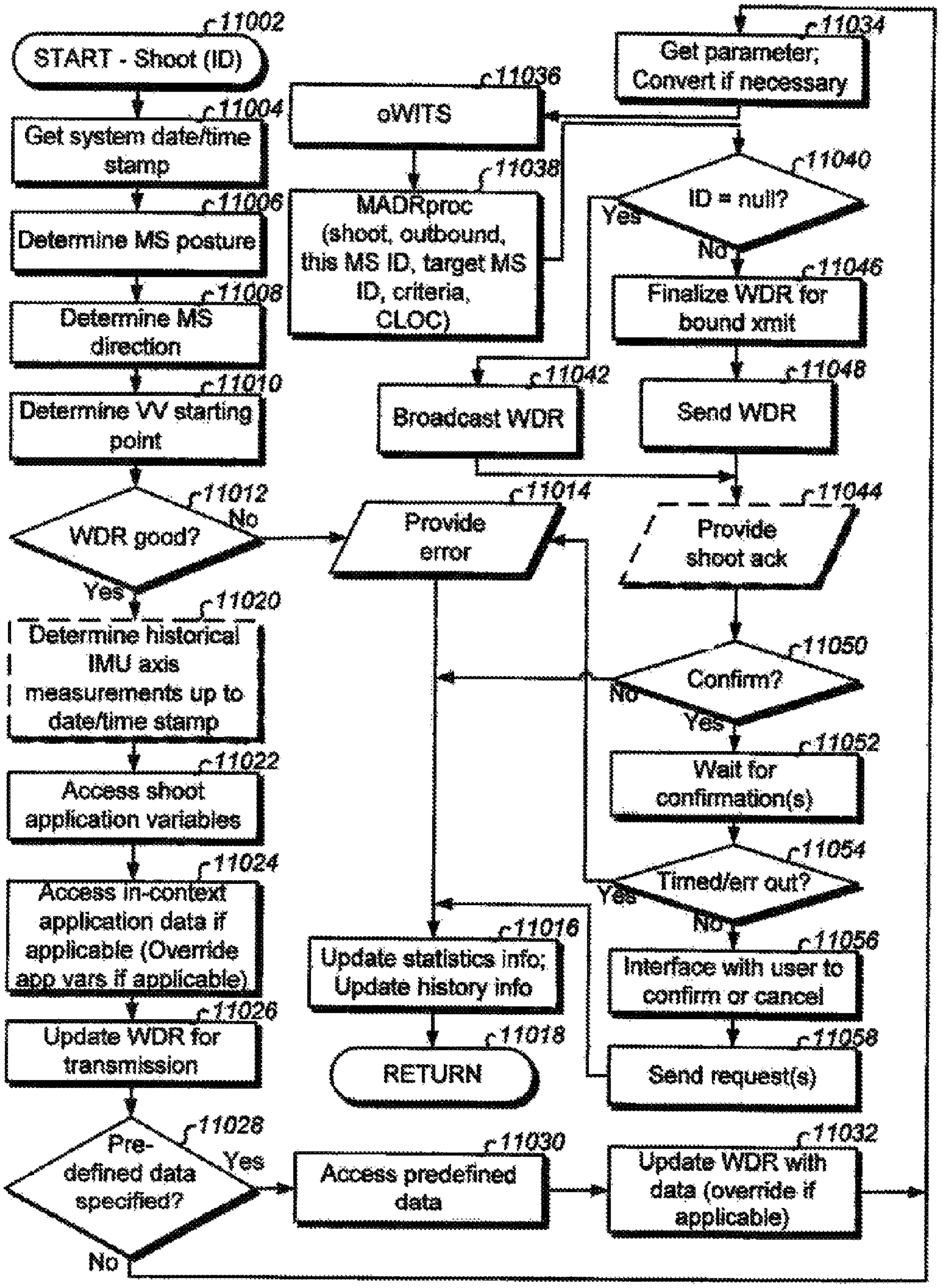
FIG. 20 depicts a flowchart for describing preferred embodiments of shoot action processing.

FIG. 20 depicts a flowchart for describing preferred embodiments of shoot action processing. Shoot action processing is preferably an invoked procedure, perhaps from within a particular MS application context, which is passed an Identifier parameter (i.e. ID parameter). The ID parameter is preferably a qualified data record passed as a qualifier field ("appfld.source.serno" or "appfld.source.ID.X" (X=phone, calendar, ab, rfid, ip, etc) or NULL) and the corresponding ID data field (the actual ID or NULL). The ID data field may be used as is for WDR transmission, or may be converted at block 11034 using cross application addressing discussed in parent applications for an appropriate ID form for outbound transmission. The ID may be a specific ID or a group ID, and ID information transmitted may be tokenized and/or encrypted to protect against true identities being known to potential attacking recipient systems, for example those in the wireless vicinity. In some embodiments, a group ID may be specified as a group to FIG. 20 processing (i.e. pass parameter of IDType) and each ID belonging to the group will be accessed at block 11048 for looping to send the WDR to each ID of the group. Of course, an error to group access will prevent sending. In the depicted embodiment, MSs will handle the WDR to a group ID recognized by MSs (i.e. a group of MSs identified as a group). Block 11148 and 11042 push data to the MS of FIG. 21 processing.

Shoot action processing begins at block 11002 as the result of a user shoot action, for example after the MS is put into an aim mode and/or aim posture, perhaps after ensuring a good location is known. FIG. 20 may be invoked in context of a particular application for shoot processing, or on behalf of an anticipated application outcome. Thereafter, processing continues to block 11004 for accessing current system date/time, block 11006 for determining the current MS pointing (aiming) posture, block 11008 for determining the current MS pointing (aiming) direction, block 11010 for determining the Virtual Vector (VV) starting point, and block 11012 for determining whether or not the WDR accessed at block 11010 is timely. Block 11006 accesses MS posture by accessing MS measurements yaw, pitch, roll, and/or IMU (e.g. compass) measurements (e.g. at the time for the MS assumed pointer of the shoot action). Alternatively, like MS accelerometer readings can be used to determine the same data. Block 11008 accesses a heading angle measurement for the MS assumed pointer direction using magnetic North as the standard reference. In many embodiments, yaw and heading are identical when pointing a MS at a target and/or pitch is not needed in a two dimensional target determination technique and/or roll is not necessary for the aimed MS. Block 11010 preferably accesses a MS WDR queue which contains a timely, confident and sufficiently accurate location of the MS at the time of the shoot action, perhaps a location determined by a plurality of location technologies supported by the MS. Block 11010 may also access a single data area which maintains a timely and most recent MS location.

If block 11012 determines timely, confident and sufficiently accurate MS whereabouts could not be determined, block 11014 provides the user with an error and block 11016 logs useful statistics and shoot history information before the invoker (caller) of FIG. 20 is returned to at block 11018. Block 11014 preferably ensures the user is aware of the error reported (e.g. visually and/or audibly), and may require the user to acknowledge the error before continuing to block 11016. The user can manually get a location at the MS, or may tweak a Whereabouts Timeliness Variable (WTV) for optimal location data being available to a shoot action.

If block 11012 determines timely, confident and sufficiently accurate MS whereabouts was found (i.e. VV starting point has good data), block 11022 accesses shoot application variables needed to help determine shoot processing (e.g. fields of section 8002*m*) for performing the shoot action. FIG. 11B data may be defaulted or set by a user, application or system. Application variables may be defaulted at MS initial use and may be set with new values outside of the application context wherein the shoot action is performed, or within the application context (e.g. by the application) by user interface actions up to the time of performing the shoot action, or set at the time of performing the shoot action. Alternately, shoot application variable information may be passed as parameters to the procedure of FIG. 20 for access at block 11022. Thereafter, block 11024 accesses any in-context application data (e.g. other application section(s) of fields 1100*k* such as those of FIG. 11A), and may override shoot application variables (of section 8002*m*) as needed for the particular application context of FIG. 20 processing. For example, block 11024 may override appfld.shoot.fuzzyD with a determined EDM distance measurement when EDM means of the MS has been successfully used to determine a distance to the target. Thereafter, block 11026 updates a WDR for outbound transmission (prepared for an outbound broadcast by the MS of FIG. 20 processing) with data gathered by FIG. 20 processing up to that point, and block 11028 checks to see if predefined data was defined (e.g. at block 10916). WDR fields are set appropriately (e.g. MS posture, direction stored to field 1100*f*; location to field 1100*c*, confidence to field 1100*d*, etc).

If block 11028 determines predefined data was configured for the shoot action, the data is accessed at block 11030, block 11032 updates the WDR with the data and processing continues to block 11034, otherwise block 11028 continues directly to block 11034. Block 11032 will override (replace) any identical data (e.g. appfld sections in fields 1100*k*). Typically, blocks 11030 and 11032 set appfld.shoot.params section data for certain appfld.shoot.purpose settings. Block 11030 may have to open a file for access, or start using a database to get access to a database object such as column(s) from row(s) from table(s). Optimally, block 10916 will have internalized the predefined data for a quick access. Blocks 11002 through 11010 are strategically ordered for the best VV starting point descriptors associated with the shoot action and subsequent processing will not affect VV determination.

Figure 9:
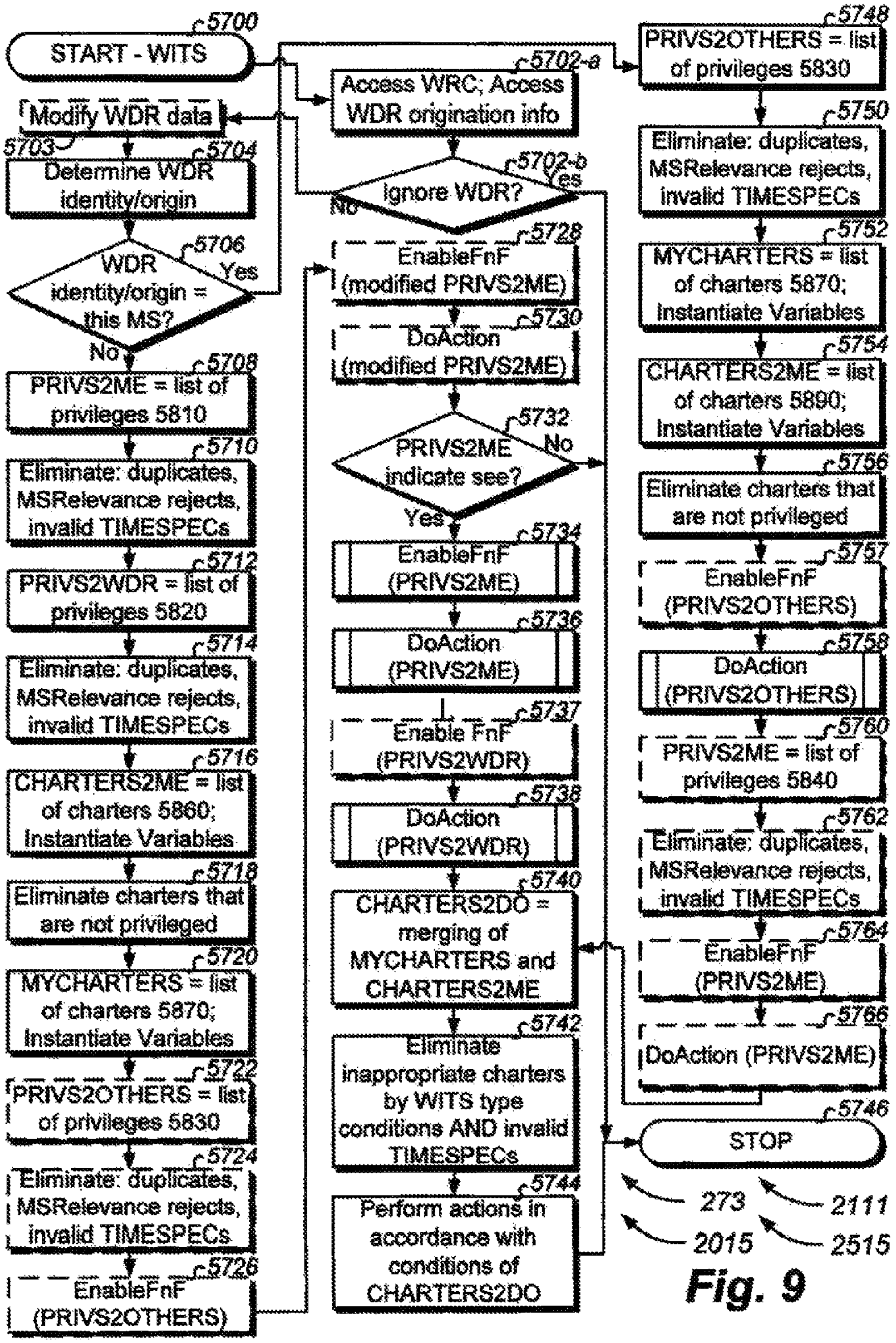
FIG. 9 depicts a flowchart for describing a preferred embodiment of WDR In-process Triggering Smarts (WITS) processing, as described in detail in parent applications.

Block 11034 gets ID parameter information and performs a cross application addressing conversion if appropriate, for example when an identifier from the shooting context does not match that of the desired WDR for transmission. Thereafter, outbound WITS processing of FIG. 9 is performed at block 11036 and block 11038 appropriately invokes MADRproc processing of FIG. 15 before continuing to block 11040. The criteria parameter can be set as a result of the application context processing of FIG. 20, or an alternate embodiment passes criteria as a parameter to FIG. 20 processing at block 11002. The CLOC parameter is set with WDR location. Thereafter, block 11040 determines if the ID parameter was NULL (i.e. none specified) when accessed at block 11034. If block 11034 determines the ID was NULL, then block 11042 broadcasts the WDR to MSs in the vicinity and processing continues to block 11044. If block 11040 determines the ID was not null, then block 11046 modifies the WDR for being targeted to a particular MS (e.g. insert WDR into a MS targeted MS ID packet/wrapper), block 11048 sends the WDR, and processing continues to block 11044. Block 11044 preferably provides a visual and/or audible indication to the user that the shot was made and processing continues to block 11050. Targeting a MS with the sent WDR using a point and shoot methodology provides a more secure method for identifying the MS which is to be targeted with data. A VV end point will help confirm that the addressed MS is indeed the MS that was pointed to and shot.

As discussed in parent applications, fields 1100*k* may contain appfld.loc.beacon.expr set with an expression to be evaluated at the receiving MS. A receiving MS which has granted the privilege of being identified to the MS of FIG. 20 processing shall identify itself so that the user of the MS of FIG. 20 processing will know where it is. Privileges are also granted for which conditions and terms may be specified. In a preferred embodiment, the shot MS will perform the beacon after using expression evaluation processing. Beaconing includes embodiments of:

An audible sound that can be heard by the user of the shooting MS;

A visible indication that can be seen by the user of the shooting MS;

Sending data back to the shooting MS as a message, email, or data packet which results in indication with an audible and/or visual presentation with or without another user interface action by the shooting MS user; and/or Any combination of above methods.

Aiming at and shooting a MS may prevent providing an expression at all for beaconing the MS. In one use, an electronic tag game is accomplished with aiming and shooting. In other uses, aiming at and shooting a MS further (securely) confirms the MS to be beaconed by the expression. In another embodiment, charters are configured for handling the inbound WDR having appfld.loc.beacon.expr data so that any desired processing can be executed. The charter may have been created by either the shooting MS user, or shot MS user, and proper charter privileges must be in place.

Figure 21:
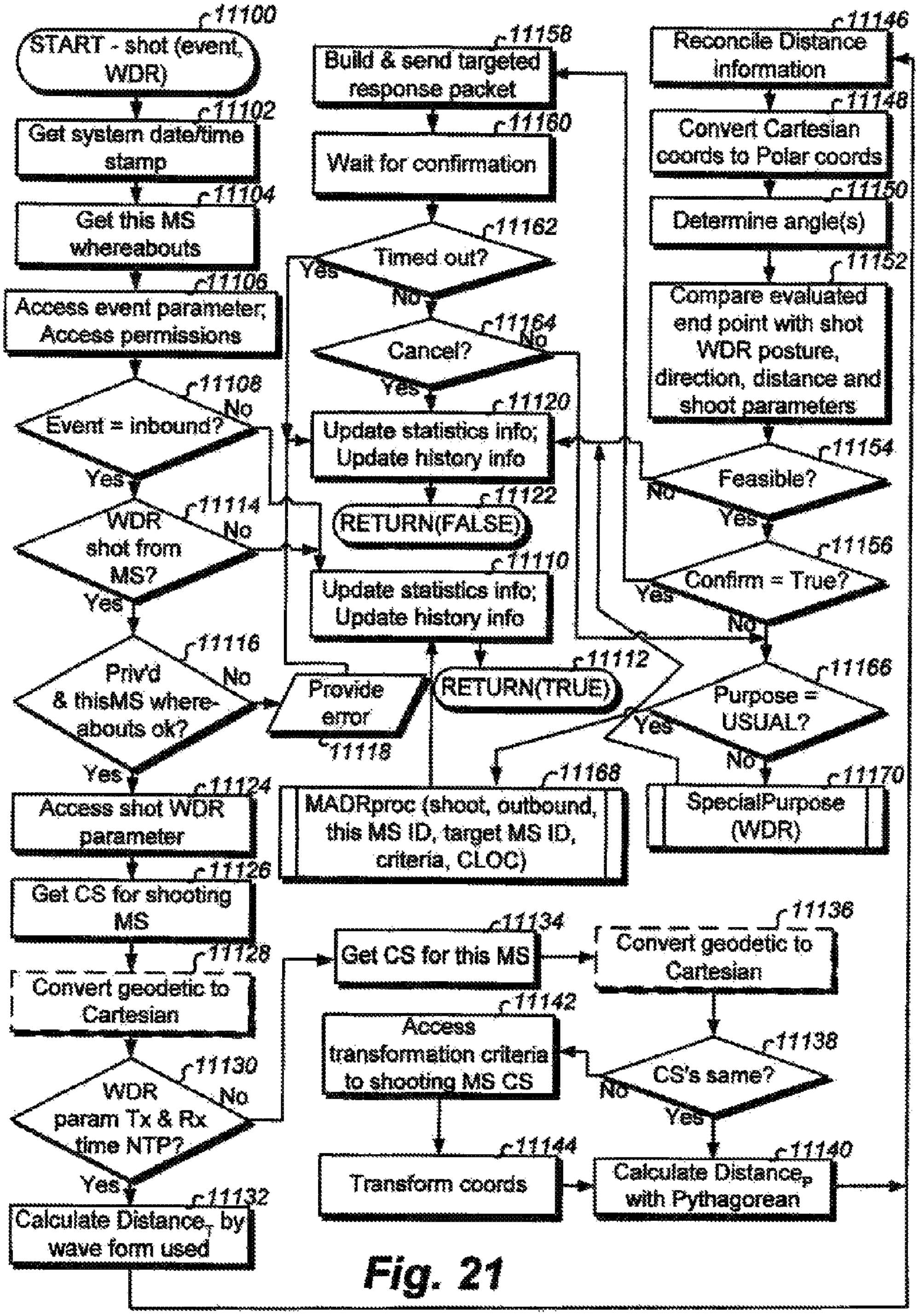
FIG. 21 depicts a flowchart for describing preferred embodiments of shot processing.

With reference now to FIG. 9, depicted is a flowchart for describing a preferred embodiment of WDR In-process Triggering Smarts (WITS) processing, as was well described in parent applications. While FIG. 9 is provided for memorable reference, the reader should appreciate the full scope, meaning, processing, and many embodiments possible. As stated in parent applications: “Blocks 5702-*a* and 5702-*b* may perform any variety of WITS filtering for any reason to prevent further processing of a WDR”. Block 5702-*a* is modified herein to additionally invoke the procedure of FIG. 21 to determine if processing is to continue to block 5703 (i.e. FIG. 21 returns TRUE), or to complete at block 5746 (i.e. FIG. 21 returns FALSE). Thus, FIG. 21 returns a status for whether or not to ignore the WDR for further processing, or to continue processing. Preferably, FIG. 21 is a function that returns a Boolean as a result: True if subsequent block 5702-*a* processing is to continue further for normal subsequent WDR processing; False if block 5702-*a* is to continue directly to block 5746 (e.g. by way of block 5702-*b* which determines to ignore the WDR). Block 5702-*a* invokes FIG. 21 to: a) check if the WDR was shot from another MS as the result of a shoot action; b) determine whether the WDR was aimed at the MS of FIG. 9 processing if the WDR indicates it was shot; c) process the WDR if necessary outside of normal WDR processing; and d) return a Boolean result for whether or not the WDR is to be ignored from further WITS processing, for example after determining the MS was not aimed at with the shot.

FIG. 21 may process an inbound WDR to determine it is not a shot WDR, in which case True is returned to block 5702-*a* so that FIG. 9 (and other invoker/caller/encapsulating processing) continues to perform WDR processing. FIG. 21 may process an inbound WDR to determine it is a shot WDR, but the MS of FIG. 9 processing was not aimed at, in which case False is returned to block 5702-*a* so that FIG. 9 (and other invoker/caller/encapsulating processing) does not process the WDR any further (i.e. WDR was shot and intended for other MS(s)). FIG. 21 may process a shoot action entirely and then return False to block 5702-*a* so that FIG. 9 (and other invoker/caller/encapsulating processing) does not process the WDR any further. FIG. 21 may process a shoot action and then return True to block 5702-*a* so that FIG. 9 (and other invoker/caller/encapsulating processing)

additionally performs related WDR processing. FIG. 21 may merely validate the MS was aimed at and shot, and then return True at block 5702-*a* so that FIG. 9 (and other invoker/caller/encapsulating processing) performs the usual WDR processing. Thus, shoot processing may or may not rely on WDR privilege and charter processing (of FIGS. 7A through 7E). Charters do provide an excellent platform for processing shoot actions with user configurations and an arsenal of automated actions, for example using atomic commands and atomic operands.

With reference now to FIGS. 8A through 8E, depicted is a preferred embodiment set of command and operand candidates referenced in charters executed for shoot processing, as was well described in parent applications. While FIGS. 8A through 8E are provided for memorable reference, the reader should appreciate the full scope, meaning, processing, and many embodiments possible. Shoot processing (e.g. shot processing disclosed for FIG. 9 with FIG. 21) exploits the power of user-permissible user configured automated LBX charter processing. Charters may be configured to handle shoot actions, or special purpose shoot actions can specify atomic commands directly for invocation with a specified atomic operand and applicable parameters (blocks 11222 and 11224). Thus, shoot actions can perform atomic commands of Send, Notify, Compose, Find, Invoke, Copy, Discard, Move, Store, Connect, Administrate, Change, or any other command for each operand of AutoDialNumber, WebLink, Email, SMSMsg, BroadcastEmail, BroadcastSMSMsg, Indicator, Application, Document, File, Content, DatabaseObject, Data, Semaphore, Directory, ApplicationContext, UserInterfaceObject, UserInterfaceControl, Input, Output, Alert, Procedure, Container, ProgramObject, Cursor, Calendar, AddressBook, or any other operand, along with applicable parameters.

With reference back to FIG. 20, if block 11050 determines a shoot confirmation was requested (i.e. appfld.shoot.confirm=TRUE), block 11052 waits for response from the target(s), otherwise block 11050 continues to block 11016. For example, a user may target one or more MSs with a single shoot action as configured in appfld.shoot.maxTargs and then want a confirmation that the intended target(s) are correct. Block 11052 continues to block 11054 when anticipated responses are detected, or a reasonable waiting time elapses.

If block 11054 determines a timeout occurred, block 11014 provides the user with an informative error (e.g. number of replies if any out of total needed, MS information for who replied, etc) before continuing to block 11016. If block 11054 determines more than appfld.shoot.maxTargs responses were detected, block 11014 provides the user with an informative error (e.g. number of replies, MS information for who replied, etc) before continuing to block 11016. If block 11054 determines anticipated responses were returned, block 11056 interfaces with the user with information from the response(s) (e.g. MS information of who replied) for confirming the shoot action to the target(s), or for canceling the shoot action. Thereafter, a confirmation request is sent out at block 11058 by targeting the responders (e.g. directed to each MS ID) for confirming to perform the shoot action. Application data may be sent for processing at block 11160 to affect subsequent FIG. 21 processing. Depending on user selection at block 11056, block 11058 may send out a cancellation request by targeting the responders (e.g. directed to each MS ID) for cancellation of the pending shot processing of FIG. 21, for example after seeing that intended recipient(s) are not those that were targeted. Block 11058 continues to block 11016.

When the user interfaces at block 11056 in context of a particular application of FIG. 20 processing, there are many novel processing embodiments. A SPUI may be spawned at the MS of FIG. 20 processing for target confirmation and/or automatically populating a user interface with the target information along with any application data up to that point or with data returned back from block 11158. It may be the intent of the user of FIG. 20 processing to cancel the shoot request at the MS of FIG. 21 processing because all desired shoot processing is being handled at block 11056. In one example, the user of FIG. 20 processing is currently using an application context where sorting is appropriate (e.g. email inbasket or folder, prioritized forthcoming calendar events, address book contact information for forthcoming meeting events, etc). The user shoots the MS of FIG. 21 processing in order to sort entries by the identifier of the shot MS. See parent applications for sorting by location of MSs and using cross application addressing. The present disclosure enables aiming and shooting MSs that the sort functionality is to consider. The user may shoot a group of MSs, or a plurality of MSs nearby each other to sort entries by those identifiers. In another example, the user of FIG. 20 processing is currently using an application context of a vicinity monitor (discussed in parent applications), or some other mapping application. Similarly, the user shoots MS(s) in order to have them added to the vicinity monitor for monitoring, or added to the map application for finding their location (e.g. location data returned at block 11158, or WDR data accessed at block 11056). There are many useful application contexts for conveniently identifying one or more MSs by simply aiming and shooting.

FIG. 20 may be used to shoot another MS, or some data processing that emulates FIG. 21 functionality, such as in shoot a store (i.e. shoot store door with associated data processing system while traveling by) to bring up a menu, map of all same stores in area, applicable coupons to the store, or great deals currently offered at the store.

FIG. 21 depicts a flowchart for describing preferred embodiments of shot processing. Shot processing (e.g. MS of FIG. 21 processing was shot by another MS) begins at block 11100 and continues to block 11102 where the current system date/time is accessed, block 11104 where timely, confident and sufficiently accurate MS whereabouts is accessed (e.g. from WDR queue, or single location maintaining most current whereabouts), block 11106 where the event parameter passed to FIG. 21 is accessed and permissions (privileges) are accessed for the MS of FIG. 21 processing granting the privilege to be shot by the MS originating the WDR to FIG. 21 processing. Thereafter, block 11108 checks the WDR event parameter. If block 11108 determines the WDR is a result of an inbound WDR event (e.g. perhaps a shot WDR), then processing continues to block 11114, otherwise block 11110 updates statistics and history information before continuing to block 11112 for returning TRUE to the caller so that the WDR can be handled as usual (e.g. by FIG. 9 processing).

If block 11114 determines the WDR is a shot WDR (i.e. a WDR shot by another MS), then processing continues to block 11116, otherwise processing continues to block 11110 already described. A WDR is preferably determined to be shot when at least one field from section 8002*m* exists in fields 1100*k* on an inbound WDR. If block 11116 determines timely, confident and sufficiently accurate MS whereabouts could not be determined at block 11104 or that the shot was not privileged, block 11118 provides the user (of the MS of FIG. 21 processing) with an error and processing continues to block 11120 for updating statistics and history information before continuing to block 11122 for returning FALSE to the caller so that the WDR will not be handled any further (i.e. WDR was already determined to be inbound and shot, therefore the MS of FIG. 21 must be identified as a targeted MS and privilege granting MS in order to continue usual processing). Block 11118 preferably ensures the user is aware of the error reported (e.g. visually and/or audibly), and may require the user to acknowledge the error (e.g. warn user shots may be missed if timely, confident and sufficiently accurate whereabouts cannot be determined, or if necessary permissions/privileges not configured—e.g. user can take action to ensure this problem does not happen again) before continuing to block 11120. The user can manually get a location at the MS, or may tweak a Whereabouts Timeliness Variable (WTV) for optimal location data being available when needed. In some embodiments, permissions may be checked in FIG. 20 processing when an ID is known at block 11046 in which case block 11046 continues to block 11014 for providing the shooting user with an error when it is known that the target MS has not granted a privilege to be shot.

If block 11116 determines timely, confident and sufficiently accurate MS whereabouts was found (i.e. VV end point has good data), block 11124 accesses the WDR parameter to FIG. 21 processing. Thereafter, block 11126 uses the location from the WDR parameter (i.e. the shot WDR) to access a corresponding local Coordinate System (CS) such as one discussed in FIG. 18E. The CS may be accessed local or remote to the MS, preferably through an Application Programming Interface (API). Thereafter, block 11128 converts the WDR location into the local coordinate system using the CS (e.g. API with CS as parameter), and block 11130 checks date/time information (e.g. fields 1100*n* and 1100*p*) of the WDR passed to FIG. 21 processing.

If block 11130 determines the shooting MS and shot MS are both NTP synchronized, block 11132 can calculate a distance based on time using the wave form (e.g. in field 1100*f*) used to transport the WDR, and processing continues to block 11146. If block 11130 determines the shooting MS and shot MS are not both NTP synchronized, then a distance can be determined using the starting point (i.e. shooting MS location and end point (e.g. shot MS location) by first accessing the local Coordinate System (CS) for the MS of FIG. 21 processing (uses location from block 11104) such as one discussed in FIG. 18E or FIG. 18F. The CS may be accessed local or remote to the MS, preferably through an Application Programming Interface (API). Thereafter, block 11136 converts the WDR location into the local coordinate system using the CS (e.g. API with CS as parameter), and block 11138 checks if the local Coordinate Systems of the shooting MS and shot MS are the same.

If block 11138 determines the shooting MS and shot MS both are using the same CS, block 11140 uses the Pythagorean theorem (two dimensional embodiment: Distance=SQRT($(x_2-x_1)^2+(y_2-y_1)^2$) where end point is in terms of $x_2$ and $y_2$, and starting point is in terms of $x_1$ and $y_1$; three dimensional embodiment: Distance=SQRT($(x_2-x_1)^2+(y_2-y_1)^2+(z_2-z_1)^2$) where end point is in terms of $x_2$, $y_2$, and $z_2$, and starting point is in terms of $x_1$, $y_1$ and $z_1$) to calculate a distance between the points in the same CS, otherwise block 11142 accesses transformation information to transform the end point (e.g. shot MS location) into coordinate terms of the starting point (e.g. shooting MS location), block 11144 performs the transformation, and block 11140 can then calculate distance before continuing to block 11146. Transformations of the neighboring CS were discussed with FIG. 18F. In some embodiments, blocks 11132 and 11140 are both calculated whenever possible to provide maximum information at block 11146.

Block 11146 accesses distance information calculated up to that point to determine the best fit distance in light of an appfld.shoot.fuzzyD setting which may be present in the shot WDR. A user set fuzzyD has a low confidence, and an EDM set fuzzyD has a high confidence. Distance determined at blocks 11132 and 11140 are dependent on WDR information used. Confidence values are used to determine priority, and to assess a distance that should be relied upon in light of distance calculation confidence. A standard deviation may be determined for use at block 11152. MSs substantially nearby each other may result in a zero (0) distance when starting using a global CS, so aiming information relative receiving MS information may be relied upon (e.g. AOA at receiving MS relative yaw from sending MS). Thereafter, block 11148 converts local CS coordinates into Polar coordinates for easy angle determination after preferably translating the coordinates so that the starting point is at the origin (e.g. two dimensional embodiment: $\theta$=ARCTAN of $(y_2/x_2)$; three dimensional embodiment: $\phi$=ARCCOS($z_2$/(SQRT($x_2^2+y_2^2$ and $\theta$=ARCCOS($x_2$/SQRT($x_2+y_2$))), block 11150 determines angles (e.g. for comparison to yaw (and pitch)), and block 11152 compares end point, distance and angle determination of FIG. 21 processing with the original posture, direction, distance and shoot parameters from the shot WDR passed to FIG. 21 processing, also in consideration of an appfld.shoot.fuzzyT value found in shoot parameters. Block 11152 (also FIGS. 18E and 18F) may be implemented in a two dimensional embodiment (i.e. no elevation considered) or a three dimensional embodiment. In any case, block 11152 uses all data available to determine target feasibility. A receiving MS equipped with detecting AOA should populate field 1100*f* with useful data on receipt so that determining a valid target can be as simple as comparing at block 11152 an AOA at the receiving MS with aiming information in the WDR to FIG. 21 processing. WDR field 1100*f* can contain information about the receiving MS as well as information about the sending MS. Block 11152 preferably "rules out" an obvious infeasible target first and then "rules in" a feasible target. Block 11152 continues to block 11154 when a target likelihood determination has been made.

If block 11154 determines the MS of FIG. 21 is a feasible target of the shot WDR, processing continues to block 11156, otherwise processing continues to block 11120 already described. If block 11156 determines the appfld.shoot.confirm variable is set to True, block 11158 builds and sends a targeted acknowledgement response packet to the shot originator (e.g. targeted MS ID packet/wrapper) with at least an identifier (e.g. MS ID) useful for identifying the MS of FIG. 21 processing and a correlation for targeting a confirmation or cancellation response back to the MS of FIG. 21 processing, and block 11160 waits for a confirmation from the shooting user for whether or not to continue with shot processing. Thereafter, if block 11162 determines the wait timed out (e.g. no confirmation in reasonable time period), processing continues to block 11120. If block 11162 determines a confirmation was received, processing continues to block 11164 to check the confirmation. In some embodiments, block 11158 uses data in the WDR from the shot to prepare appropriate response data that is to be sent back at block 11158. This provides a shooting user with a method to immediately pull data from a shot MS without involving charter or appfld.shoot.purpose processing.

If block 11164 determines the shooting user selected to cancel shot processing, then processing continues to block

Figure 22:
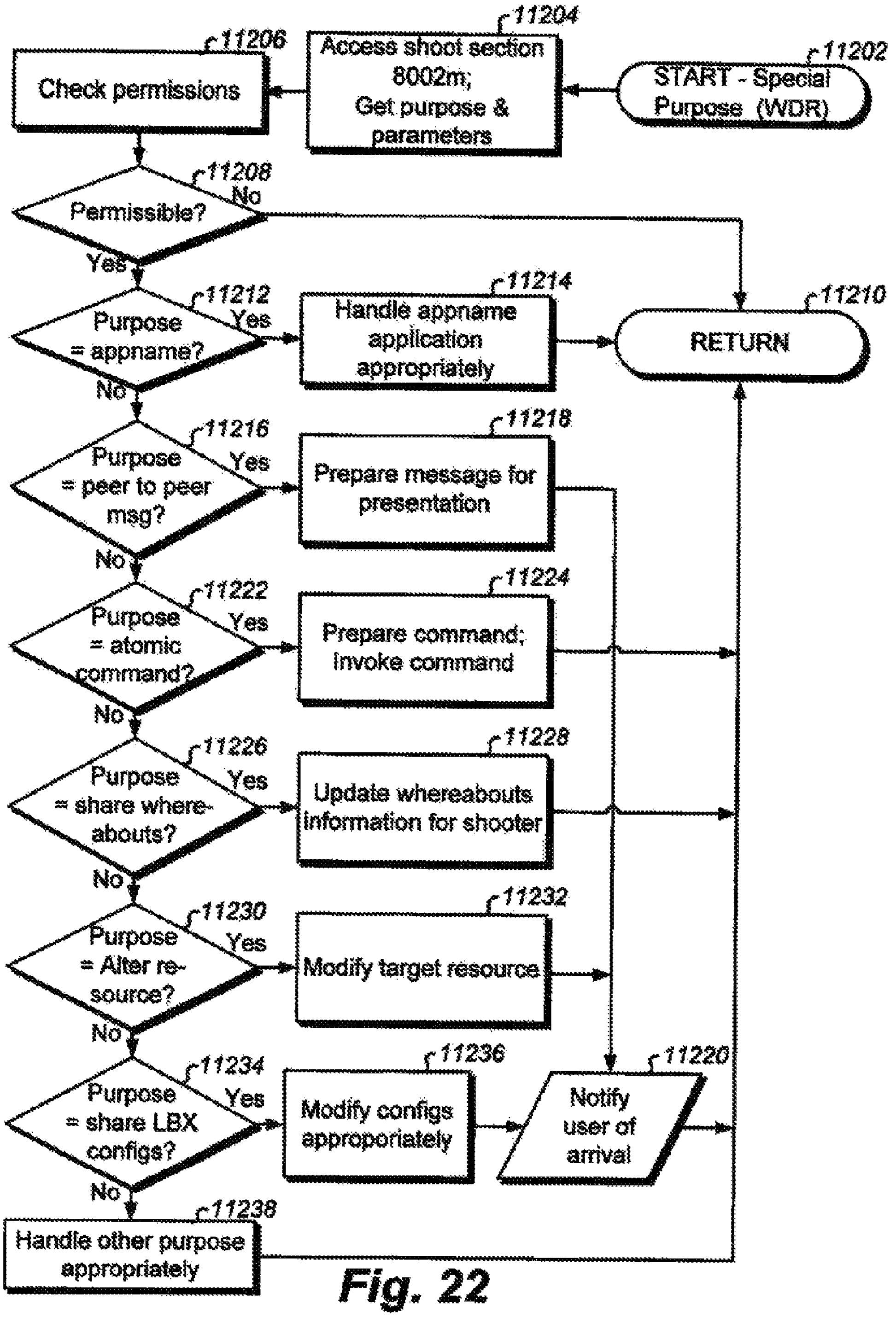
FIG. 22 depicts a flowchart for describing preferred embodiments of a procedure for specified purpose shot processing.

11120, otherwise block 11166 checks shoot parameters (section 8002*m*) for the intention of the shooting. If block 11166 determines that appfld.shoot.purpose is for usual processing, block 11168 invokes FIG. 15 and processing continues to block 11110 for returning to FIG. 9 for usual WDR processing as well. Depending on embodiments of MADRs objects configured, the criteria parameter may be set with any reasonable data accessed in FIG. 21 processing. If block 11166 determines that appfld.shoot.purpose is for special shoot processing, the procedure of FIG. 22 is invoked at block 11170 and processing continues to block 11120 when the procedure returns to block 11170. Parameters in addition to the shot WDR may be passed to FIG. 22 processing in some embodiments. Returning back to block 11156, if it is determined that no confirmation was requested (e.g. appfld.shoot.confirm=FALSE), then processing continues to block 11166 already described.

FIG. 22 depicts a flowchart for describing preferred embodiments of a procedure for special purpose shot processing which begins at block 11202, continues to block 11204 for accessing shoot section 8002*m* for the purpose (i.e. appfld.shoot.purpose) and parameter information (appfld.shoot.params), and then to block 11206 for access to permissions to ensure privileges are in place for the shooting MS to perform the special purpose shot at the receiving MS. In some embodiments, all permissions validation was already handled at blocks 11106/11116. Thereafter, if block 11208 determines the intended shot is not privileged, processing continues to block 11210 for returning to the caller (e.g. block 11170), otherwise processing continues to block 11212.

If block 11212 determines the purpose is specified as a particular application name (e.g. appfld.shoot.purpose=email), such as any of those of FIG. 11A including source 8002*a*, profile 8002*b*, email 8002*c*, calendar 8002*d*, address book 8002*e*, phone 8002*f*, emergency 8002*g*, location 8002*h*, rfid 8002*i*, hotspot 8002*j*, services 8002*k*, statistics 8002*l*, and other applications 8004*a* through 8006*b*, then block 11212 continues to block 11214 where processing is handled appropriately, and to block 11210 for returning to the caller. If block 11212 determines the purpose is not for a particular application, processing continues to block 11216. In the preferred embodiment, block 11214 accesses the application data of fields 1100*k* for the requested processing. For example: when the purpose=source, source section 8002*a* is accessed from WDR fields 1100*k* for populating local MS data which will be useful for cross application addressing when converting shooting MS identifier(s); when the purpose=profile, profile section 8002*b* is accessed for immediate compare against configured charters without regard for any permissions. Permissions are only validated for being a privileged shot candidate; when the purpose=email, the present disclosure provides literal meaning to the words "shoot me an email": Email section 8002*c* is accessed for appfld.email.pending data which contains a current email item being sent to the MS of FIG. 22 processing. The email item is deposited to the MS user's email inbasket (with API) as though it arrived by conventional delivery means. In some embodiments, the email has an associated indicator that it was shot; when the purpose=calendar, the present disclosure provides literal meaning to the words "shoot me a meeting notice": Calendar section 8002*d* is accessed for appfld.calendar.pending data which contains a current calendar item being sent to the MS of FIG. 22 processing. The calendar item is deposited to the MS user's calendar application (with API) as though it arrived by conventional delivery means. In some embodiments, the calendar item has an associated indicator that it was shot; when the purpose=ab, the present disclosure provides literal meaning to the words "shoot me your contact information": Address Book section 8002*e* is accessed for appfld.ab.pending data which contains a current Address Book item being sent to the MS of FIG. 22 processing. The Address Book item is deposited to the MS user's Address Book application (with API) as though it arrived by conventional delivery means. In some embodiments, the address book item has an associated indicator that it was shot; when the purpose=phone, the present disclosure provides literal meaning to the words "shoot me a phone call": Call processing at the MS of FIG. 22 may use cross application addressing to accomplish the call, and may access fields in section 8002*f* for governing call attributes. The MS of FIG. 22 calls the shooting MS. In an alternate embodiment, confirmation response processing returned to the shooting MS provides the shooting user at block 11056 with an option to call the shot MS wherein the shooting MS calls the shot MS when the user selects to make the call (however, a cancel request is sent to the shot MS since there is nothing remaining to do at the shot MS). In embodiments where a MS supports party calls, shooting a plurality of MSs may result in initiating a conference call between the shooting MS and all shot MSs; when the purpose=emergency, emergency section 8002*g* is accessed from WDR fields 1100*k* for communicating emergency information immediately to the shot MS(s). Shooting a group of MS(s) communicates the emergency information to all of them; when the purpose=loc, location section 8002*h* is accessed for appfld.loc.beacon data for applicable beacon processing as described in parent applications; and other application sections 8002*i* through 8006*b* of FIG. 11A for fields 1100*k* have relevant shot processing. Of course, a plurality of MSs may be targeted with the same shoot action, for example by adjustment of appfld.shoot.fuzzyT.

If block 11216 determines the purpose is to deliver a message, block 11218 prepares the message from appfld.shoot.params for alerting the user of the MS of FIG. 22 processing, notifies the user at block 11220 with the message, and then continues to block 11210 for returning to the caller. There are many embodiments for delivering audio and/or video for alerting the user. If block 11216 determines the purpose is not for delivering a message, processing continues to block 11222.

If block 11222 determines the purpose is to perform an atomic command, block 11224 prepares the command, operand and parameters from appfld.shoot.params and then invokes the atomic command before continuing to block 11210 for returning to the caller. Some embodiments may support specifying multiple atomic commands in a single shot. Other embodiments may support a named charter section for being invoked. If block 11222 determines the purpose is not for invoking an atomic command (see FIGS. 8A through 8E), processing continues to block 11226.

If block 11226 determines the purpose is to share whereabouts, block 11228 updates local whereabouts information (e.g. WDR information) for the shooter before continuing to block 11210 for returning to the caller. In some embodiments, an active vicinity monitor or active user interface which is impacted by the whereabouts update is also instantly updated for the shooter, for example to show where the shooter is located. If block 11226 determines the purpose is not for sharing whereabouts, processing continues to block 11230.

If block 11230 determines the purpose is to alter a MS resource, block 11232 updates the specified resource, block 11220 notifies the user that a modification was made and who made it, and processing continues to block 11210 for returning to the caller. Resources that may be modified include file data, database object data, Application Term (FIG. 7D AppTerm) data, clipboard data, or any other MS system resource (i.e. per privileges determined at block 11206). Predefined data defined by FIG. 19 can be shot with a special purpose handling of FIG. 22. If block 11230 determines the purpose is not for altering a resource, processing continues to block 11234.

If block 11234 determines the purpose is to share LBX configurations, block 11236 updates the local MS configurations with a workable copy, block 11220 notifies the user that the configurations arrived and are ready for customization, and processing continues to block 11210 for returning to the caller. LBX configurations which may be shared include Privilege data (FIG. 7C), Grant data (FIG. 7C), Group data (FIG. 7C), Charter data (FIG. 7D), map term data (e.g. as described in detail parent applications) and Prefix Registry Record (PRR) data. Preferably, the data received is placed into an inactive form which can be easily customized and then enabled for use. If block 11230 determines the purpose is not for sharing LBX configurations, processing continues to block 11238 for handling any other special purposes before continuing to block 11210 for returning to the caller.

Block 11238 special purpose shot handling includes a plethora of useful applications including processing a directed RFID probe, granting access to a propagated service, setting configurations with ResourceMapper (see parent applications) in order to provide all permissions to one user (specified in appfld.shoot.params) that were provided to another user, invoke a SPUI at the MS, updating data also communicated in the "Bump" application described above, accessing installed applications to communicate back to the shooting MS which applications are in common between MS users, and many other applications.

Note that FIG. 21 shot processing may occur for shooting data with infrared, laser or other directional wave form in which case VV end point determination logic is not needed. Simply identifying the event as inbound, the WDR as shot, and permissions in place as needed, is enough for processing as though the VV end point was already confirmed (i.e. MS of FIG. 21 processing is the target). Laser and infrared are directional wave forms and receiving the wave form is enough to designate being targeted. In some infrared embodiments, the wave spectrum spreads out, and therefore mathematically validating being a target with infrared may still be warranted as presented in FIG. 21 processing. Also, in directional wave form embodiments (e.g. infrared and laser), FIG. 20 may only be involved in shooting data to be carried since none of the aiming information will be required (except in some infrared embodiments with wave form spread).

Shoot action processing is very fast. In some embodiments, the determined VV in FIG. 21 processing is used to target the shooting MS (starting point) with a VV in order to respond to it at block 11158. A VV vector can be used to validate a target of an initial request, and to target a response. The VV limits communications to only the MS(s) which are intended for the communications.

Data processing systems in general can emulate FIG. 21 processing so that MSs can aim and shoot them for intended processing. Such data processing systems may provide equivalent functionality in one form or another without departing from the spirit and scope of this disclosure.

In some embodiments, lobbing, arcing, or curving a pointer to a target may be desirable in which case a VV is not desirable because it is a straight line. For example, arc IMU measurements (e.g. gyroscope forces) are accessed at a block 11020 (i.e. block 11012 continues to block 11020 and block 11020 continues to block 11022). Historical information up to the date/time stamp of block 11004 is used to estimate tri-axial direction of the MS movement and tri-axial acceleration of the MS movement in order to manufacture an estimated mathematical parabola to a particular location. Such parabola determination is well known in the art, and calculations are made straightforward at block 11020 because forces can be decided by the programmer for how to transform IMU measurements to parabola arcing with respect to an implemented gravitational force. The straight line distance to the parabola end is estimated at block 11020 and then used at block 11024 to update appfld.shoot.fuzzyD with the value (e.g. more confident than a user set value, but less confident than an EDM determined value). Subsequent processing assumes a straight line VV using the estimated distance based on the estimated parabola deduced from historical IMU data up to the shoot action (e.g. MS movement like casting a fishing rod and then shooting to release the line for casting).

Company name and/or product name trademarks used herein belong to their respective companies.

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

What is claimed is:

1. A method comprising:

maintaining a centralized collection of user configured alert data, the alert data for notifying a user of a particular user carried mobile data processing system that the particular user carried mobile data processing system was feasibly targeted by an aim of an image capturing mobile data processing system at a time the image capturing mobile data processing system captures image data;

determining vector data describing the aim of the image capturing mobile data processing system at the time the image capturing mobile data processing system captures the image data, the vector data including:

a vector origin describing a physical location of the image capturing mobile data processing system, and vector directional data describing the aim of the image capturing mobile data processing system;

determining with the vector data the particular user carried mobile data processing system was feasibly targeted by the aim of the image capturing mobile data processing system at the time the image capturing mobile data processing system captures the image data;

searching the centralized collection for a matching alert configuration using at least one of:

an identifier associated with the image capturing mobile data processing system, or an identifier associated with the particular user carried mobile data processing system;

determining with the searching the matching alert configuration;

accessing notification content in accordance with the matching alert configuration, the notification content for notifying the user of the particular user carried mobile data processing system that the particular user carried mobile data processing system was feasibly targeted by the aim of the image capturing mobile data processing system at the time the image capturing mobile data processing system captures the image data; and communicating the notification content for the notifying the user of the particular user carried mobile data processing system that the particular user carried mobile data processing system was feasibly targeted by the aim of the image capturing mobile data processing system at the time the image capturing mobile data processing system captures the image data.

2. The method of claim 1 wherein the determining the particular user carried mobile data processing system was feasibly targeted by the aim of the image capturing mobile data processing system at the time the image capturing mobile data processing system captures the image data includes detecting sound.

3. The method of claim 1 wherein the determining the particular user carried mobile data processing system was feasibly targeted by the aim of the image capturing mobile data processing system at the time the image capturing mobile data processing system captures the image data includes determining an identity for the user of the particular user carried mobile data processing system.

4. The method of claim 3 wherein the communicating the notification content for the notifying the user of the particular user carried mobile data processing system includes causing at least one of:

an audible sound that can be heard,
a visible indication that can be seen,
a message,
an email,
a data packet, or
a data packet causing a required user interface action.

5. The method of claim 1 wherein the user of the particular user carried mobile data processing system is a user permitted to be a recipient of the notification content in accordance with determining a privilege configured for the user of the particular user carried mobile data processing system.

6. The method of claim 5 wherein the communicating the notification content for the notifying the user of the particular user carried mobile data processing system includes causing at least one of:

an audible sound that can be heard,
a visible indication that can be seen,
a message,
an email,
a data packet, or
a data packet causing a required user interface action.

7. The method of claim 1 wherein the notifying the user includes notifying a group of users.

8. The method of claim 1 wherein the searching the centralized collection for the matching alert configuration includes evaluating at least one location based condition.

9. The method of claim 8 wherein the at least one location based condition is specified using at least one of:

waymark information,
a number of occurrences,
a detected location,
an identified data processing system detected at a location,
a configured distance to a particular location, or
a detected proximity to a plurality of data processing systems.

10. The method of claim 1 wherein the searching the centralized collection for the matching alert configuration includes evaluating a time condition.

11. The method of claim 1 wherein the searching uses a second identifier determined from cross application addressing to translate a first identifier to the second identifier.

12. The method of claim 1 wherein the image capturing mobile data processing system performs frame analysis to analyze information captured in an image frame.

13. The method of claim 12 wherein the frame analysis to analyze information captured in the image frame includes determining at least one of:

a string of characters,
a serial number,
a barcode,
a license plate,
a graphic symbol,
a textual symbol,
visually perceptible identification,
a color,
a shape,
a marking,
a label,
a tag,
host mounting,
a landscape marking,
a parking lot line,
an environmental object,
an environmental place,
an object,
optical character recognition,
pictorial data,
an address,
a building,
a landmark,
an angle,
an appearance feature,
shading information,
a time,
a unique color combination,
a unique color contrast,
geometric description,
raster description,
a location, or
a dimension.

14. The method of claim 1 wherein the image capturing mobile data processing system captures an image frame without a user of the image capturing mobile data processing system manually capturing the image frame.

15. The method of claim 14 wherein the image capturing mobile data processing system performs frame analysis to analyze information captured in the image frame.

16. The method of claim 15 wherein the frame analysis to analyze information captured in the image frame includes determining at least one of:

a string of characters,
a serial number,
a barcode,
a license plate,
a graphic symbol,
a textual symbol,
visually perceptible identification,
a color,
a shape,
a marking, a label,
a tag,
host mounting,
a landscape marking,
a parking lot line,
an environmental object,
an environmental place,
an object,
optical character recognition,
pictorial data,
an address,
a building,
a landmark,
an angle,
an appearance feature,
shading information,
a time,
a unique color combination,
a unique color contrast,
geometric description,
raster description,
a location, or
a dimension.

17. The method of claim 1 wherein the vector data is clarified with at least one of:
a distance from the physical location of the image capturing mobile data processing system to at least one feasible remote physical location,
Electronic Distance Measurement information,
a range, or
a target size.

18. The method of claim 1 wherein the centralized collection includes at least one of:
a specified location of the image capturing mobile data processing system,
a specified location of the particular user carried mobile data processing system,
a specified time associated with the image capturing mobile data processing system,
a specified time associated with the particular user carried mobile data processing system,
a specified application data field of the image capturing mobile data processing system,
a specified application data field of the particular user carried mobile data processing system,
a specified application data field of a third user carried mobile data processing system in a network expanse including the image capturing mobile data processing system, or
a specified application data field of a third user carried mobile data processing system in a network expanse including the particular user carried mobile data processing system.

19. The method of claim 1 wherein the particular user carried mobile data processing system receives additional data from the image capturing mobile data processing system, the additional data including at least:
a graphical user interface,
a sorted order,
menu information,
a coupon,
product shopping information,
boarding pass information,
product purchase information,
financial transaction information,
inventory information,
a key for an unlock operation,
information for a RFID device,
information for a mechanical appliance,
information for an electrical appliance,
information for a mechanical device,
information for an electrical device,
public transportation information,
video,
audio,
music,
images,
text,
information associated to an application of a third data processing system,
information associated to an application of the particular user carried mobile data processing system,
information associated to an application of the image capturing mobile data processing system,
information for a location technology,
information for a triangulation measurement,
information for a time difference of arrival measurement,
information for a time of arrival measurement,
information for a time,
information for an angle of arrival measurement,
information for a yaw measurement,
information for a pitch measurement,
information for a roll measurement,
information for an accelerometer measurement,
information for a movement tolerance,
information for a communications wave spectrum signal strength of a transmission,
information for a communications wave spectrum characteristic of a transmission,
information for a communications wave spectrum class of a transmission,
information for a communications wave spectrum frequency of a transmission,
information for an application being active,
information returned from invocation of an application programming interface,
information maintained by an application installed,
information for an application in use,
information for an application context of an application,
information for a navigation application programming interface in use,
geographic information,
information for a current location,
information for a previous location,
information for a speed,
information for an elevation,
information for an altitude,
information for a heading,
information for a web site,
information for a physical address,
information for a logical address,
information for a transaction,
information for a completed transaction,
information for the content delivery device,
information for a user configuration,
information for an environmental condition,
information for monitoring movement,
information for an identifier,
information for one or more permissions assigned by a user,
information for an email application,
information for a messaging application,
information for a calendar application,
information for an address book application, information for a phone application,
information for a map application,
information for a storage application,
information for a file system application,
information for a database application,
information for a search application,
information for an internet browser application,
information for an identity,
information for an address,
information for an invocation result,
information for a data processing system type,
information for a statistic,
information for historical data,
information for a geofence specification,
information for whereabouts,
information for a nearby specification,
information for a nearness specification,
information for a specification using a distance,
information for a vicinity specification,
information for a situational location,
information associated to a file,
information associated to a directory,
information for SQL database data,
information for a group,
information for a plurality of data processing systems,
information for a date specification,
information for a time specification,
information for an arrival,
information for a departure,
information for a profile match percentage,
information for a profile tag match count,
information for a Whereabouts Programming Language encoding,
information for an XML specification,
information for a special term,
information for an atomic term,
information for an atomic operator,
information for an atomic element,
information for a point,
information for a radius,
information for a perimeter,
information for a sphere,
information for a region,
information for a Boolean value,
information for a physical location,
information for a two dimensional region specification,
information for a three dimensional region specification,
profile information,
forthcoming information,
information for a future location,
information for one or more privileges assigned by a user,
profile information received in a wireless data record,
information associated to a wireless data record,
information for one or more privileges assigned by a user,
information for an emergency application,
information for a RFID application,
information for a hotspot application,
information for a services application,
information for a traffic application,
information for an appliance application,
information for a device application,
information for an account management application,
information for a public transportation application,
information for a carpool application,
information for an advertising application,
information for a news application,
information for a picture application,
information for a video application,
information for a parking lot application,
information for an employment application,
information for a real estate application,
information for a line,
information for a polygon,
information for a mathematical coordinate system,
information for a specification described by a set of geographical coordinate system points,
information for a specification described by a set of spatial coordinate system points,
a plurality of identifier information,
a plurality of identifier information received in a wireless data record,
geofence information received in a wireless data record,
waymark information received in a wireless data record,
deliverable content information received in a wireless data record,
halo information received in a wireless data record,
information for a direction, or
information for data created by a user with a user interface to a map.

20. A data processing system comprising:
one or more processors; and
memory coupled to the one or more processors and storing instructions which, when executed by the one or more processors, causes the one or more processors to perform operations comprising:
maintaining a centralized collection of user configured alert data, the alert data for notifying a user of a particular user carried mobile data processing system that the particular user carried mobile data processing system was feasibly targeted by an aim of an image capturing mobile data processing system at a time the image capturing mobile data processing system captures image data;
determining vector data describing the aim of the image capturing mobile data processing system at the time the image capturing mobile data processing system captures the image data, the vector data including:
a vector origin describing a physical location of the image capturing mobile data processing system, and
vector directional data describing the aim of the image capturing mobile data processing system;
determining with the vector data the particular user carried mobile data processing system was feasibly targeted by the aim of the image capturing mobile data processing system at the time the image capturing mobile data processing system captures the image data;
searching the centralized collection for a matching alert configuration using at least one of:
an identifier associated with the image capturing mobile data processing system, or
an identifier associated with the particular user carried mobile data processing system;
determining with the searching the matching alert configuration;
accessing notification content in accordance with the matching alert configuration, the notification content for notifying the user of the particular user carried mobile data processing system that the particular user carried mobile data processing system was feasibly targeted by the aim of the image capturing mobile data processing system at the time the image capturing mobile data processing system captures the image data; and communicating the notification content for the notifying the user of the particular user carried mobile data processing system that the particular user carried mobile data processing system was feasibly targeted by the aim of the image capturing mobile data processing system at the time the image capturing mobile data processing system captures the image data.

* * * * *